United States Patent
Konrardy et al.

(10) Patent No.: US 10,467,704 B1
(45) Date of Patent: *Nov. 5, 2019

(54) AUTONOMOUS VEHICLE OPERATION FEATURE MONITORING AND EVALUATION OF EFFECTIVENESS

(71) Applicant: STATE FARM MUTUAL AUTOMOBILE INSURANCE COMPANY, Bloomington, IL (US)

(72) Inventors: Blake Konrardy, Bloomington, IL (US); Scott T. Christensen, Salem, OR (US); Gregory Hayward, Bloomington, IL (US); Scott Farris, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,192

(22) Filed: Jan. 19, 2017

Related U.S. Application Data

(62) Division of application No. 14/713,266, filed on May 15, 2015, now Pat. No. 9,754,325.

(Continued)

(51) Int. Cl.
 *G06Q 40/00* (2012.01)
 *G06Q 40/08* (2012.01)
(Continued)

(52) U.S. Cl.
 CPC ............ *G06Q 40/08* (2013.01); *G07C 5/085* (2013.01); *G07C 5/0808* (2013.01); *G01S 19/13* (2013.01); *G06Q 50/30* (2013.01)

(58) Field of Classification Search
 CPC ..................................................... G06Q 40/08
(Continued)

(56) References Cited

U.S. PATENT DOCUMENTS

| 5,214,582 A | * | 5/1993 | Gray ................. | G01R 31/007 340/439 |
| 6,151,539 A | * | 11/2000 | Bergholz ............. | G01S 13/931 340/435 |

(Continued)

FOREIGN PATENT DOCUMENTS

| KR | 101515496 B1 | * | 5/2015 | ............. G06T 17/00 |
| WO | WO2010062899 A1 | * | 6/2010 | ............. G06Q 40/00 |

OTHER PUBLICATIONS

Zhou, Jie et al., "A Simulation Model to Evaluate and Verify Functions of Autonomous Vehicle Based on Simulink", 2009, Tongji University, School of Automotive Studies, 12 pages (Year: 2009).*

(Continued)

*Primary Examiner* — Ojo O Oyebisi

(57) ABSTRACT

Methods and systems for monitoring use and determining risks associated with operation of a vehicle having one or more autonomous operation features are provided. According to certain aspects, a virtual log of data regarding performance of the features in a virtual test environment may be recorded during operation of the vehicle. This may include information regarding the vehicle, the vehicle environment, use of the autonomous operation features, and/or control decisions made by the features. The control decisions may include evasive maneuvers performed by the vehicle under the control of the features. The performance data in the virtual log may be used to determine risk levels associated with vehicle operation by the autonomous operation fea- (Continued)

tures. The risk levels may further be used to adjust an insurance policy associated with the vehicle.

19 Claims, 15 Drawing Sheets

Related U.S. Application Data

(60) Provisional application No. 62/056,893, filed on Sep. 29, 2014, provisional application No. 62/047,307, filed on Sep. 8, 2014, provisional application No. 62/035,867, filed on Aug. 11, 2014, provisional application No. 62/036,090, filed on Aug. 11, 2014, provisional application No. 62/035,983, filed on Aug. 11, 2014, provisional application No. 62/035,980, filed on Aug. 11, 2014, provisional application No. 62/035,878, filed on Aug. 11, 2014, provisional application No. 62/035,859, filed on Aug. 11, 2014, provisional application No. 62/035,660, filed on Aug. 11, 2014, provisional application No. 62/035,723, filed on Aug. 11, 2014, provisional application No. 62/035,669, filed on Aug. 11, 2014, provisional application No. 62/035,729, filed on Aug. 11, 2014, provisional application No. 62/035,832, filed on Aug. 11, 2014, provisional application No. 62/035,780, filed on Aug. 11, 2014, provisional application No. 62/035,769, filed on Aug. 11, 2014, provisional application No. 62/018,169, filed on Jun. 27, 2014, provisional application No. 62/000,878, filed on May 20, 2014.

(51) Int. Cl.
*G07C 5/08* (2006.01)
*G01S 19/13* (2010.01)
*G06Q 50/30* (2012.01)

(58) Field of Classification Search
USPC ............................................................ 705/4
See application file for complete search history.

(56) References Cited

U.S. PATENT DOCUMENTS

| 7,813,888 | B2* | 10/2010 | Vian | F41G 7/303 |
| | | | | 702/1 |
| 8,332,242 | B1* | 12/2012 | Medina, III | G06Q 40/08 |
| | | | | 705/35 |
| 8,725,472 | B2* | 5/2014 | Hagelin | G05B 17/02 |
| | | | | 434/11 |
| 9,381,916 | B1* | 7/2016 | Zhu | B60W 30/0956 |
| 9,727,920 | B1* | 8/2017 | Healy | G06Q 40/08 |
| 2007/0088469 | A1* | 4/2007 | Schmiedel | G05D 1/0274 |
| | | | | 701/23 |
| 2008/0033684 | A1* | 2/2008 | Vian | F41G 7/303 |
| | | | | 702/113 |
| 2008/0077383 | A1* | 3/2008 | Hagelin | G05B 17/02 |
| | | | | 703/21 |
| 2014/0100892 | A1* | 4/2014 | Collopy | G06Q 30/0224 |
| | | | | 705/4 |
| 2014/0156176 | A1* | 6/2014 | Caskey | G08G 1/00 |
| | | | | 701/117 |
| 2014/0350970 | A1* | 11/2014 | Schumann, Jr. | G06Q 40/08 |
| | | | | 705/4 |
| 2015/0170287 | A1* | 6/2015 | Tirone | G06Q 40/08 |
| | | | | 705/4 |
| 2015/0294422 | A1* | 10/2015 | Carver | G06Q 40/08 |
| | | | | 705/4 |
| 2015/0310758 | A1* | 10/2015 | Daddona | G09B 9/02 |
| | | | | 434/62 |
| 2016/0314224 | A1* | 10/2016 | Wei | G05B 17/02 |

OTHER PUBLICATIONS

Davies, Alex, "Here's How Mercedes-Benz Tested Its New Self-Driving Car", Nov. 20, 2012, Business Insider, 4 pages (Year: 2012).*
Birch, Stuart, "Mercedes-Benz' world class driving simulator complex enhances moose safety", Nov. 13, 2010, SAE International, Automotive Engineering (Year: 2010).*
Mercedes-Benz, "Press Information", Nov. 2012, Mercedes-Benz Driving Simulator (Year: 2012).*
Pohanka, Pavel et al., "Sensors Simulation Environment for Sensor Data Fusion", 2011, IEEE (Year: 2011).*
Wang, Shuiying et al., "Shander-based Sensor Simulation for Autonomous Car Testing", 2012, 2012 15th International IEEE Conference on Intelligent Transportation Systems (Year: 2012).*

* cited by examiner

AUTONOMOUS VEHICLE OPERATION FEATURE MONITORING AND EVALUATION OF EFFECTIVENESS

CROSS-REFERENCE TO RELATED APPLICATIONS

This application is a divisional application divided from and claiming priority to U.S. patent application Ser. No. 14/713,266 (filed May 15, 2015), which claims the benefit of U.S. Provisional Application No. 62/000,878 (filed May 20, 2014); U.S. Provisional Application No. 62/018,169 (filed Jun. 27, 2014); U.S. Provisional Application No. 62/035,660 (filed Aug. 11, 2014); U.S. Provisional Application No. 62/035,669 (filed Aug. 11, 2014); U.S. Provisional Application No. 62/035,723 (filed Aug. 11, 2014); U.S. Provisional Application No. 62/035,729 (filed Aug. 11, 2014); U.S. Provisional Application No. 62/035,769 (filed Aug. 11, 2014); U.S. Provisional Application No. 62/035,780 (filed Aug. 11, 2014); U.S. Provisional Application No. 62/035,832 (filed Aug. 11, 2014); U.S. Provisional Application No. 62/035,859 (filed Aug. 11, 2014); U.S. Provisional Application No. 62/035,867 (filed Aug. 11, 2014); U.S. Provisional Application No. 62/035,878 (filed Aug. 11, 2014); U.S. Provisional Application No. 62/035,980 (filed Aug. 11, 2014); U.S. Provisional Application No. 62/035,983 (filed Aug. 11, 2014); U.S. Provisional Application No. 62/036,090 (filed Aug. 11, 2014); U.S. Provisional Application No. 62/047,307 (filed Sep. 8, 2014); and U.S. Provisional Application No. 62/056,893 (filed Sep. 29, 2014). The entirety of each of the foregoing provisional applications is incorporated by reference herein.

Additionally, the present application is related to co-pending U.S. patent application Ser. No. 14/713,271 (filed May 15, 2015); co-pending U.S. patent application Ser. No. 14/951,774 (filed Nov. 25, 2015); co-pending U.S. patent application Ser. No. 14/713,184 (filed May 15, 2015); co-pending U.S. patent application Ser. No. 14/713,188 (filed May 15, 2015); co-pending Ser. No. 14/978,266 (filed Dec. 22, 2015); co-pending U.S. patent application Ser. No. 14/713,194 (filed May 15, 2015); co-pending U.S. patent application Ser. No. 14/713,201 (filed May 15, 2015); co-pending U.S. patent application Ser. No. 14/713,206 (filed May 15, 2015); co-pending U.S. patent application Ser. No. 14/713,214 (filed May 15, 2015); co-pending U.S. patent application Ser. No. 14/713,217 (filed May 15, 2015); co-pending U.S. patent application Ser. No. 14/713,223 (filed May 15, 2015); co-pending U.S. patent application Ser. No. 14/713,226 (filed May 15, 2015); co-pending U.S. patent application Ser. No. 14/713,230 (filed May 15, 2015); co-pending U.S. patent application Ser. No. 14/713,237 (filed May 15, 2015); co-pending U.S. patent application Ser. No. 14/713,240 (filed May 15, 2015); co-pending U.S. patent application Ser. No. 14/713,244 (May 15, 2015); co-pending U.S. patent application Ser. No. 14/713,249 (filed May 15, 2015); co-pending U.S. patent application Ser. No. 14/713,254 (filed May 15, 2015); co-pending U.S. patent application Ser. No. 14/951,803 (filed Nov. 25, 2015); co-pending U.S. patent application Ser. No. 14/713,261 (filed May 15, 2015); and co-pending U.S. patent application Ser. No. 14/951,798 (filed Nov. 25, 2015).

FIELD

The present disclosure generally relates to systems and methods for determining risk, pricing, and offering vehicle insurance policies, specifically vehicle insurance policies where vehicle operation is partially or fully automated.

BACKGROUND

Vehicle or automobile insurance exists to provide financial protection against physical damage and/or bodily injury resulting from traffic accidents and against liability that could arise therefrom. Typically, a customer purchases a vehicle insurance policy for a policy rate having a specified term. In exchange for payments from the insured customer, the insurer pays for damages to the insured which are caused by covered perils, acts, or events as specified by the language of the insurance policy. The payments from the insured are generally referred to as "premiums," and typically are paid on behalf of the insured over time at periodic intervals. An insurance policy may remain "in-force" while premium payments are made during the term or length of coverage of the policy as indicated in the policy. An insurance policy may "lapse" (or have a status or state of "lapsed"), for example, when premium payments are not being paid or if the insured or the insurer cancels the policy.

Premiums may be typically determined based upon a selected level of insurance coverage, location of vehicle operation, vehicle model, and characteristics or demographics of the vehicle operator. The characteristics of a vehicle operator that affect premiums may include age, years operating vehicles of the same class, prior incidents involving vehicle operation, and losses reported by the vehicle operator to the insurer or a previous insurer. Past and current premium determination methods do not, however, account for use of autonomous vehicle operating features. The present embodiments may, inter alia, alleviate this and/or other drawbacks associated with conventional techniques.

BRIEF SUMMARY

The present embodiments may be related to autonomous or semi-autonomous vehicle functionality, including driverless operation, accident avoidance, or collision warning systems. These autonomous vehicle operation features may either assist the vehicle operator to more safely or efficiently operate a vehicle or may take full control of vehicle operation under some or all circumstances. The present embodiments may also facilitate risk assessment and premium determination for vehicle insurance policies covering vehicles with autonomous operation features.

In accordance with the described embodiments, the disclosure herein generally addresses systems and methods for evaluating risk associated with an autonomous or semi-autonomous vehicle technology for a vehicle. An on-board computer or mobile device may monitor and record vehicle operating data, including information regarding the decisions made by the autonomous or semi-autonomous vehicle technology, regardless of whether the decisions are actually used to control the vehicle. A server may receive the operating data and may process this data to determine risk levels associated with operation of the vehicle.

In one aspect, a computer-implemented method for evaluating risk associated with an autonomous or semi-autonomous vehicle technology for a vehicle may be provided. The computer-implemented method may include collecting a virtual log of actual driving performance of the autonomous or semi-autonomous functionality from the vehicle, determining an insurance-based risk associated with the autonomous or semi-autonomous functionality based upon, at least in part (i.e., wholly or partially), analysis of the virtual log of actual driving performance of the autonomous or semi-autonomous functionality, determining an adjustment to the insurance policy based upon, at least in part (i.e., wholly or partially), the determined insurance-based risk associated with the autonomous or semi-autonomous functionality, and/or causing the adjustment to the insurance policy to be implemented. The adjustment to the insurance policy may include one or more of generating, updating, or adjusting one or more of the following: a premium, a rate, a discount, a reward, a deductible, or a limit. Additionally, or alternatively, the insurance-based risk may include a risk of the vehicle being involved in a vehicle accident. The method may include additional, fewer, or alternate actions, including those discussed elsewhere herein.

In another aspect, a computer system for evaluating risk associated with an autonomous or semi-autonomous vehicle technology for a vehicle may be provided. The computer system may include one or more processors, one or more communication modules adapted to communicate data, and a non-transitory program memory coupled to the one or more processors and storing executable instructions. The executable instruction may, when executed by the one or more processors, cause the computer system to collect a virtual log of actual driving performance of the autonomous or semi-autonomous functionality from the vehicle via the one or more communication modules, determine an insurance-based risk associated with the autonomous or semi-autonomous functionality based upon analysis of the virtual log of actual driving performance of the autonomous or semi-autonomous functionality, determine an adjustment to the insurance policy based upon the determined insurance-based risk associated with the autonomous or semi-autonomous functionality, and/or cause the adjustment to the insurance policy to be implemented. The adjustment to the insurance policy may include one or more of generating, updating, or adjusting one or more of the following: a premium, a rate, a discount, a reward, a deductible, or a limit. Additionally, or alternatively, the insurance-based risk may include a risk of the vehicle being involved in a vehicle accident. The system may include additional, fewer, or alternate actions, including those discussed elsewhere herein.

In yet another aspect, a tangible, non-transitory computer-readable medium storing instructions for evaluating risk associated with an autonomous or semi-autonomous vehicle technology for a vehicle may be provided. The instructions may, when executed by at least one processor of a computer system, cause the computer system to collect a virtual log of actual driving performance of the autonomous or semi-autonomous functionality from the vehicle, determine an insurance-based risk associated with the autonomous or semi-autonomous functionality based upon analysis of the virtual log of actual driving performance of the autonomous or semi-autonomous functionality, determine an adjustment to the insurance policy based upon the determined insurance-based risk associated with the autonomous or semi-autonomous functionality, and/or cause the adjustment to the insurance policy to be implemented. The adjustment to the insurance policy may include one or more of generating, updating, or adjusting one or more of the following: a premium, a rate, a discount, a reward, a deductible, or a limit. Additionally, or alternatively, the insurance-based risk may include a risk of the vehicle being involved in a vehicle accident. The instructions of the computer-readable medium may include additional, fewer, or alternate actions, including those discussed elsewhere herein.

In some embodiments, determining the insurance-based risk may be based at least in part upon analysis of one or more of the following indicated by the virtual log: (1) decisions made by the autonomous or semi-autonomous functionality; or (2) the operating conditions under which the autonomous or semi-autonomous functionality made decisions. In further embodiments, determining the insurance-based risk may be based at least in part upon analysis of one or more of the following indicated by the virtual log: (1) evasive maneuvers that the autonomous or semi-autonomous functionality directed the vehicle to perform; or (2) the operating conditions under which the evasive maneuvers were performed. In yet further embodiments, determining the insurance-based risk may be based at least in part upon analysis of one or more of the following indicated by the virtual log: (1) how the autonomous or semi-autonomous functionality responded to driving behavior of other drivers operating other vehicles near the vehicle; or (2) evaluating the responsiveness of the autonomous or semi-autonomous functionality to the driving behavior of other drivers operating other vehicles near the vehicle.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1:
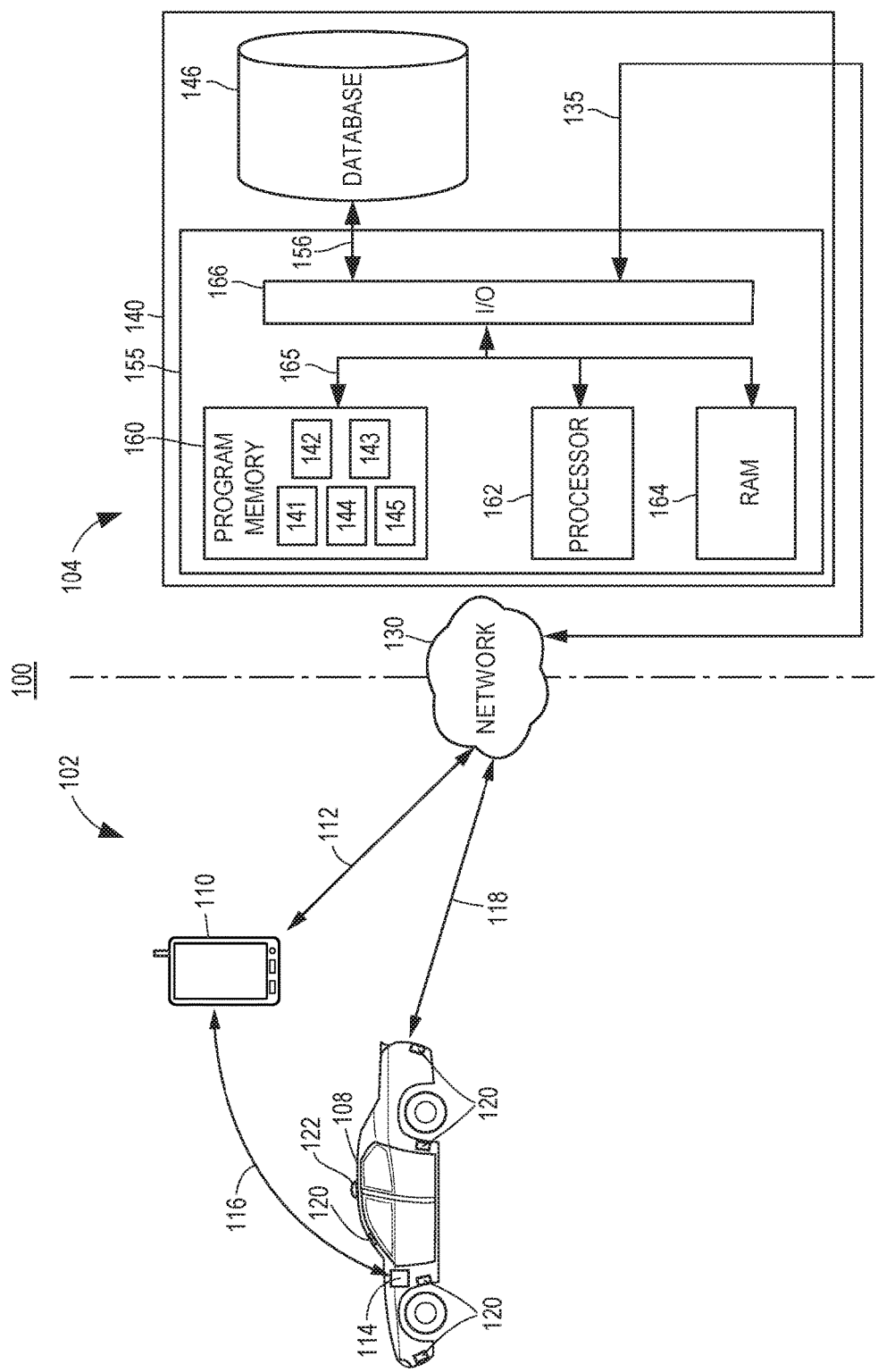
FIG. 1 illustrates a block diagram of an exemplary computer network, a computer server, a mobile device, and an on-board computer for implementing autonomous vehicle operation, monitoring, evaluation, and insurance processes in accordance with the described embodiments.

The systems and methods disclosed herein generally relate to evaluating, monitoring, pricing, and processing vehicle insurance policies for vehicles including autonomous (or semi-autonomous) vehicle operation features. The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). The autonomous operation features may affect the risk related to operating a vehicle, both individually and/or in combination. To account for these effects on risk, some embodiments evaluate the quality of each autonomous operation feature and/or combination of features. This may be accomplished by testing the features and combinations in controlled environments, as well as analyzing the effectiveness of the features in the ordinary course of vehicle operation. New autonomous operation features may be evaluated based upon controlled testing and/or estimating ordinary-course performance based upon data regarding other similar features for which ordinary-course performance is known.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during vehicle operation. Information obtained by monitoring feature usage may be used to determine risk levels associated with vehicle operation, either generally or in relation to a vehicle operator. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

Information regarding the risks associated with vehicle operation with and without the autonomous operation features may then be used to determine risk categories or premiums for a vehicle insurance policy covering a vehicle with autonomous operation features. Risk category or price may be determined based upon factors relating to the evaluated effectiveness of the autonomous vehicle features. The risk or price determination may also include traditional factors, such as location, vehicle type, and level of vehicle use. For fully autonomous vehicles, factors relating to vehicle operators may be excluded entirely. For partially autonomous vehicles, factors relating to vehicle operators may be reduced in proportion to the evaluated effectiveness and monitored usage levels of the autonomous operation features. For vehicles with autonomous communication features that obtain information from external sources (e.g., other vehicles or infrastructure), the risk level and/or price determination may also include an assessment of the availability of external sources of information. Location and/or timing of vehicle use may thus be monitored and/or weighted to determine the risk associated with operation of the vehicle.

Autonomous Automobile Insurance

The present embodiments may relate to assessing and pricing insurance based upon autonomous (or semi-autonomous) functionality of a vehicle, and not the human driver. A smart vehicle may maneuver itself without human intervention and/or include sensors, processors, computer instructions, and/or other components that may perform or direct certain actions conventionally performed by a human driver.

An analysis of how artificial intelligence facilitates avoiding accidents and/or mitigates the severity of accidents may be used to build a database and/or model of risk assessment. After which, automobile insurance risk and/or premiums (as well as insurance discounts, rewards, and/or points) may be adjusted based upon autonomous or semi-autonomous vehicle functionality, such as by groups of autonomous or semi-autonomous functionality or individual features. In one aspect, an evaluation may be performed of how artificial intelligence, and the usage thereof, impacts automobile accidents and/or automobile insurance claims.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection;

(o) autonomous or semi-autonomous backup systems; (p) road mapping systems; (q) software security and anti-hacking measures; (r) theft prevention/automatic return; (s) automatic or semi-automatic driving without occupants; and/or other functionality.

The adjustments to automobile insurance rates or premiums based upon the autonomous or semi-autonomous vehicle-related functionality or technology may take into account the impact of such functionality or technology on the likelihood of a vehicle accident or collision occurring. For instance, a processor may analyze historical accident information and/or test data involving vehicles having autonomous or semi-autonomous functionality. Factors that may be analyzed and/or accounted for that are related to insurance risk, accident information, or test data may include (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

In one aspect, the benefit of one or more autonomous or semi-autonomous functionalities or capabilities may be determined, weighted, and/or otherwise characterized. For instance, the benefit of certain autonomous or semi-autonomous functionality may be substantially greater in city or congested traffic, as compared to open road or country driving traffic. Additionally or alternatively, certain autonomous or semi-autonomous functionality may only work effectively below a certain speed, i.e., during city driving or driving in congestion. Other autonomous or semi-autonomous functionality may operate more effectively on the highway and away from city traffic, such as cruise control. Further individual autonomous or semi-autonomous functionality may be impacted by weather, such as rain or snow, and/or time of day (day light versus night). As an example, fully automatic or semi-automatic lane detection warnings may be impacted by rain, snow, ice, and/or the amount of sunlight (all of which may impact the imaging or visibility of lane markings painted onto a road surface, and/or road markers or street signs).

Automobile insurance premiums, rates, discounts, rewards, refunds, points, etc. may be adjusted based upon the percentage of time or vehicle usage that the vehicle is the driver, i.e., the amount of time a specific driver uses each type of autonomous (or even semi-autonomous) vehicle functionality. In other words, insurance premiums, discounts, rewards, etc. may be adjusted based upon the percentage of vehicle usage during which the autonomous or semi-autonomous functionality is in use. For example, automobile insurance risk, premiums, discounts, etc. for an automobile having one or more autonomous or semi-autonomous functionalities may be adjusted and/or set based upon the percentage of vehicle usage that the one or more individual autonomous or semi-autonomous vehicle functionalities are in use, anticipated to be used or employed by the driver, and/or otherwise operating.

Such usage information for a particular vehicle may be gathered over time and/or via remote wireless communication with the vehicle. One embodiment may involve a processor on the vehicle, such as within a vehicle control system or dashboard, monitoring in real-time whether vehicle autonomous or semi-autonomous functionality is currently operating. Other types of monitoring may be remotely performed, such as via wireless communication between the vehicle and a remote server, or wireless communication between a vehicle-mounted dedicated device (that is configured to gather autonomous or semi-autonomous functionality usage information) and a remote server.

In one embodiment, if the vehicle is currently employing autonomous or semi-autonomous functionality, the vehicle may send a Vehicle-to-Vehicle (V2V) wireless communication to a nearby vehicle also employing the same or other type(s) of autonomous or semi-autonomous functionality.

As an example, the V2V wireless communication from the first vehicle to the second vehicle (following the first vehicle) may indicate that the first vehicle is autonomously braking, and the degree to which the vehicle is automatically braking and/or slowing down. In response, the second vehicle may also automatically or autonomously brake as well, and the degree of automatically braking or slowing down of the second vehicle may be determined to match, or even exceed, that of the first vehicle. As a result, the second vehicle, traveling directly or indirectly, behind the first vehicle, may autonomously safely break in response to the first vehicle autonomously breaking.

As another example, the V2V wireless communication from the first vehicle to the second vehicle may indicate that the first vehicle is beginning or about to change lanes or turn. In response, the second vehicle may autonomously take appropriate action, such as automatically slow down, change lanes, turn, maneuver, etc. to avoid the first vehicle.

As noted above, the present embodiments may include remotely monitoring, in real-time and/or via wireless communication, vehicle autonomous or semi-autonomous functionality. From such remote monitoring, the present embodiments may remotely determine that a vehicle accident has occurred. As a result, emergency responders may be informed of the location of the vehicle accident, such as via wireless communication, and/or quickly dispatched to the accident scene.

The present embodiments may also include remotely monitoring, in real-time or via wireless communication, that vehicle autonomous or semi-autonomous functionality is, or is not, in use, and/or collect information regarding the amount of usage of the autonomous or semi-autonomous functionality. From such remote monitoring, a remote server may remotely send a wireless communication to the vehicle to prompt the human driver to engage one or more specific vehicle autonomous or semi-autonomous functionalities.

Another embodiment may enable a vehicle to wirelessly communicate with a traffic light, railroad crossing, toll both, marker, sign, or other equipment along the side of a road or highway. As an example, a traffic light may wirelessly indicate to the vehicle that the traffic light is about to switch from green to yellow, or from yellow to red. In response to such an indication remotely received from the traffic light, the autonomous or semi-autonomous vehicle may automatically start to brake, and/or present or issue a warning/alert to the human driver. After which, the vehicle may wirelessly communicate with the vehicles traveling behind it that the traffic light is about to change and/or that the vehicle has started to brake or slow down such that the following vehicles may also automatically brake or slow down accordingly.

Insurance premiums, rates, ratings, discounts, rewards, special offers, points, programs, refunds, claims, claim amounts, etc. may be adjusted for, or may otherwise take into account, the foregoing functionality and/or the other functionality described herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Exemplary Embodiments

Insurance providers may currently develop a set of rating factors based upon the make, model, and model year of a vehicle. Models with better loss experience receive lower factors, and thus lower rates. One reason that this current rating system cannot be used to assess risk for autonomous technology is that many autonomous features vary for the same model. For example, two vehicles of the same model may have different hardware features for automatic braking, different computer instructions for automatic steering, and/or different artificial intelligence system versions. The current make and model rating may also not account for the extent to which another "driver," in this case the vehicle itself, is controlling the vehicle.

The present embodiments may assess and price insurance risks at least in part based upon autonomous or semi-autonomous vehicle technology that replaces actions of the driver. In a way, the vehicle-related computer instructions and artificial intelligence may be viewed as a "driver."

In one computer-implemented method of adjusting or generating an insurance policy, (1) data may be captured by a processor (such as via wireless communication) to determine the autonomous or semi-autonomous technology or functionality associated with a specific vehicle that is, or is to be, covered by insurance; (2) the received data may be compared by the processor to a stored baseline of vehicle data (such as actual accident information, and/or autonomous or semi-autonomous vehicle testing data); (3) risk may be identified or assessed by the processor based upon the specific vehicle's ability to make driving decisions and/or avoid or mitigate crashes; (4) an insurance policy may be adjusted (or generated or created), or an insurance premium may be determined by the processor based upon the risk identified that is associated with the specific vehicle's autonomous or semi-autonomous ability or abilities; and/or (5) the insurance policy and/or premium may be presented on a display or otherwise provided to the policyholder or potential customer for their review and/or approval. The method may include additional, fewer, or alternate actions, including those discussed below and elsewhere herein.

The method may include evaluating the effectiveness of artificial intelligence and/or vehicle technology in a test environment, and/or using real driving experience. The identification or assessment of risk performed by the method (and/or the processor) may be dependent upon the extent of control and decision making that is assumed by the vehicle, rather than the driver.

Additionally or alternatively, the identification or assessment of insurance and/or accident-based risk may be dependent upon the ability of the vehicle to use external information (such as vehicle-to-vehicle and vehicle-to-infrastructure communication) to make driving decisions. The risk assessment may further be dependent upon the availability of such external information. For instance, a vehicle (or vehicle owner) may be associated with a geographical location, such as a large city or urban area, where such external information is readily available via wireless communication. On the other hand, a small town or rural area may or may not have such external information available.

The information regarding the availability of autonomous or semi-autonomous vehicle technology, such as a particular factory-installed hardware and/or software package, version, revision, or update, may be wirelessly transmitted to a remote server for analysis. The remote server may be associated with an insurance provider, vehicle manufacturer, autonomous technology provider, and/or other entity.

The driving experience and/or usage of the autonomous or semi-autonomous vehicle technology may be monitored in real time, small timeframes, and/or periodically to provide feedback to the driver, insurance provider, and/or adjust insurance policies or premiums. In one embodiment, information may be wirelessly transmitted to the insurance provider, such as from a transceiver associated with a smart car to an insurance provider remote server.

Insurance policies, including insurance premiums, discounts, and rewards, may be updated, adjusted, and/or determined based upon hardware or software functionality, and/or hardware or software upgrades. Insurance policies, including insurance premiums, discounts, etc. may also be updated, adjusted, and/or determined based upon the amount of usage and/or the type(s) of the autonomous or semi-autonomous technology employed by the vehicle.

In one embodiment, performance of autonomous driving software and/or sophistication of artificial intelligence may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous driving technology, artificial intelligence capabilities, rather than human decision making, may be evaluated to determine the relative risk of the insurance policy. This evaluation may be conducted using multiple techniques. Vehicle technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision.

Additionally, actual loss experience of the software in question may be analyzed. Vehicles with superior artificial intelligence and crash avoidance capabilities may experience lower insurance losses in real driving situations.

Results from both the test environment and/or actual insurance losses may be compared to the results of other autonomous software packages and/or vehicles lacking autonomous driving technology to determine a relative risk factor (or level of risk) for the technology in question. This risk factor (or level of risk) may be applicable to other vehicles that utilize the same or similar autonomous operation software package(s).

Emerging technology, such as new iterations of artificial intelligence systems, may be priced by combining its individual test environment assessment with actual losses corresponding to vehicles with similar autonomous operation software packages. The entire vehicle software and artificial intelligence evaluation process may be conducted with respect to various technologies and/or elements that affect driving experience. For example, a fully autonomous vehicle may be evaluated based on its vehicle-to-vehicle communications. A risk factor could then be determined and applied when pricing the vehicle. The driver's past loss experience and/or other driver risk characteristics may not be considered for fully autonomous vehicles, in which all driving decisions are made by the vehicle's artificial intelligence.

In one embodiment, a separate portion of the automobile insurance premium may be based explicitly on the artificial intelligence software's driving performance and characteristics. The artificial intelligence pricing model may be combined with traditional methods for semi-autonomous vehicles. Insurance pricing for fully autonomous, or driverless, vehicles may be based upon the artificial intelligence model score by excluding traditional rating factors that measure risk presented by the drivers. Evaluation of vehicle software and/or artificial intelligence may be conducted on an aggregate basis or for specific combinations of technology and/or driving factors or elements (as discussed elsewhere herein). The vehicle software test results may be combined with actual loss experience to determine relative risk.

Exemplary Autonomous Vehicle Operation System

FIG. 1 illustrates a block diagram of an exemplary autonomous vehicle insurance system 100 on which the exemplary methods described herein may be implemented. The high-level architecture includes both hardware and software applications, as well as various data communications channels for communicating data between the various hardware and software components. The autonomous vehicle insurance system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108. To monitor the vehicle 108, the front-end components 102 may include one or more sensors 120 installed within the vehicle 108 that may communicate with the on-board computer 114. The front-end components 102 may further process the sensor data using the on-board computer 114 or a mobile device 110 (e.g., a smart phone, a tablet computer, a special purpose computing device, etc.) to determine when the vehicle is in operation and information regarding the vehicle. In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, determine use and effectiveness of autonomous operation features, determine risk levels or premium price, and/or facilitate purchase or renewal of an autonomous vehicle insurance policy.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., an ignition sensor, an odometer, a system clock, a speedometer, a tachometer, an accelerometer, a gyroscope, a compass, a geolocation unit, a camera, a distance sensor, etc.), which sensors may also be incorporated within or connected to the on-board computer 114. The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the mobile server 140 via the network 130. In other embodiments, the on-board computer 114 may perform all of the functions of the mobile device 110 described herein, in which case no mobile device 110 may be present in the system 100. Either or both of the mobile device 110 or on-board computer 114 may communicate with the network 130 over links 112 and 118, respectively. Additionally, the mobile device 110 and on-board computer 114 may communicate with one another directly over link 116.

The mobile device 110 may be either a general-use personal computer, cellular phone, smart phone, tablet computer, or a dedicated vehicle use monitoring device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), lane markings, or signs or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 for use in autonomous vehicle operation.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to control the steering, braking, or throttle of the vehicle 108. To facilitate such control, the on-board computer 114 may be communicatively connected to the controls or components of the vehicle 108 by various electrical or electromechanical control components (not shown). In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these. Where the network 130 comprises the Internet, data communications may take place over the network 130 via an Internet communication protocol. The back-end components 104 include one or more servers 140. Each server 140 may include one or more computer processors adapted and configured to execute various software applications and components of the autonomous vehicle insurance system 100, in addition to other software applications. The server 140 may further include a database 146, which may be adapted to store data related to the operation of the vehicle 108 and its autonomous operation features. Such data might include, for example, dates and times of vehicle use, duration of vehicle use, use and settings of autonomous operation features, speed of the vehicle 108, RPM or other tachometer readings of the vehicle 108, lateral and longitudinal acceleration of the vehicle 108, incidents or near collisions of the vehicle 108, communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle insurance system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for autonomous operation feature information, vehicle insurance policy information, and vehicle use information. The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features, a feature evaluation application 142 for determining the effectiveness of autonomous operation features under various conditions, a compatibility evaluation application 143 for determining the effectiveness of combinations of autonomous operation features, a risk assessment application 144 for determining a risk category associated with an insurance policy covering an autonomous vehicle, and an autonomous vehicle insurance policy purchase application 145 for offering and facilitating purchase or renewal of an insurance policy covering an autonomous vehicle. The various software applications may be executed on the same computer processor or on different computer processors.

Figure 2:
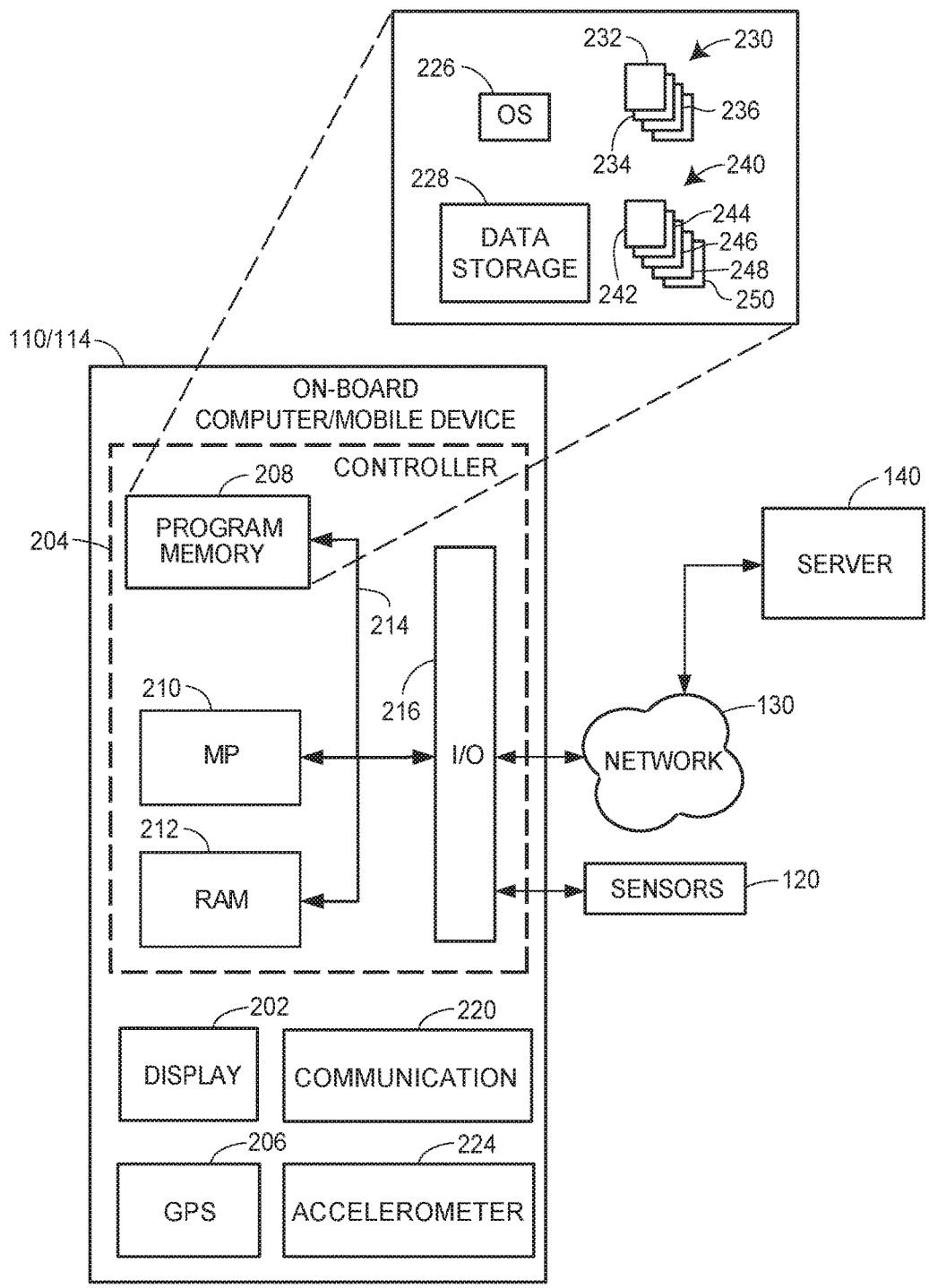
FIG. 2 illustrates a block diagram of an exemplary on-board computer or mobile device.

FIG. 2 illustrates a block diagram of an exemplary mobile device 110 or an exemplary on-board computer 114 consistent with the system 100. The mobile device 110 or on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous vehicle operation method 300. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130.

The plurality of software applications 230 may call various of the plurality of software routines 240 to perform functions relating to autonomous vehicle operation, monitoring, or communication. One of the plurality of software routines 240 may be a configuration routine 242 to receive settings from the vehicle operator to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation. Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Any of the plurality of software applications 230 may be designed to operate independently of the software applications 230 or in conjunction with the software applications 230.

When implementing the exemplary autonomous vehicle operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), or other sources of relevant information (e.g., weather, traffic, local amenities). Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

When implementing the autonomous operation feature monitoring and evaluation methods 400-700, the controller 204 may further implement the autonomous operation monitoring application 236 to communicate with the server 140 to provide information regarding autonomous vehicle operation. This may include information regarding settings or configurations of autonomous operation features, data from the sensors 120 regarding the vehicle environment, data from the sensors 120 regarding the response of the vehicle 108 to its environment, communications sent or received using the communication component 122 or the communication unit 220, operating status of the autonomous vehicle operation application 232 and the autonomous communication application 234, or commands sent from the on-board computer 114 to the control components (not shown) to operate the vehicle 108. The information may be received and stored by the server 140 implementing the autonomous operation information monitoring application 141, and the server 140 may then determine the effectiveness of autonomous operation under various conditions by implementing the feature evaluation application 142 and the compatibility evaluation application 143. The effectiveness of autonomous operation features and the extent of their use may be further used to determine risk associated with operation of the autonomous vehicle by the server 140 implementing the risk assessment application 144.

In addition to connections to the sensors 120, the mobile device 110 or the on-board computer 114 may include additional sensors, such as the GPS unit 206 or the accelerometer 224, which may provide information regarding the vehicle 108 for autonomous operation and other purposes. Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Exemplary Autonomous Vehicle Operation Method

Figure 3:
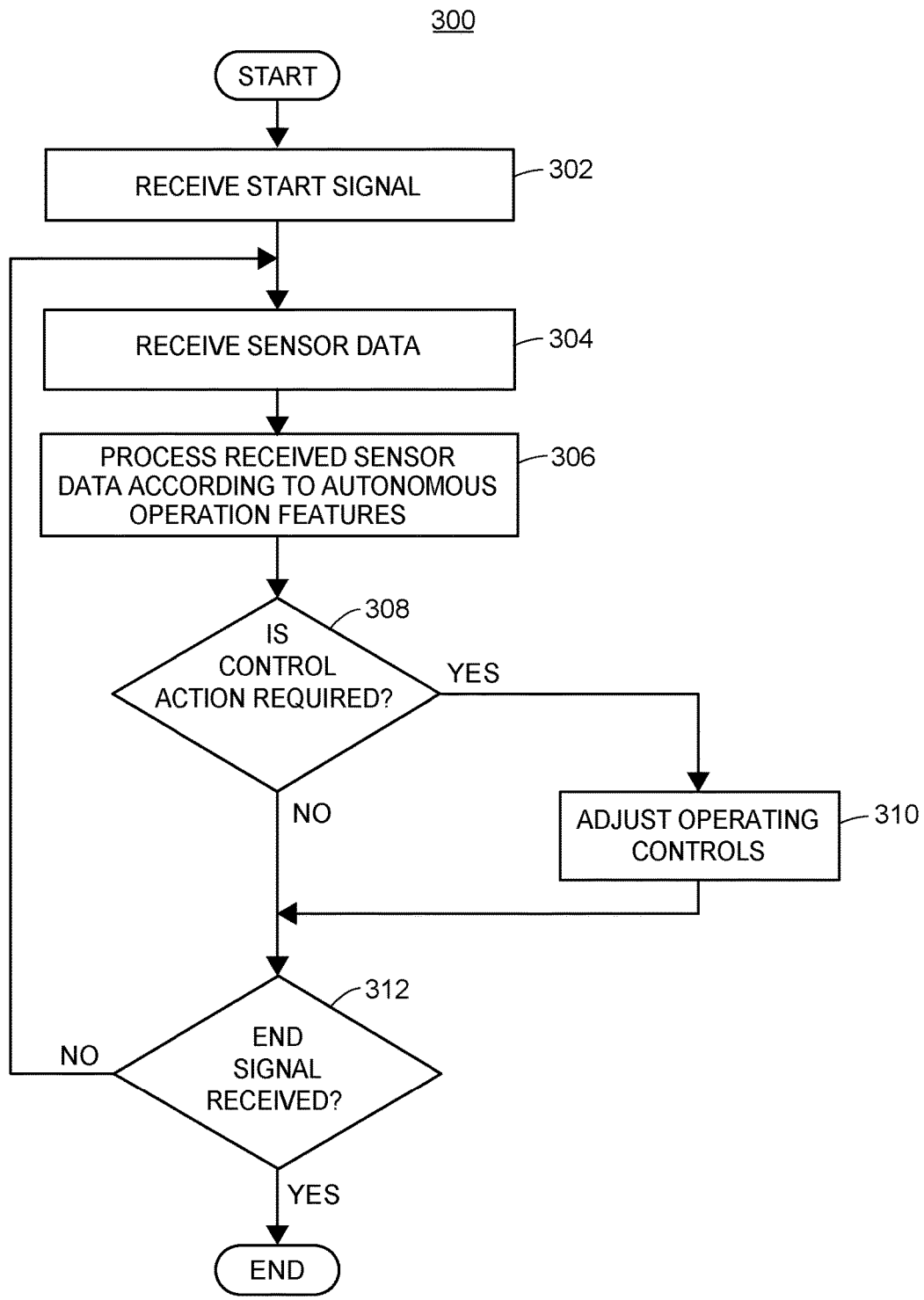
FIG. 3 illustrates a flow diagram of an exemplary autonomous vehicle operation method in accordance with the presently described embodiments.

FIG. 3 illustrates a flow diagram of an exemplary autonomous vehicle operation method 300, which may be implemented by the autonomous vehicle insurance system 100. The method 300 may begin at block 302 when the controller 204 receives a start signal. The start signal may be a command from the vehicle operator through the user-input device to enable or engage one or more autonomous operation features of the vehicle 108. In some embodiments, the vehicle operator 108 may further specify settings or configuration details for the autonomous operation features. For fully autonomous vehicles, the settings may relate to one or more destinations, route preferences, fuel efficiency preferences, speed preferences, or other configurable settings relating to the operation of the vehicle 108. In some embodiments, fully autonomous vehicles may include additional features or settings permitting them to operate without passengers or vehicle operators within the vehicle. For example, a fully autonomous vehicle may receive an instruction to find a parking space within the general vicinity, which the vehicle may do without the vehicle operator. The vehicle may then be returned to a selected location by a request from the vehicle operator via a mobile device 110 or otherwise. This feature may further be adapted to return a fully autonomous vehicle if lost or stolen.

For other autonomous vehicles, the settings may include enabling or disabling particular autonomous operation features, specifying thresholds for autonomous operation, specifying warnings or other information to be presented to the vehicle operator, specifying autonomous communication types to send or receive, specifying conditions under which to enable or disable autonomous operation features, or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle. In embodiments where only one autonomous operation feature is enabled, the start signal may consist of a request to perform a particular task (e.g., autonomous parking) or to enable a particular feature (e.g., autonomous braking for collision avoidance). In other embodiments, the start signal may be generated automatically by the controller 204 based upon predetermined settings (e.g., when the vehicle 108 exceeds a certain speed or is operating in low-light conditions). In some embodiments, the controller 204 may generate a start signal when communication from an external source is received (e.g., when the vehicle 108 is on a smart highway or near another autonomous vehicle).

After receiving the start signal at block 302, the controller 204 receives sensor data from the sensors 120 during vehicle operation at block 304. In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130. The sensor data may alternately either be received by the controller 204 as raw data measurements from one of the sensors 120 or may be preprocessed by the sensor 120 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data at block 306 in accordance with the autonomous operation features. The controller 204 may process the sensor data to determine whether an autonomous control action is required or to determine adjustments to the controls of the vehicle 108. For example, the controller 204 may receive sensor data indicating a decreasing distance to a nearby object in the vehicle's path and process the received sensor data to determine whether to begin braking (and, if so, how abruptly to slow the vehicle 108). As another example, the controller 204 may process the sensor data to determine whether the vehicle 108 is remaining with its intended path (e.g., within lanes on a roadway). If the vehicle 108 is beginning to drift or slide (e.g., as on ice or water), the controller 204 may determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

When the controller 204 determines an autonomous control action is required at block 308, the controller 204 may cause the control components of the vehicle 108 to adjust the operating controls of the vehicle to achieve desired operation at block 310. For example, the controller 204 may send a signal to open or close the throttle of the vehicle 108 to achieve a desired speed. Alternatively, the controller 204 may control the steering of the vehicle 108 to adjust the direction of movement. In some embodiments, the vehicle 108 may transmit a message or indication of a change in velocity or position using the communication component 122 or the communication module 220, which signal may be used by other autonomous vehicles to adjust their controls. As discussed further below, the controller 204 may also log or transmit the autonomous control actions to the server 140 via the network 130 for analysis.

The controller 204 may continue to receive and process sensor data at blocks 304 and 306 until an end signal is received by the controller 204 at block 312. The end signal may be automatically generated by the controller 204 upon the occurrence of certain criteria (e.g., the destination is reached or environmental conditions require manual operation of the vehicle 108 by the vehicle operator). Alternatively, the vehicle operator may pause, terminate, or disable the autonomous operation feature or features using the user-input device or by manually operating the vehicle's controls, such as by depressing a pedal or turning a steering instrument. When the autonomous operation features are disabled or terminated, the controller 204 may either continue vehicle operation without the autonomous features or may shut off the vehicle 108, depending upon the circumstances.

Where control of the vehicle 108 must be returned to the vehicle operator, the controller 204 may alert the vehicle operator in advance of returning to manual operation. The alert may include a visual, audio, or other indication to obtain the attention of the vehicle operator. In some embodiments, the controller 204 may further determine whether the vehicle operator is capable of resuming manual operation before terminating autonomous operation. If the vehicle operator is determined not be capable of resuming operation, the controller 204 may cause the vehicle to stop or take other appropriate action.

Exemplary Monitoring Method

Figure 4A:
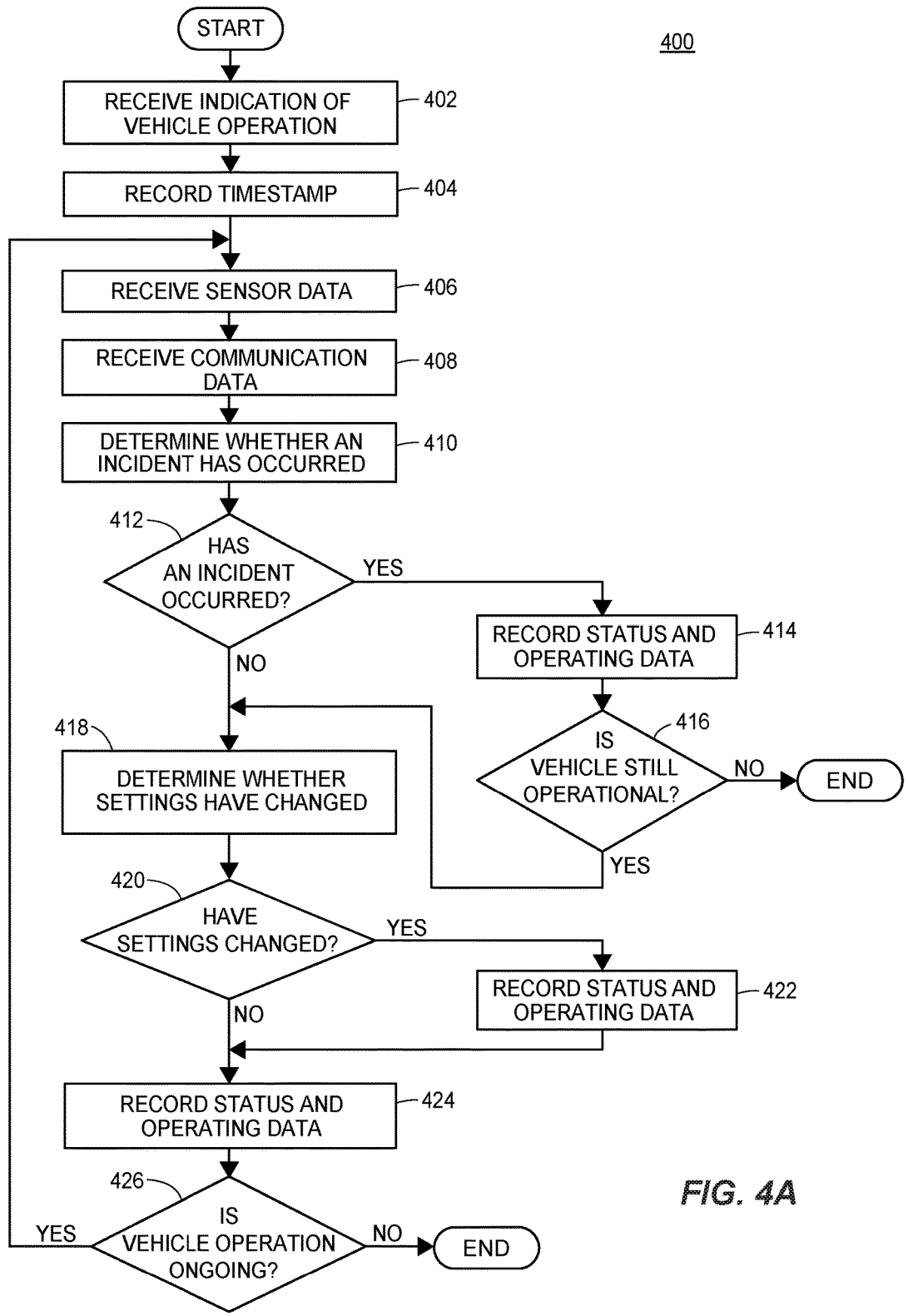
FIGS. 4A-B illustrate flow diagrams of an exemplary autonomous vehicle operation monitoring method in accordance with the presently described embodiments.

FIG. 4A is a flow diagram depicting an exemplary autonomous vehicle operation monitoring method 400, which may be implemented by the autonomous vehicle insurance system 100. The method 400 monitors the operation of the vehicle 108 and transmits information regarding the vehicle 108 to the server 140, which information may then be used to determine autonomous operation feature effectiveness or usage rates to assess risk and price vehicle insurance policy premiums. The method 400 may be used both for testing autonomous operation features in a controlled environment of for determining feature use by an insured party. In alternative embodiments, the method 400 may be implemented whenever the vehicle 108 is in operation (manual or autonomous) or only when the autonomous operation features are enabled. The method 400 may likewise be implemented as either a real-time process, in which information regarding the vehicle 108 is communicated to the server 140 while monitoring is ongoing, or as a periodic process, in which the information is stored within the vehicle 108 and communicated to the server 140 at intervals (e.g., upon completion of a trip or when an incident occurs). In some embodiments, the method 400 may communicate with the server 140 in real-time when certain conditions exist (e.g., when a sufficient data connection through the network 130 exists or when no roaming charges would be incurred).

The method 400 may begin at block 402 when the controller 204 receives an indication of vehicle operation. The indication may be generated when the vehicle 108 is started or when an autonomous operation feature is enabled by the controller 204 or by input from the vehicle operator. In response to receiving the indication, the controller 204 may create a timestamp at block 404. The timestamp may include information regarding the date, time, location, vehicle environment, vehicle condition, and autonomous operation feature settings or configuration information. The date and time may be used to identify one vehicle trip or one period of autonomous operation feature use, in addition to indicating risk levels due to traffic or other factors. The additional location and environmental data may include information regarding the position of the vehicle 108 from the GPS unit 206 and its surrounding environment (e.g., road conditions, weather conditions, nearby traffic conditions, type of road, construction conditions, presence of pedestrians, presence of other obstacles, availability of autonomous communications from external sources, etc.). Vehicle condition information may include information regarding the type, make, and model of the vehicle 108, the age or mileage of the vehicle 108, the status of vehicle equipment (e.g., tire pressure, non-functioning lights, fluid levels, etc.), or other information relating to the vehicle 108. In some embodiments, the timestamp may be recorded on the client device 114, the mobile device 110, or the server 140.

The autonomous operation feature settings may correspond to information regarding the autonomous operation features, such as those described above with reference to the autonomous vehicle operation method 300. The autonomous operation feature configuration information may correspond to information regarding the number and type of the sensors 120, the disposition of the sensors 120 within the vehicle 108, the one or more autonomous operation features (e.g., the autonomous vehicle operation application 232 or the software routines 240), autonomous operation feature control software, versions of the software applications 230 or routines 240 implementing the autonomous operation features, or other related information regarding the autonomous operation features. For example, the configuration information may include the make and model of the vehicle 108 (indicating installed sensors 120 and the type of on-board computer 114), an indication of a malfunctioning or obscured sensor 120 in part of the vehicle 108, information regarding additional after-market sensors 120 installed within the vehicle 108, a software program type and version for a control program installed as an application 230 on the on-board computer 114, and software program types and versions for each of a plurality of autonomous operation features installed as applications 230 or routines 240 in the program memory 208 of the on-board computer 114.

During operation, the sensors 120 may generate sensor data regarding the vehicle 108 and its environment. In some embodiments, one or more of the sensors 120 may preprocess the measurements and communicate the resulting processed data to the on-board computer 114. The controller 204 may receive sensor data from the sensors 120 at block 406. The sensor data may include information regarding the vehicle's position, speed, acceleration, direction, and responsiveness to controls. The sensor data may further include information regarding the location and movement of obstacles or obstructions (e.g., other vehicles, buildings, barriers, pedestrians, animals, trees, or gates), weather conditions (e.g., precipitation, wind, visibility, or temperature), road conditions (e.g., lane markings, potholes, road material, traction, or slope), signs or signals (e.g., traffic signals, construction signs, building signs or numbers, or control gates), or other information relating to the vehicle's environment. In some embodiments, sensors 120 may indicate the number of passengers within the vehicle 108, including an indication of whether the vehicle is entirely empty.

In addition to receiving sensor data from the sensors 120, in some embodiments the controller 204 may receive autonomous communication data from the communication component 122 or the communication module 220 at block 408. The communication data may include information from other autonomous vehicles (e.g., sudden changes to vehicle speed or direction, intended vehicle paths, hard braking, vehicle failures, collisions, or maneuvering or stopping capabilities), infrastructure (road or lane boundaries, bridges, traffic signals, control gates, or emergency stopping areas), or other external sources (e.g., map databases, weather databases, or traffic and accident databases). The communication data may be combined with the sensor data received at block 406 to obtain a more robust understanding of the vehicle environment. For example, the server 140 or the controller 204 may combine sensor data indicating frequent changes in speed relative to tachometric data with map data relating to a road upon which the vehicle 108 is traveling to determine that the vehicle 108 is in an area of hilly terrain. As another example, weather data indicating recent snowfall in the vicinity of the vehicle 108 may be combined with sensor data indicating frequent slipping or low traction to determine that the vehicle 108 is traveling on a snow-covered or icy road.

At block 410, the controller 204 may process the sensor data, the communication data, and the settings or configuration information to determine whether an incident has occurred. As used herein, an "incident" is an occurrence during operation of an autonomous vehicle outside of normal safe operating conditions, such that one or more of the following occurs: (i) there is an interruption of vehicle operation, (ii) there is damage to the vehicle or other property, (iii) there is injury to a person, and/or (iv) the conditions require action to be taken by a vehicle operator, autonomous operation feature, pedestrian, or other party to avoid damage or injury. Incidents may include collisions, hard braking, hard acceleration, evasive maneuvering, loss of traction, detection of objects within a threshold distance from the vehicle 108, alerts presented to the vehicle operator, component failure, inconsistent readings from sensors 120, or attempted unauthorized access to the on-board computer by external sources. Incidents may also include accidents, vehicle breakdowns, flat tires, empty fuel tanks, or medical emergencies. In some embodiments, the controller 204 may anticipate or project an expected incident based upon sensor or external data, allowing the controller 204 to send control signals to minimize the negative effects of the incident. For example, the controller 204 may cause the vehicle 108 to slow and move to the shoulder of a road immediately before running out of fuel. As another example, adjustable seats within the vehicle 108 may be adjusted to better position vehicle occupants in anticipation of a collision.

When an incident is determined to have occurred at block 412, information regarding the incident and the vehicle status may be recorded at block 414, either in the data storage 228 or the database 146. The information recorded at block 414 may include sensor data, communication data, and settings or configuration information prior to, during, and immediately following the incident. The information may further include a determination of whether the vehicle 108 has continued operating (either autonomously or manually) or whether the vehicle 108 is capable of continuing to operate in compliance with applicable safety and legal requirements. If the controller 204 determines that the vehicle 108 has discontinued operation or is unable to continue operation at block 416, the method 400 may terminate. If the vehicle 108 continues operation, then the method 400 may continue at block 418.

Figure 4B:
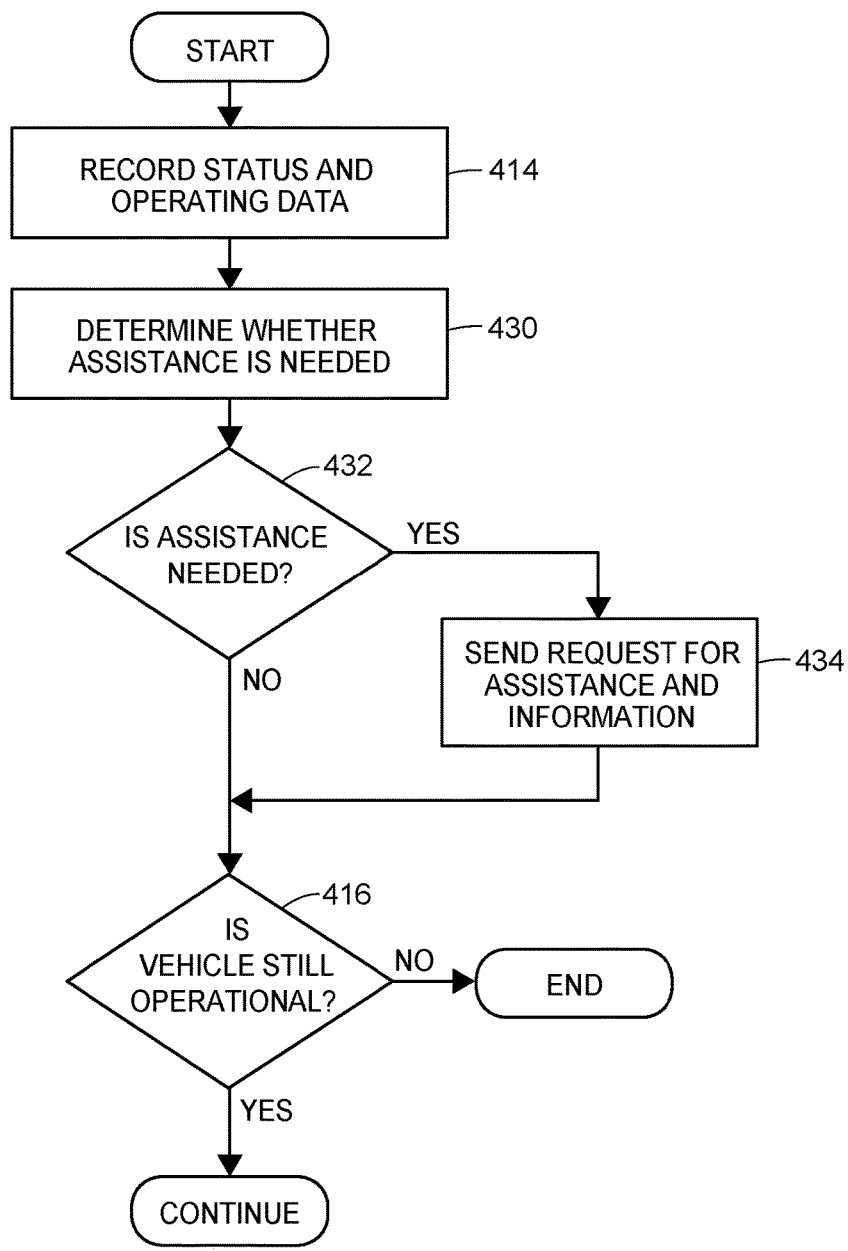

FIG. 4B illustrates an alternative portion of the method 400 following an incident. When an incident is determined to have occurred at block 412, the controller 204 or the server 140 may record status and operating information at block 414, as above. In some instances, the incident may interrupt communication between the vehicle 108 and the server 140 via network 130, such that not all information typically recorded will be available for recordation and analysis by the server 140. Based upon the data recorded in block 414, the server 140 or the controller 204 may determine whether assistance may be needed at the location of the vehicle 108 at block 430. For example, the controller may determine that a head-on collision has occurred based on sensor data (e.g., airbag deployment, automatic motor shut-off, LIDAR data indicating a collision, etc.) and may further determine based on information regarding the speed of the vehicle 108 and other information that medical, police, and/or towing services will be necessary. The determination that assistance is needed at block 430 may further include a determination of types of assistance needed (e.g., police, ambulance, fire, towing, vehicle maintenance, fuel delivery, etc.). The determination at block 430 may include analysis of the type of incident, the sensor data regarding the incident (e.g., images from outward facing or inward facing cameras installed within the vehicle, identification of whether any passengers were present within the vehicle, determination of whether any pedestrians or passengers in other vehicles were involved in the incident, etc.). The determination of whether assistance is needed at block 430 may further include information regarding the vehicle status determined at block 414.

In some embodiments, the determination at block 430 may be supplemented by a verification attempt, such as a phone call or communication through the on-board computer 114. Where the verification attempt indicates assistance is required or communication attempts fail, the server 140 or controller 204 would then determine that assistance is needed, as described above. For example, when assistance is determined to be needed at block 430 following an accident involving the vehicle 108, the server 140 may direct an automatic telephone call to a mobile telephone number associated with the vehicle 108 or the vehicle operator. If no response is received, or if the respondent indicates assistance is required, the server 140 may proceed to cause a request for assistance to be generated.

When assistance is determined to be needed at block 432, the controller 204 or the server 140 may send a request for assistance at block 434. The request may include information regarding the vehicle 108, such as the vehicle's location, the type of assistance required, other vehicles involved in the incident, the pedestrians involved in the incident, vehicle operators or passengers involved in the incident, and/or other relevant information. The request for assistance may include telephonic, data, or other requests to one or more emergency or vehicular service providers (e.g., local police, fire departments, state highway patrols, emergency medical services, public or private ambulance services, hospitals, towing companies, roadside assistance services, vehicle rental services, local claims representative offices, etc.). After sending a request for assistance at block 434 or when assistance is determined not to be needed at block 432, the controller 204 or the server 140 may next determine whether the vehicle is operational at block 416, as described above. The method 400 may then end or continue as indicated in FIG. 4A.

In some embodiments, the controller 204 may further determine information regarding the likely cause of a collision or other incident. Alternatively, or additionally, the server 140 may receive information regarding an incident from the on-board computer 114 and determine relevant additional information regarding the incident from the sensor data. For example, the sensor data may be used to determine the points of impact on the vehicle 108 and another vehicle involved in a collision, the relative velocities of each vehicle, the road conditions at the time of the incident, and the likely cause or the party likely at fault. This information may be used to determine risk levels associated with autonomous vehicle operation, as described below, even where the incident is not reported to the insurer.

At block 418, the controller 204 may determine whether a change or adjustment to one or more of the settings or configuration of the autonomous operation features has occurred. Changes to the settings may include enabling or disabling an autonomous operation feature or adjusting the feature's parameters (e.g., resetting the speed on an adaptive cruise control feature). If the settings or configuration are determined to have changed, the new settings or configuration may be recorded at block 422, either in the data storage 228 or the database 146.

At block 424, the controller 204 may record the operating data relating to the vehicle 108 in the data storage 228 or communicate the operating data to the server 140 via the network 130 for recordation in the database 146. The operating data may include the settings or configuration information, the sensor data, and the communication data discussed above, as well as data regarding control decisions generated by one or more autonomous operation features, as discussed below. In some embodiments, operating data related to normal autonomous operation of the vehicle 108 may be recorded. In other embodiments, only operating data related to incidents of interest may be recorded, and operating data related to normal operation may not be recorded. In still other embodiments, operating data may be stored in the data storage 228 until a sufficient connection to the network 130 is established, but some or all types of incident information may be transmitted to the server 140 using any available connection via the network 130.

At block 426, the controller 204 may determine whether the vehicle 108 is continuing to operate. In some embodiments, the method 400 may terminate when all autonomous operation features are disabled, in which case the controller 204 may determine whether any autonomous operation features remain enabled at block 426. When the vehicle 108 is determined to be operating (or operating with at least one autonomous operation feature enabled) at block 426, the method 400 may continue through blocks 406-426 until vehicle operation has ended. When the vehicle 108 is determined to have ceased operating (or is operating without autonomous operation features enabled) at block 426, the controller 204 may record the completion of operation at block 428, either in the data storage 228 or the database 146. In some embodiments, a second timestamp corresponding to the completion of vehicle operation may likewise be recorded, as above.

Exemplary Evaluation Methods

Figure 5:
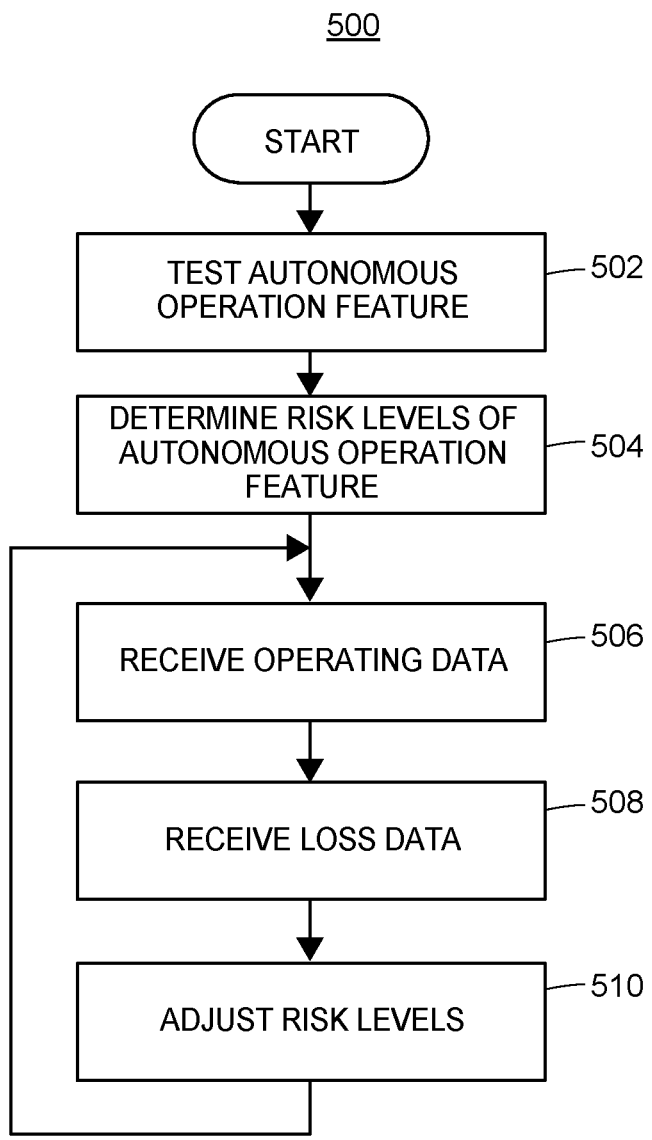
FIG. 5 illustrates a flow diagram of an exemplary autonomous operation feature evaluation method for determining the effectiveness of autonomous operation features in accordance with the presently described embodiments.

FIG. 5 illustrates a flow diagram of an exemplary autonomous operation feature evaluation method 500 for determining the effectiveness of autonomous operation features, which may be implemented by the autonomous vehicle insurance system 100. The method 500 begins by monitoring and recording the responses of an autonomous operation feature in a test environment at block 502. The test results are then used to determine a plurality of risk levels for the autonomous operation feature corresponding to the effectiveness of the feature in situations involving various conditions, configurations, and settings at block 504. Once a baseline risk profile of the plurality of risk levels has been established at block 504, the method 500 may refine or adjust the risk levels based upon operating data and actual losses for insured autonomous vehicles operation outside the test environment in blocks 506-510. Although FIG. 5 shows the method for only one autonomous operation feature, it should be understood that the method 500 may be performed to evaluate each of any number of autonomous operation features or combinations of autonomous operation features. In some embodiments, the method 500 may be implemented for a plurality of autonomous operation features concurrently on multiple servers 140 or at different times on one or more servers 140.

At block 502, the effectiveness of an autonomous operation feature is tested in a controlled testing environment by presenting test conditions and recording the responses of the feature. The testing environment may include a physical environment in which the autonomous operation feature is tested in one or more vehicles 108. Additionally, or alternatively, the testing environment may include a virtual environment implemented on the server 140 or another computer system in which the responses of the autonomous operation feature are simulated. Physical or virtual testing may be performed for a plurality of vehicles 108 and sensors 120 or sensor configurations, as well as for multiple settings of the autonomous operation feature. In some embodiments, the compatibility or incompatibility of the autonomous operation feature with vehicles 108, sensors 120, communication units 122, on-board computers 114, control software, or other autonomous operation features may be tested by observing and recording the results of a plurality of combinations of these with the autonomous operation feature. For example, an autonomous operation feature may perform well in congested city traffic conditions, but that will be of little use if it is installed in an automobile with control software that operates only above 30 miles per hour. Additionally, some embodiments may further test the response of autonomous operation features or control software to attempts at unauthorized access (e.g., computer hacking attempts), which results may be used to determine the stability or reliability of the autonomous operation feature or control software.

The test results may be recorded by the server 140. The test results may include responses of the autonomous operation feature to the test conditions, along with configuration and setting data, which may be received by the on-board computer 114 and communicated to the server 140. During testing, the on-board computer 114 may be a special-purpose computer or a general-purpose computer configured for generating or receiving information relating to the responses of the autonomous operation feature to test scenarios. In some embodiments, additional sensors may be installed within the vehicle 108 or in the vehicle environment to provide additional information regarding the response of the autonomous operation feature to the test conditions, which additional sensors may not provide sensor data to the autonomous operation feature.

In some embodiments, new versions of previously tested autonomous operation features may not be separately tested, in which case the block 502 may not be present in the method 500. In such embodiments, the server 140 may determine the risk levels associated with the new version by reference to the risk profile of the previous version of the autonomous operation feature in block 504, which may be adjusted based upon actual losses and operating data in blocks 506-510. In other embodiments, each version of the autonomous operation feature may be separately tested, either physically or virtually. Alternatively, or additionally, a limited test of the new version of the autonomous operation feature may be performed and compared to the test results of the previous version, such that additional testing may not be performed when the limited test results of the new version are within a predetermined range based upon the test results of the previous version.

Figure 6:
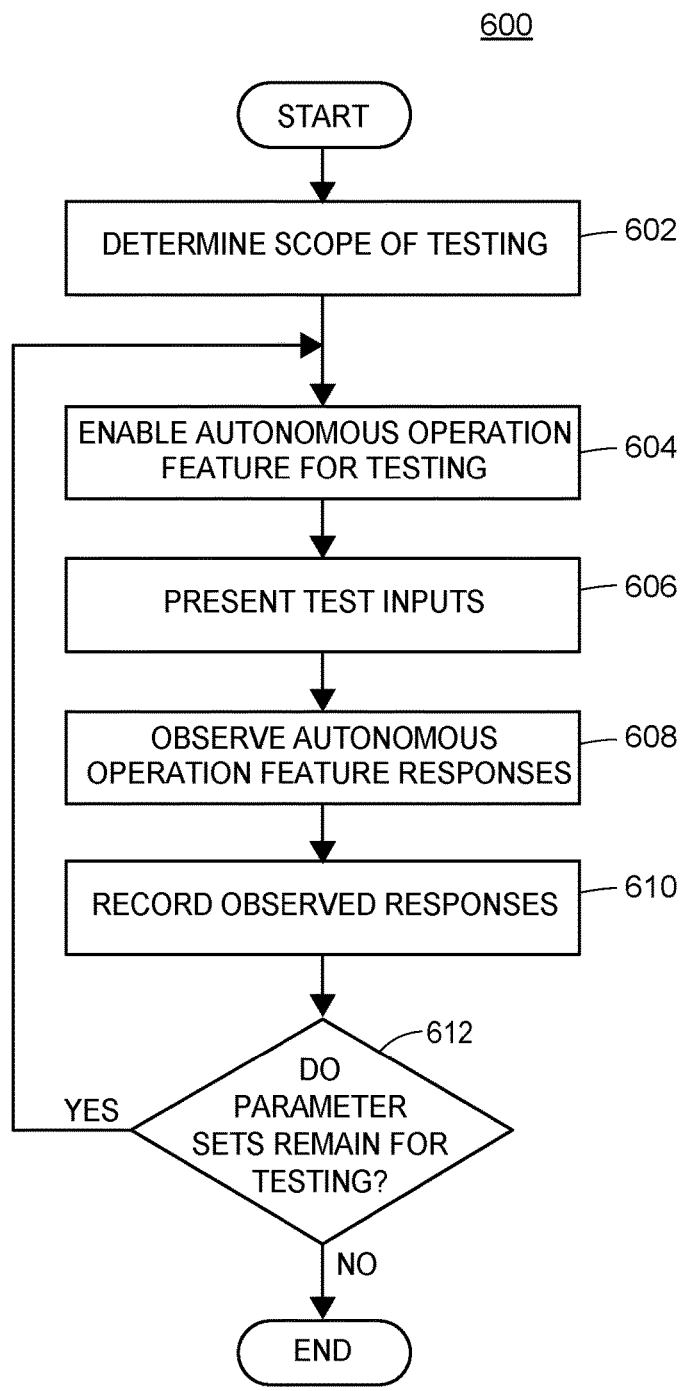
FIG. 6 illustrates a flow diagram of an exemplary autonomous operation feature testing method for presenting test conditions to an autonomous operation feature and observing and recording responses to the test conditions in accordance with the presently described embodiments.

FIG. 6 illustrates a flow diagram of an exemplary autonomous operation feature testing method 600 for presenting test conditions to an autonomous operation feature and observing and recording responses to the test conditions in accordance with the method 500. Although the method 600 is illustrated for one autonomous operation feature, it should be understood that the exemplary method 600 may be performed to test any number of features or combinations of features. At block 602, the server 140 may determine the scope of the testing based upon the autonomous operation feature and the availability of test results for related or similar autonomous operation features (e.g., previous versions of the feature). The scope of the testing may include parameters such as configurations, settings, vehicles 108, sensors 120, communication units 122, on-board computers 114, control software, other autonomous operation features, or combinations of these parameters to be tested.

At block 604, the autonomous operation feature is enabled within a test system with a set of parameters determined in block 602. The test system may be a vehicle 108 or a computer simulation, as discussed above. The autonomous operation feature or the test system may be configured to provide the desired parameter inputs to the autonomous operation feature. For example, the controller 204 may disable a number of sensors 120 or may provide only a subset of available sensor data to the autonomous operation feature for the purpose of testing the feature's response to certain parameters.

At block 606, test inputs are presented to the autonomous operation feature, and responses of the autonomous operation feature are observed at block 608. The test inputs may include simulated data presented by the on-board computer 114 or sensor data from the sensors 120 within the vehicle 108. In some embodiments, the vehicle 108 may be controlled within a physical test environment by the on-board computer 114 to present desired test inputs through the sensors 120. For example, the on-board computer 114 may control the vehicle 108 to maneuver near obstructions or obstacles, accelerate, or change directions to trigger responses from the autonomous operation feature. The test inputs may also include variations in the environmental conditions of the vehicle 108, such as by simulating weather conditions that may affect the performance of the autonomous operation feature (e.g., snow or ice cover on a roadway, rain, or gusting crosswinds, etc.).

In some embodiments, additional vehicles may be used to test the responses of the autonomous operation feature to moving obstacles. These additional vehicles may likewise be controlled by on-board computers or remotely by the server 140 through the network 130. In some embodiments, the additional vehicles may transmit autonomous communication information to the vehicle 108, which may be received by the communication component 122 or the communication unit 220 and presented to the autonomous operation feature by the on-board computer 114. Thus, the response of the autonomous operation feature may be tested with and without autonomous communications from external sources. The responses of the autonomous operation feature may be observed as output signals from the autonomous operation feature to the on-board computer 114 or the vehicle controls. Additionally, or alternatively, the responses may be observed by sensor data from the sensors 120 and additional sensors within the vehicle 108 or placed within the vehicle environment.

At block 610, the observed responses of the autonomous operation feature are recorded for use in determining effectiveness of the feature. The responses may be recorded in the data storage 228 of the on-board computer 114 or in the database 146 of the server 140. If the responses are stored on the on-board computer 114 during testing, the results may be communicated to the server 140 via the network either during or after completion of testing.

At block 612, the on-board computer 114 or the server 140 may determine whether the additional sets of parameters remain for which the autonomous operation feature is to be tested, as determined in block 602. When additional parameter sets are determined to remain at block 612, they are separately tested according to blocks 604-610. When no additional parameter sets are determined to exist at block 612, the method 600 terminates.

Although the method 600 is discussed above as testing the autonomous (and/or semi-autonomous) operation features in a test vehicle operating within a test environment, it should be understood that the exemplary method 600 may be similarly performed in an uncontrolled environment (i.e., on public roadways) or in a virtual environment. Testing of autonomous features within a virtual environment may include the presentation of electrical signals mimicking signals generated by one or more sensors in a plurality of operating scenarios at block 606. For example, a control unit or on-board computer 114 removed from a vehicle may be connected to one or more sensor input simulators (e.g., a computer or computer-controlled signal generator) that present input signals to the control unit or on-board computer that correspond to signals that would be received from the sensors 120 in the vehicle 108 under certain conditions. In such case, the same or another computer may be connected to the control unit or on-board computer 114 to receive and record the control outputs determined by the one or more autonomous operation features in response to the simulated sensor input at blocks 608 and 610.

Additionally, or alternatively, the virtual test environment may include a simulation of an autonomous (and/or semi-autonomous) operation feature running on a general-purpose or special-purpose computer system. In such an embodiment, the autonomous operation feature may include one or more software routines, processes, applications, or modules that implement the autonomous operation feature to generate control signals for a vehicle when executed on a general-purpose or special-purpose processor. For example, an adaptive cruise control feature may include a software routine to monitor the speed of the vehicle using a combination of speedometer and other sensor data, as well as a software routine to determine the distance of the vehicle from obstacles or other vehicles in the vehicle's path using LIDAR and autonomous communication data. The adaptive cruise control feature may further include a control software routine to determine adjustments to the vehicle's speed to maintain a safe distance from other vehicles and obstacles then generate a control signal to maintain or adjust the throttle of the vehicle. In a virtual test environment, the software routines of the autonomous operation feature may be executed on a processor of a computer system not connected to any vehicle, in which case test input signals simulating signals from sensors within a vehicle may be presented to the software routines to test the routines' responses. Thus, a process of the computer system may execute instructions causing the processor to access a set of simulated sensor test input signals at block 606, determine a response (such as one or more output test signals) of the autonomous operation feature based on the executable instructions representing one or more software routines of the autonomous operation feature at block 608, and record the determined response at block 610.

As the software routines of the autonomous operation feature are not directly connected to a vehicle to control the vehicle's operation during virtual testing, virtual testing may further include predicting a response of a vehicle to output test signals generated by the software routines of the tested autonomous operation feature. The simulated sensor inputs and/or test input signals may include sets of data corresponding to generated or recorded signals from a plurality of sensors. In some embodiments, the computer system may access a first set of sensor data and sequentially update the sensor data using the determined responses of the simulated autonomous operation feature. Thus, the test input signals may include input signals stored in a database and accessed by a testing program or application for presentation to the software routines of the autonomous operation feature being tested. Additionally, or alternatively, the computer system may generate sensor input signals based on a simulation of a physical test environment and update the virtual test environment based on the determined responses of the autonomous operation features. In some embodiments, a virtual testing program or application may further control the virtual testing process and may simulate the operation of a virtual vehicle within a virtual test environment. The virtual test environment may include a computer simulation of an environment in which an autonomous vehicle may be expected to operate (e.g., a congested highway, a city street with multiple intersections, etc.). The virtual testing program or application may, thus, generate a simulation of the operation of the virtual vehicle in the virtual test environment, including vehicle attributes such as position, speed, or momentum. The virtual testing program may further simulate the presence or operation of other vehicles, traffic control devices, obstacles, pedestrians, or other relevant features of a vehicle environment. Based upon these simulated features of the virtual vehicle environment, one or more simulated sensor readings or data may be determined, which may further be used to determine one or more test input signals to the software routines of the autonomous operation feature. The virtual testing program or application may then present the test input signals to the software routines and cause test output signals to be generated in response to the test input signals. From these test output signals, the virtual testing program may then predict the response of the virtual vehicle to the test output signals, including the responses of the virtual vehicle in relation to other virtual vehicles or other features in the simulated virtual test environment.

In any of the foregoing virtual test environments, the input data may include sensor data recorded during operation of an autonomous (and/or semi-autonomous) vehicle 108, which may include operation by a vehicle operator or by other autonomous (and/or semi-autonomous) operation features. For example, a vehicle operator may choose to operate the vehicle 108 manually under some conditions (e.g., snow, fog, or construction), or the autonomous operation features may not support autonomous operation under such conditions. The sensors 120 of the vehicle 108 may, however, continue to collect and record data regarding the surrounding environment. The sensor data may then be used to simulate autonomous operation feature responses (i.e., the control signals the autonomous operation feature would have generated had it been in control of the vehicle). The data and responses may be stored or transmitted via the network 130, and the responses of the autonomous operation features may be determined at the time of operation or at a later time.

As discussed with reference to FIG. 5 and elsewhere herein, the effectiveness of one or more autonomous operation features may be further used to determine one or more risk levels or risk profiles associated with the autonomous operation features. Specifically, the test output responses generated by the software routines of the autonomous operation features or the predicted responses of the virtual vehicle to the test output responses may be compared with other similar virtual test data related to other autonomous operation features. Where available, actual observed operating data regarding the one or more other autonomous operation features disposed within a plurality of other vehicles operating outside the virtual test environment may also be compared with the virtual test data using known statistical modeling techniques. Additionally, actual loss data for vehicles operating outside the virtual test environment and having the other autonomous operating features may further be compared with the virtual test data to better assess the risk levels and risk profiles associated with the tested autonomous operating features.

It will be apparent that performance of the exemplary method 600 in a virtual test environment offers advantages in terms of cost and time. Once set up, hundreds or thousands of test scenarios may be automatically run to evaluate autonomous (and/or semi-autonomous) operation feature performance under a variety of conditions without input from a user or vehicle operator. For example, a new autonomous operation feature or a software update including a new version of an autonomous operation feature may be tested in a virtual test environment prior to installation within autonomous vehicles, allowing immediate adjustment of risk levels or risk profiles for vehicles using the new autonomous operation feature or version. In this way, adjustments to risks associated with autonomous operation features may be made without reference to actual loss data relating to the specific autonomous operation features. Such advantages must be weighed against the limitations of virtual testing, however, because the test results are limited by the quality of the virtual test environment. It will be readily apparent that responses from physical and virtual test environments may be combined in order to determine the performance and risk levels associated with autonomous operation features.

Referring again to FIG. 5, the server 140 may determine a baseline risk profile for the autonomous operation feature from the recorded test results at block 504, including a plurality of risk levels corresponding to a plurality of sets of parameters such as configurations, settings, vehicles 108, sensors 120, communication units 122, on-board computers 114, control software, other autonomous operation features, or combinations of these. The server 140 may determine the risk levels associated with the autonomous operation feature by implementing the feature evaluation application 142 to determine the effectiveness of the feature. In some embodiments, the server 140 may further implement the compatibility evaluation application 143 to determine the effectiveness of combinations of features based upon test results and other information. Additionally, or alternatively, in some embodiments, the baseline risk profile may not depend upon the type, make, model, year, or other aspect of the vehicle 108. In such embodiments, the baseline risk profile and adjusted risk profiles may correspond to the effectiveness or risk levels associated with the autonomous operation features across a range of vehicles, disregarding any variations in effectiveness or risk levels associated with operation of the features in different vehicles.

Figure 7:
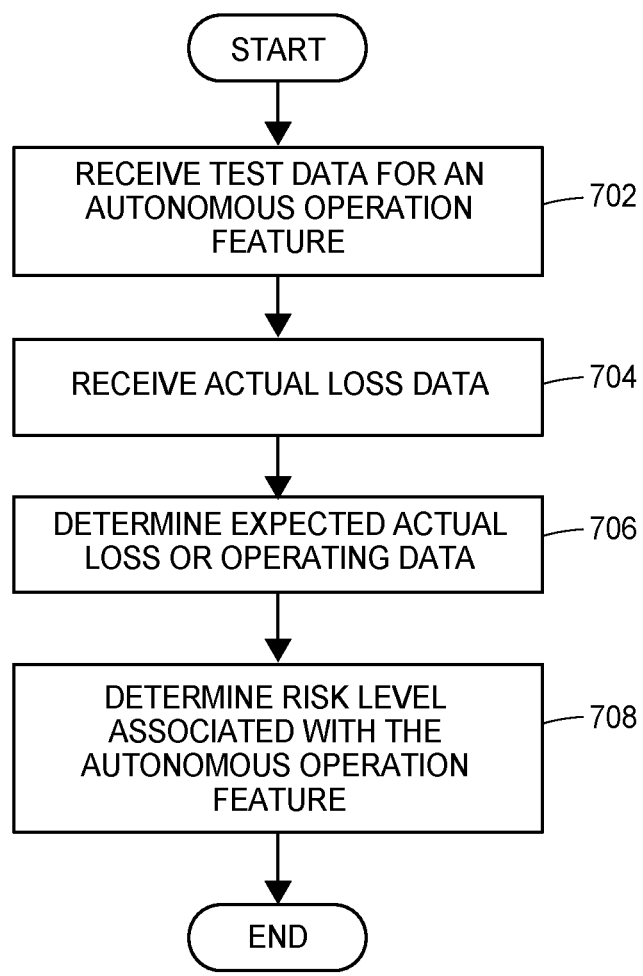
FIG. 7 illustrates a flow diagram of an exemplary autonomous feature evaluation method for determining the effectiveness of an autonomous operation feature under a set of environmental conditions, configuration conditions, and settings in accordance with the presently described embodiments.

FIG. 7 illustrates a flow diagram of an exemplary autonomous feature evaluation method 700 for determining the effectiveness of an autonomous operation feature under a set of environmental conditions, configuration conditions, and settings. Although the method 700 shows determination of a risk level associated with an autonomous operation feature within one set of parameters, it should be understood that the method 700 may be implemented for any number of sets of parameters for any number of autonomous features or combinations thereof.

At block 702, the server 140 receives the test result data observed and recorded in block 502 for the autonomous operation feature in conjunction with a set of parameters. In some embodiments, the rest result data may be received from the on-board computer 114 or from the database 146. In addition, in some embodiments, the server 140 may receive reference data for other autonomous operation features in use on insured autonomous vehicles at block 704, such as test result data and corresponding actual loss or operating data for the other autonomous operation features. The reference data received at block 704 may be limited to data for other autonomous operation features having sufficient similarity to the autonomous operation feature being evaluated, such as those performing a similar function, those with similar test result data, or those meeting a minimum threshold level of actual loss or operating data.

Using the test result data received at block 702 and the reference data received at block 704, the server 140 determines the expected actual loss or operating data for the autonomous operation feature at block 706. The server 140 may determine the expected actual loss or operating data using known techniques, such as regression analysis or machine learning tools (e.g., neural network algorithms or support vector machines). The expected actual loss or operating data may be determined using any useful metrics, such as expected loss value, expected probabilities of a plurality of collisions or other incidents, expected collisions per unit time or distance traveled by the vehicle, etc.

At block 708, the server 140 may further determine a risk level associated with the autonomous operation feature in conjunction with the set of parameters received in block 702. The risk level may be a metric indicating the risk of collision, malfunction, or other incident leading to a loss or claim against a vehicle insurance policy covering a vehicle in which the autonomous operation feature is functioning. The risk level may be defined in various alternative ways, including as a probability of loss per unit time or distance traveled, a percentage of collisions avoided, or a score on a fixed scale. In a preferred embodiment, the risk level is defined as an effectiveness rating score such that a higher score corresponds to a lower risk of loss associated with the autonomous operation feature.

Referring again to FIG. 5, the method 700 may be implemented for each relevant combination of an autonomous operation feature in conjunction with a set of parameters relating to environmental conditions, configuration conditions, and settings. It may be beneficial in some embodiments to align the expected losses or operating data metrics with loss categories for vehicle insurance policies. Once the baseline risk profile is determined for the autonomous operation feature, the plurality of risk levels in the risk profile may be updated or adjusted in blocks 506-510 using actual loss and operating data from autonomous vehicles operating in the ordinary course, viz. not in a test environment.

At block 506, the server 140 may receive operating data from one or more vehicles 108 via the network 130 regarding operation of the autonomous operation feature. The operating data may include the operating data discussed above with respect to monitoring method 400, including information regarding the vehicle 108, the vehicle's environment, the sensors 120, communications for external sources, the type and version of the autonomous operation feature, the operation of the feature, the configuration and settings relating to the operation of the feature, the operation of other autonomous operation features, control actions performed by the vehicle operator, or the location and time of operation. The operating data may be received by the server 140 from the on-board computer 114 or the mobile device 110 implementing the monitoring method 400 or from other sources, and the server 140 may receive the operating data either periodically or continually.

At block 508, the server 140 may receive data regarding actual losses on autonomous vehicles that included the autonomous operation feature. This information may include claims filed pursuant to insurance policies, claims paid pursuant to insurance policies, accident reports filed with government agencies, or data from the sensors 120 regarding incidents (e.g., collisions, alerts presented, etc.). This actual loss information may further include details such as date, time, location, traffic conditions, weather conditions, road conditions, vehicle speed, vehicle heading, vehicle operating status, autonomous operation feature configuration and settings, autonomous communications transmitted or received, points of contact in a collision, velocity and movements of other vehicles, or additional information relevant to determining the circumstances involved in the actual loss.

At block 510, the server 140 may process the information received at blocks 506 and 508 to determine adjustments to the risk levels determined at block 504 based upon actual loss and operating data for the autonomous operation feature. Adjustments may be necessary because of factors such as sensor failure, interference disrupting autonomous communication, better or worse than expected performance in heavy traffic conditions, etc. The adjustments to the risk levels may be made by methods similar to those used to determine the baseline risk profile for the autonomous operation feature or by other known methods (e.g., Bayesian updating algorithms). The updating procedure of blocks 506-510 may be repeatedly implemented periodically or continually as new data become available to refine and update the risk levels or risk profile associated with the autonomous operation feature. In subsequent iterations, the most recently updated risk profile or risk levels may be adjusted, rather than the initial baseline risk profile or risk levels determined in block 504.

Exemplary Autonomous Vehicle Insurance Risk and Price Determination Methods

Figure 8:
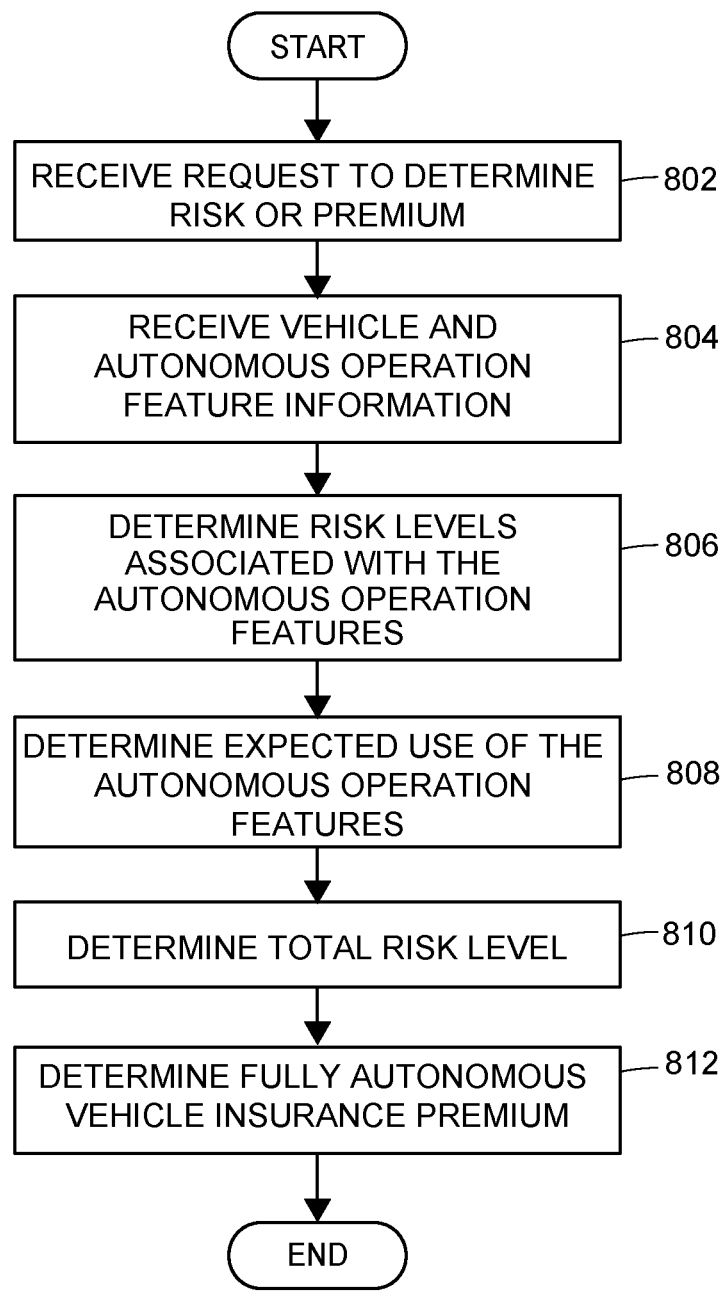
FIG. 8 illustrates a flow diagram depicting an exemplary embodiment of a fully autonomous vehicle insurance pricing method in accordance with the presently described embodiments.
Figure 9:
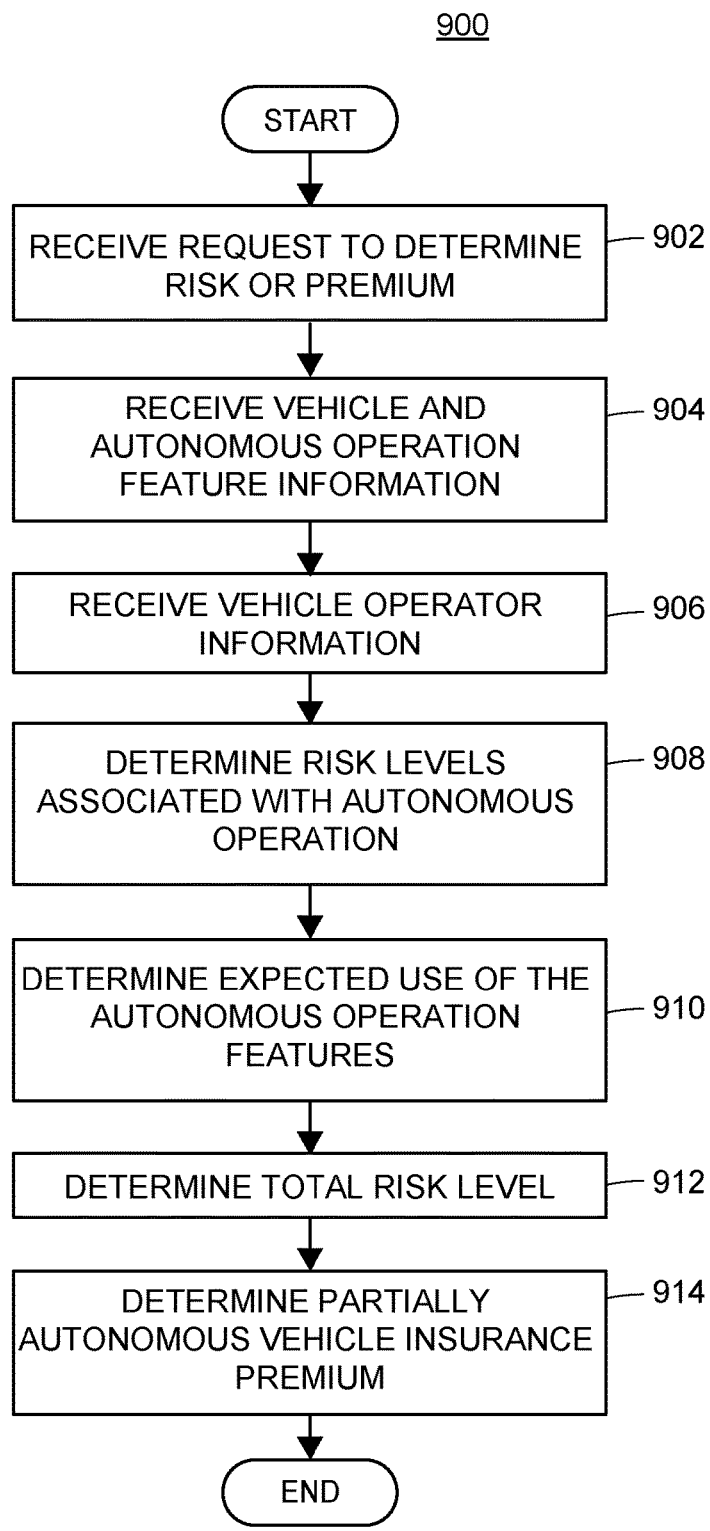
FIG. 9 illustrates a flow diagram depicting an exemplary embodiment of a partially autonomous vehicle insurance pricing method in accordance with the presently described embodiments.
Figure 10:
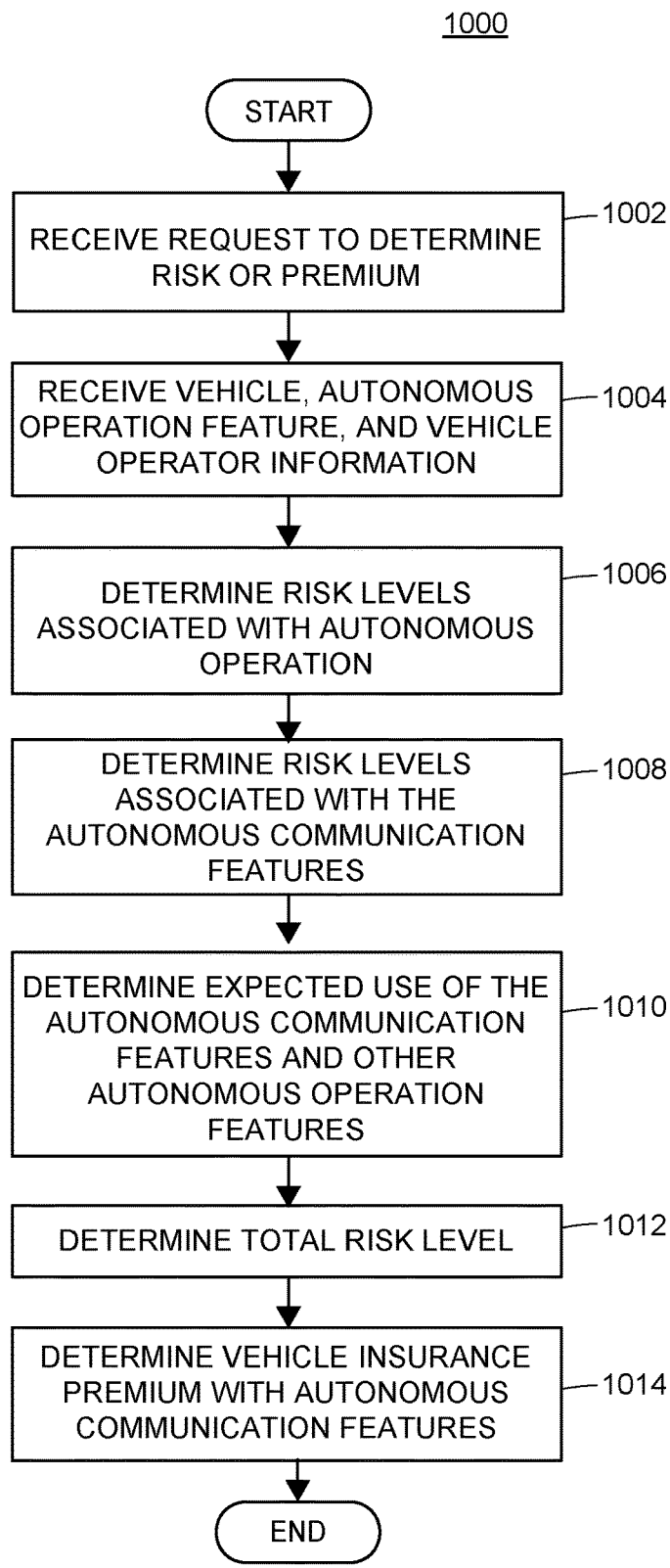
FIG. 10 illustrates a flow diagram depicting an exemplary embodiment of an autonomous vehicle insurance pricing method for determining risk and premiums for vehicle insurance policies covering autonomous vehicles with autonomous communication features in accordance with the presently described embodiments.

The risk profiles or risk levels associated with one or more autonomous operation features determined above may be further used to determine risk categories or premiums for vehicle insurance policies covering autonomous vehicles. FIGS. 8-10 illustrate flow diagrams of exemplary embodiments of methods for determining risk associated with an autonomous vehicle or premiums for vehicle insurance policies covering an autonomous vehicle. In some embodiments or under some conditions, the autonomous vehicle may be a fully autonomous vehicle operating without a vehicle operator's input or presence. In other embodiments or under other conditions, the vehicle operator may control the vehicle with or without the assistance of the vehicle's autonomous operation features. For example, the vehicle may be fully autonomous only above a minimum speed threshold or may require the vehicle operator to control the vehicle during periods of heavy precipitation. Alternatively, the autonomous vehicle may perform all relevant control functions using the autonomous operation features under all ordinary operating conditions. In still further embodiments, the vehicle 108 may operate in either a fully or a partially autonomous state, while receiving or transmitting autonomous communications.

Where the vehicle 108 operates only under fully autonomous control by the autonomous operation features under ordinary operating conditions or where control by a vehicle operator may be disregarded for insurance risk and price determination, the method 800 may be implemented to determine the risk level or premium associated with an insurance policy covering the autonomous vehicle. Where the vehicle 108 may be operated manually under some conditions, the method 900 may be implemented to determine the risk level or premium associated with an insurance policy covering the autonomous vehicle, including a determination of the risks associated with the vehicle operator performing manual vehicle operation. Where the vehicle 108 may be operated with the assistance of autonomous communications features, the method 1000 may be implemented to determine the risk level or premium associated with an insurance policy covering the autonomous vehicle, including a determination of the expected use of autonomous communication features by external sources in the relevant environment of the vehicle 108 during operation of the vehicle 108.

FIG. 8 illustrates a flow diagram depicting an exemplary embodiment of a fully autonomous vehicle insurance pricing method 800, which may be implemented by the autonomous vehicle insurance system 100. The method 800 may be implemented by the server 140 to determine a risk level or price for a vehicle insurance policy covering a fully autonomous vehicle based upon the risk profiles of the autonomous operation features in the vehicle. It is important to note that the risk category or price is determined without reference to factors relating to risks associated with a vehicle operator (e.g., age, experience, prior history of vehicle operation). Instead, the risk and price may be determined based upon the vehicle 108, the location and use of the vehicle 108, and the autonomous operation features of the vehicle 108.

At block 802, the server 140 receives a request to determine a risk category or premium associated with a vehicle insurance policy for a fully autonomous vehicle. The request may be caused by a vehicle operator or other customer or potential customer of an insurer, or by an insurance broker or agent. The request may also be generated automatically (e.g., periodically for repricing or renewal of an existing vehicle insurance policy). In some instances, the server 140 may generate the request upon the occurrence of specified conditions.

At block 804, the server 140 receives information regarding the vehicle 108, the autonomous operation features installed within the vehicle 108, and anticipated or past use of the vehicle 108. The information may include vehicle information (e.g., type, make, model, year of production, safety features, modifications, installed sensors, on-board computer information, etc.), autonomous operation features (e.g., type, version, connected sensors, compatibility information, etc.), and use information (e.g., primary storage location, primary use, primary operating time, past use as monitored by an on-board computer or mobile device, past use of one or more vehicle operators of other vehicles, etc.). The information may be provided by a person having an interest in the vehicle, a customer, or a vehicle operator, and/or the information may be provided in response to a request for the information by the server 140. Alternatively, or additionally, the server 140 may request or receive the information from one or more databases communicatively connected to the server 140 through the network 130, which may include databases maintained by third parties (e.g., vehicle manufacturers or autonomous operation feature manufacturers). In some embodiments, information regarding the vehicle 108 may be excluded, in which case the risk or premium determinations below may likewise exclude the information regarding the vehicle 108.

At block 806, the server 140 may determine the risk profile or risk levels associated with the vehicle 108 based upon the vehicle information and the autonomous operation feature information received at block 804. The risk levels associated with the vehicle 108 may be determined as discussed above with respect to the method 500 and/or may be determined by looking up in a database the risk level information previously determined. In some embodiments, the information regarding the vehicle may be given little or no weight in determining the risk levels. In other embodiments, the risk levels may be determined based upon a combination of the vehicle information and the autonomous operation information. As with the risk levels associated with the autonomous operation features discussed above, the risk levels associated with the vehicle may correspond to the expected losses or incidents for the vehicle based upon its autonomous operation features, configuration, settings, and/or environmental conditions of operation. For example, a vehicle may have a risk level of 98% effectiveness when on highways during fair weather days and a risk level of 87% effectiveness when operating on city streets at night in moderate rain. A plurality of risk levels associated with the vehicle may be combined with estimates of anticipated vehicle use conditions to determine the total risk associated with the vehicle.

At block 808, the server 140 may determine the expected use of the vehicle 108 in the relevant conditions or with the relevant settings to facilitate determining a total risk for the vehicle 108. The server 140 may determine expected vehicle use based upon the use information received at block 804, which may include a history of prior use recorded by the vehicle 108 and/or another vehicle. For example, recorded vehicle use information may indicate that 80% of vehicle use occurs during weekday rush hours in or near a large city, that 20% occurs on nights and weekends. From this information, the server 140 may determine that 80% (75%, 90%, etc.) of the expected use of the vehicle 108 is in heavy traffic and that 20% (25%, 10%, etc.) is in light traffic. The server 140 may further determine that vehicle use is expected to be 60% on limited access highways and 40% on surface streets. Based upon the vehicle's typical storage location, the server 140 may access weather data for the location to determine expected weather conditions during the relevant times. For example, the server 140 may determine that 20% of the vehicle's operation on surface streets in heavy traffic will occur in rain or snow. In a similar manner, the server 140 may determine a plurality of sets of expected vehicle use parameters corresponding to the conditions of use of the vehicle 108. These conditions may further correspond to situations in which different autonomous operation features may be engaged and/or may be controlling the vehicle. Additionally, or alternatively, the vehicle use parameters may correspond to different risk levels associated with the autonomous operation features. In some embodiments, the expected vehicle use parameters may be matched to the most relevant vehicle risk level parameters, viz. the parameters corresponding to vehicle risk levels that have the greatest predictive effect and/or explanatory power.

At block 810, the server 140 may use the risk levels determined at block 806 and the expected vehicle use levels determined at block 808 to determine a total expected risk level. To this end, it may be advantageous to attempt to match the vehicle use parameters as closely as possible to the vehicle risk level parameters. For example, the server 140 may determine the risk level associated with each of a plurality of sets of expected vehicle use parameters. In some embodiments, sets of vehicle use parameters corresponding to zero or negligible (e.g., below a predetermined threshold probability) expected use levels may be excluded from the determination for computational efficiency. The server 140 may then weight the risk levels by the corresponding expected vehicle use levels, and aggregate the weighted risk levels to obtain a total risk level for the vehicle 108. In some embodiments, the aggregated weighted risk levels may be adjusted or normalized to obtain the total risk level for the vehicle 108. In some embodiments, the total risk level may correspond to a regulatory risk category or class of a relevant insurance regulator.

At block 812, the server 140 may determine one or more premiums for vehicle insurance policies covering the vehicle 108 based upon the total risk level determined at block 810. These policy premiums may also be determine based upon additional factors, such as coverage type and/or amount, expected cost to repair or replace the vehicle 108, expected cost per claim for liability in the locations where the vehicle 108 is typically used, discounts for other insurance coverage with the same insurer, and/or other factors unrelated to the vehicle operator. In some embodiments, the server 140 may further communicate the one or more policy premiums to a customer, broker, agent, or other requesting person or organization via the network 130. The server 140 may further store the one or more premiums in the database 146.

FIG. 9 illustrates a flow diagram depicting an exemplary embodiment of a partially autonomous vehicle insurance pricing method 900, which may be implemented by the autonomous vehicle insurance system 100 in a manner similar to that of the method 800. The method 900 may be implemented by the server 140 to determine a risk category and/or price for a vehicle insurance policy covering an autonomous vehicle based upon the risk profiles of the autonomous operation features in the vehicle and/or the expected use of the autonomous operation features. In addition to information regarding the vehicle 108 and the autonomous operation features, the method 900 includes information regarding the vehicle operator, including information regarding the expected use of the autonomous operation features and/or the expected settings of the features under various conditions. Such additional information is relevant where the vehicle operator may control the vehicle 108 under some conditions and/or may determine settings affecting the effectiveness of the autonomous operation features.

At block 902, the server 140 may receive a request to determine a risk category and/or premium associated with a vehicle insurance policy for an autonomous vehicle in a manner similar to block 802 described above. At block 904, the server 140 likewise receives information regarding the vehicle 108, the autonomous operation features installed within the vehicle 108, and/or anticipated or past use of the vehicle 108. The information regarding anticipated or past use of the vehicle 108 may include information regarding past use of one or more autonomous operation features, and/or settings associated with use of the features. For example, this may include times, road conditions, and/or weather conditions when autonomous operation features have been used, as well as similar information for past vehicle operation when the features have been disabled. In some embodiments, information regarding the vehicle 108 may be excluded, in which case the risk or premium determinations below may likewise exclude the information regarding the vehicle 108. At block 906, the server 140 may receive information related to the vehicle operator, including standard information of a type typically used in actuarial analysis of vehicle operator risk (e.g., age, location, years of vehicle operation experience, and/or vehicle operating history of the vehicle operator).

At block 908, the server 140 may determine the risk profile or risk levels associated with the vehicle 108 based upon the vehicle information and the autonomous operation feature information received at block 904. The risk levels associated with the vehicle 108 may be determined as discussed above with respect to the method 500 and/or as further discussed with respect to method 800.

At block 910, the server 140 may determine the expected manual and/or autonomous use of the vehicle 108 in the relevant conditions and/or with the relevant settings to facilitate determining a total risk for the vehicle 108. The server 140 may determine expected vehicle use based upon the use information received at block 904, which may include a history of prior use recorded by the vehicle 108 and/or another vehicle for the vehicle operator. Expected manual and autonomous use of the vehicle 108 may be determined in a manner similar to that discussed above with respect to method 800, but including an additional determination of the likelihood of autonomous and/or manual operation by the vehicle operation under the various conditions. For example, the server 140 may determine based upon past operating data that the vehicle operator manually controls the vehicle 108 when on a limited-access highway only 20% of the time in all relevant environments, but the same vehicle operator controls the vehicle 60% of the time on surface streets outside of weekday rush hours and 35% of the time on surface streets during weekday rush hours. These determinations may be used to further determine the total risk associated with both manual and/or autonomous vehicle operation.

At block 912, the server 140 may use the risk levels determined at block 908 and the expected vehicle use levels determined at block 910 to determine a total expected risk level, including both manual and autonomous operation of the vehicle 108. The autonomous operation risk levels may be determined as above with respect to block 810. The manual operation risk levels may be determined in a similar manner, but the manual operation risk may include risk factors related to the vehicle operator. In some embodiments, the manual operation risk may also be determined based upon vehicle use parameters and/or related autonomous operation feature risk levels for features that assist the vehicle operator in safely controlling the vehicle. Such features may include alerts, warnings, automatic braking for collision avoidance, and/or similar features that may provide information to the vehicle operator or take control of the vehicle from the vehicle operator under some conditions. These autonomous operation features may likewise be associated with different risk levels that depend upon settings selected by the vehicle operator. Once the risk levels associated with autonomous operation and manual operation under various parameter sets that have been weighted by the expected use levels, the total risk level for the vehicle and operator may be determined by aggregating the weighted risk levels. As above, the total risk level may be adjusted or normalized, and/or it may be used to determine a risk category or risk class in accordance with regulatory requirements.

At block 914, the server 140 may determine one or more premiums for vehicle insurance policies covering the vehicle 108 based upon the total risk level determined at block 812. As in method 800, additional factors may be included in the determination of the policy premiums, and/or the premiums may be adjusted based upon additional factors. The server 140 may further record the premiums or may transmit one or more of the policy premiums to relevant parties.

FIG. 10 illustrates a flow diagram depicting an exemplary embodiment of an autonomous vehicle insurance pricing method 1000 for determining risk and/or premiums for vehicle insurance policies covering autonomous vehicles with autonomous communication features, which may be implemented by the autonomous vehicle insurance system 100. The method 1000 may determine risk levels as without autonomous communication discussed above with reference to methods 800 and/or 900, then adjust the risk levels based upon the availability and effectiveness of communications between the vehicle 108 and external sources. Similar to environmental conditions, the availability of external sources such as other autonomous vehicles for communication with the vehicle 108 affects the risk levels associated with the vehicle 108. For example, use of an autonomous communication feature may significantly reduce risk associated with autonomous operation of the vehicle 108 only where other autonomous vehicles also use autonomous communication features to send and/or receive information.

At block 1002, the server 140 may receive a request to determine a risk category or premium associated with a vehicle insurance policy for an autonomous vehicle with one or more autonomous communication features in a manner similar to blocks 802 and/or 902 described above. At block 1004, the server 140 likewise receives information regarding the vehicle 108, the autonomous operation features installed within the vehicle 108 (including autonomous communication features), the vehicle operator, and/or anticipated or past use of the vehicle 108. The information regarding anticipated or past use of the vehicle 108 may include information regarding locations and times of past use, as well as past use of one or more autonomous communication features. For example, this may include locations, times, and/or details of communication exchanged by an autonomous communication feature, as well as information regarding past vehicle operation when no autonomous communication occurred. This information may be used to determine the past availability of external sources for autonomous communication with the vehicle 108, facilitating determination of expected future availability of autonomous communication as described below. In some embodiments, information regarding the vehicle 108 may be excluded, in which case the risk or premium determinations below may likewise exclude the information regarding the vehicle 108.

At block 1006, the server 140 may determine the risk profile or risk levels associated with the vehicle 108 based upon the vehicle information, the autonomous operation feature information, and/or the vehicle operator information received at block 1004. The risk levels associated with the vehicle 108 may be determined as discussed above with respect to the method 500 and as further discussed with respect to methods 800 and 900. At block 1008, the server 140 may determine the risk profile and/or risk levels associated with the vehicle 108 and/or the autonomous communication features. This may include a plurality of risk levels associated with a plurality of autonomous communication levels and/or other parameters relating to the vehicle 108, the vehicle operator, the autonomous operation features, the configuration and/or setting of the autonomous operation features, and/or the vehicle's environment. The autonomous communication levels may include information regarding the proportion of vehicles in the vehicle's environment that are in autonomous communication with the vehicle 108, levels of communication with infrastructure, types of communication (e.g., hard braking alerts, full velocity information, etc.), and/or other information relating to the frequency and/or quality of autonomous communications between the autonomous communication feature and the external sources.

At block 1010, the server 140 may then determine the expected use levels of the vehicle 108 in the relevant conditions, autonomous operation feature settings, and/or autonomous communication levels to facilitate determining a total risk for the vehicle 108. The server 140 may determine expected vehicle use based upon the use information received at block 1004, including expected levels of autonomous communication under a plurality of sets of parameters. For example, the server 140 may determine based upon past operating data that the 50% of the total operating time of the vehicle 108 is likely to occur in conditions where approximately a quarter of the vehicles utilize autonomous communication features, 40% of the total operating time is likely to occur in conditions where a negligible number of vehicles utilize autonomous communication features, and/or 10% is likely to occur in conditions where approximately half of vehicles utilize autonomous communication features. Of course, each of the categories in the preceding example may be further divided by other conditions, such as traffic levels, weather, average vehicle speed, presence of pedestrians, location, autonomous operation feature settings, and/or other parameters. These determinations may be used to further determine the total risk associated with autonomous vehicle operation including autonomous communication.

At block 1012, the server 140 may use the risk levels determined at block 1010 to determine a total expected risk level for the vehicle 108 including one or more autonomous communication features, in a similar manner to the determination described above in block 810. The server 140 may weight each of the risk levels corresponding to sets of parameters by the expected use levels corresponding to the same set of parameters. The weighted risk levels may then be aggregated using known techniques to determine the total risk level. As above, the total risk level may be adjusted or normalized, or it may be used to determine a risk category or risk class in accordance with regulatory requirements.

At block 1014, the server 140 may determine one or more premiums for vehicle insurance policies covering the vehicle 108 based upon the total risk level determined at block 1012. As in methods 800 and/or 900, additional factors may be included in the determination of the policy premiums, and/or the premiums may be adjusted based upon additional factors. The server 140 may further record the premiums and/or may transmit one or more of the policy premiums to relevant parties.

In any of the preceding embodiments, the determined risk level or premium associated with one or more insurance policies may be presented by the server 140 to a customer or potential customer as offers for one or more vehicle insurance policies. The customer may view the offered vehicle insurance policies on a display such as the display 202 of the mobile device 110, select one or more options, and/or purchase one or more of the vehicle insurance policies. The display, selection, and/or purchase of the one or more policies may be facilitated by the server 140, which may communicate via the network 130 with the mobile device 110 and/or another computer device accessed by the user.

Additionally, or alternatively, any of the preceding embodiments may determine or adjust vehicle insurance coverage types or levels (e.g., deductibles, coverage amounts, etc.) based upon use conditions and/or autonomous (and/or semi-autonomous) operation feature use, configuration, or settings. For example, deductibles or premiums for a level of vehicle insurance coverage for theft of a vehicle may be reduced for policies where a fully autonomous vehicle includes autonomous operation features capable of returning the vehicle if stolen. As another example, coverage levels of a vehicle insurance policy may vary based upon whether an autonomous vehicle contains any passengers or vehicle operators. Additionally, coverage types or levels may be adjusted based upon use levels of the autonomous operation features and/or information regarding a vehicle operator. For example, certain coverage types or levels may be unavailable to a vehicle operator (e.g., inexperienced drivers, drivers with extensive accident histories, etc.), except that such coverage may be available when certain autonomous operation features are enabled or activated. In some embodiments, vehicle operators who may be otherwise unable or legally prevented from operating a vehicle (e.g., due to blindness, physical disabilities, revocation of an operating license, etc.) may be insured for operation of an autonomous vehicle with certain autonomous operation features enabled.

Exemplary Methods of Providing Insurance Coverage

In one aspect, a computer-implemented method of adjusting or creating an insurance policy may be provided. The method may include: (1) capturing or gathering data, via a processor, to determine an autonomous or semi-autonomous technology or functionality associated with a specific vehicle; (2) comparing the received data, via the processor, to a stored baseline of vehicle data created from (a) actual accident data involving automobiles equipped with the autonomous or semi-autonomous technology or functionality, and/or (b) autonomous or semi-autonomous vehicle testing; (3) identifying (or assessing) accident or collision risk, via the processor, based upon an ability of the autonomous or semi-autonomous technology or functionality associated with the specific vehicle to make driving decisions and/or avoid or mitigate crashes; (4) adjusting or creating an insurance policy, via the processor, based upon the accident or collision risk identified that is based upon the ability of the autonomous or semi-autonomous technology or functionality associated with the specific vehicle; and/or (5) presenting on a display screen, or otherwise providing or communicating, all or a portion of (such as a monthly premium or discount) the insurance policy adjusted or created to a potential or existing customer, or an owner or operator of the specific vehicle equipped with the autonomous or semi-autonomous technology or functionality, for review, acceptance, and/or approval. The method may include additional, fewer, or alternative steps or actions, including those discussed elsewhere herein.

For instance, the method may include evaluating, via the processor, an effectiveness of the autonomous or semi-autonomous technology or functionality, and/or an associated artificial intelligence, in a test environment, and/or using real driving experience or information.

The identification (or assessment) of accident or collision risk performed by the processor may be dependent upon the extent of control and/or decision making that is assumed by the specific vehicle equipped with the autonomous or semi-autonomous technology or functionality, rather than the human driver. Additionally or alternatively, the identification (or assessment) of accident or collision risk may be dependent upon (a) the ability of the specific vehicle to use external information (such as vehicle-to-vehicle, vehicle-to-infrastructure, and/or infrastructure-to-vehicle wireless communication) to make driving decisions, and/or (b) the availability of such external information, such as may be determined by a geographical region (urban or rural) associated with the specific vehicle or vehicle owner.

Information regarding the autonomous or semi-autonomous technology or functionality associated with the specific vehicle, including factory-installed hardware and/or versions of computer instructions, may be wirelessly transmitted to a remote server associated with an insurance provider and/or other third party for analysis. The method may include remotely monitoring an amount or percentage of usage of the autonomous or semi-autonomous technology or functionality by the specific vehicle, and based upon such amount or percentage of usage, (a) providing feedback to the driver and/or insurance provider via wireless communication, and/or (b) adjusting insurance policies or premiums.

Data Acquisition

In one aspect, the present embodiments may relate to data acquisition. Data may be gathered via devices employing wireless communication technology, such as Bluetooth or other IEEE communication standards. In one embodiment, a Bluetooth enabled smartphone or mobile device, and/or an in-dash smart and/or communications device may collect data. The data associated with the vehicle, and/or vehicle or driver performance, that is gathered or collected at, or on, the vehicle may be wirelessly transmitted to a remote processor or server, such as a remote processor or server associated with an insurance provider. The mobile device 110 may receive the data from the on-board computer 114 or the sensors 120, and may transmit the received data to the server 140 via the network 130, and the data may be stored in the database 146. In some embodiments, the transmitted data may include real-time sensor data, a summary of the sensor data, processed sensor data, operating data, environmental data, communication data, or a log such data.

A. Vehicle Decision Making

Data may be generated by autonomous or semi-autonomous vehicles and/or vehicle mounted sensors (or smart sensors), and then collected by vehicle mounted equipment or processors, including Bluetooth devices, and/or an insurance provider remote processor or server. The data gathered may be used to analyze vehicle decision making. A processor may be configured to generate data on what an autonomous or semi-autonomous vehicle would have done in a given situation had the driver not taken over manual control/driving of the vehicle or alternative control actions not taken by the autonomous or semi-autonomous operation features. This type of control decision data (related to vehicle decision making) may be useful with respect to analyzing hypothetical situations.

In one embodiment, an application, or other computer or processor instructions, may interact with a vehicle to receive and/or retrieve data from autonomous or semi-autonomous processors and sensors. The data retrieved may be related to radar, cameras, sensor output, computer instructions or application output. Other data related to a smart vehicle controller, car navigation unit information (including route history information and typical routes taken), GPS unit information, odometer and/or speedometer information, and smart equipment data may also be gathered or collected. The application and/or other computer instructions may be associated with an insurance provider remote processor or server.

The control decision data may further include information regarding control decisions generated by one or more autonomous operation features within the vehicle. The operating data and control decision data gathered, collected, and/or acquired may facilitate remote evaluation and/or analysis of what the autonomous or semi-autonomous vehicle was "trying to do" (brake, slow, turn, accelerate, etc.) during operation, as well as what the vehicle actually did do. The data may reveal decisions, and the appropriateness thereof, made by the artificial intelligence or computer instructions associated with one or more autonomous or semi-autonomous vehicle technologies, functionalities, systems, and/or pieces of equipment. The data may include information related to what the vehicle would have done in a situation if the driver had not taken over (beginning manual vehicle control). Such data may include both the control actions taken by the vehicle and control actions the autonomous or semi-autonomous operation features would have caused the vehicle to take. Thus, in some embodiments, the control decisions data may include information regarding control decisions not implemented by the autonomous operation features to control the vehicle. This may occur when an autonomous operation feature generates a control decision or associated control signal, but the control decision or signal is prevented from controlling the vehicle because the autonomous feature or function is disabled, the control decision is overridden by the vehicle operator, the control signal would conflict with another control signal generated by another autonomous operation feature, a more preferred control decision is generated, or an error occurs in the on-board computer 114 or the control system of the vehicle.

For example, a vehicle operator may disable or constrain the operation of some or all autonomous operation features, such as where the vehicle is operated manually or semi-autonomously. The disabled or constrained autonomous operation features may, however, continue to receive sensor data and generate control decision data that is not implemented. Similarly, one or more autonomous operation features may generate more than one control decision in a relevant period of time as alternative control decisions. Some of these alternative control decisions may not be selected by the autonomous operation feature or an autonomous operation control system to control the vehicle. For example, such alternative control decisions may be generated based on different sets of sensor or communication data from different sensors 120 or include or excluding autonomous communication data. As another example, the alternative control decisions may be generated faster than they can be implemented by the control system of the vehicle, thus preventing all control decisions from being implemented.

In addition to control decision data, other information regarding the vehicle, the vehicle environment, or vehicle operation may be collected, generated, transmitted, received, requested, stored, or recorded in connection with the control decision data. As discussed elsewhere herein, additional operating data including sensor data from the sensors 120, autonomous communication data from the communication component 122 or the communication module 220, location data, environmental data, time data, settings data, configuration data, and/or other relevant data may be associated with the control decision data. In some embodiments, a database or log may store the control decision data and associated information. In further embodiments, the entries in such log or database may include a timestamp indicating the date, time, location, vehicle environment, vehicle condition, autonomous operation feature settings, and/or autonomous operation feature configuration information associated with each entry. Such data may facilitate evaluating the autonomous or semi-autonomous technology, functionality, system, and/or equipment in hypothetical situations and/or may be used to calculate risk, and in turn adjust insurance policies, premiums, discounts, etc.

B. Evaluating Risk

The data gathered may be used to evaluate risk associated with the autonomous or semi-autonomous operation feature or technology at issue. As discussed elsewhere herein, information regarding the operation of the vehicle may be monitored or associated with test data or actual loss data regarding losses associated with insurance policies for other vehicles having the autonomous technology or feature to determine risk levels and/or risk profiles. Specifically, the control decision data, sensor data, and other operating data discussed above may be used to determine risk levels, loss models, and/or risk profiles associated with one or more autonomous or semi-autonomous operation features. External data may further be used to determine risk, as discussed below. Such determined risk levels may further be used to determine insurance rates, premiums, discounts, or costs as discussed in greater detail below.

In one embodiment, the data gathered may be used to determine an average distance to another vehicle ahead of, and/or behind, the vehicle during normal use of the autonomous or semi-autonomous vehicle technology, functionality, system, and/or equipment. A safe driving distance to other vehicles on the road may lower the risk of accident.

The data gathered may also relate to how quickly the technology, functionality, system, and/or equipment may properly stop or slow a vehicle in response to a light changing from green to yellow, and/or from yellow to red. Timely stopping at traffic lights may also positively impact risk of collision.

The data gathered may indicate issues not entirely related to the autonomous or semi-autonomous technology, functionality, system, and/or equipment. For instance, tires spinning and low vehicle speed may be monitored and identified to determine that vehicle movement was being affected by the weather (as compared to the technology, functionality, system, and/or equipment during normal operation). Vehicle tires may spin with little or no vehicle movement in snow, rain, mud, ice, etc.

The data gathered may indicate a current version of artificial intelligence or computer instructions that the autonomous or semi-autonomous system or equipment is utilizing. A collision risk factor may be assigned to each version of computer instructions. The insurance provider may then adjust or update insurance policies, premiums, rates, discounts, and/or other insurance-related items based upon the collision risk factor and/or the artificial intelligence or computer instruction versions presently employed by the vehicle (and/or upgrades there to).

C. Outside Data

The decision and operating data gathered may be merged with outside data, such as information related to weather, traffic, construction, and/or other factors, and/or collected from sources besides the vehicle. In some embodiments, such data from outside the vehicle may be combined with the control decision data and other operating data discussed above to determine risks associated with the operation of one or more autonomous or semi-autonomous operation features. External data regarding the vehicle environment may be requested or received via the network 130 and associated with the entries in the log or database based on the timestamp. For example, the location, date, and time of a timestamp may be used to determine weather and traffic conditions in which vehicle operation occurred. Additional external data may include road conditions, weather conditions, nearby traffic conditions, type of road, construction conditions, presence of pedestrians, presence of other obstacles, and/or availability of autonomous communications from external sources. For instance, weather may impact certain autonomous or semi-autonomous technology, functionality, system, and/or equipment performance, such as fog, visibility, wind, rain, snow, and/or ice. Certain autonomous or semi-autonomous functionality may have degraded performance: (1) on ice covered roads; (2) during snow or rain, and/or on snow or rain covered roads; (3) during poor visibility conditions, such as foggy weather; (4) in "stop and go" traffic, such as during rush hour traffic, or slow moving traffic through high construction areas or downtown areas; and/or (5) caused by other factors.

The system and method may consider the geographical area associated with the user, or the owner or operator of a vehicle. For instance, rain mitigation functionality or technology for vehicles may be pertinent to reducing the amount of accidents and/or the severity of such accidents in areas of high rain fall, such as the Pacific Northwest or Florida. On the other hand, such functionality may have less of a beneficial impact on accidents or potential accidents in desert locations, such as Nevada or New Mexico.

Construction-related data may also be collected and analyzed. Construction-related accident avoidance and/or mitigation technology, functionality, systems, or associated equipment may be more pertinent in large urban areas involving significant and lengthy construction or road connector projects that may include frequently changing travel patterns with little notice to drivers.

D. Autonomous Vehicle Telematics

The data gathered may relate to autonomous vehicle telematics variables. From which, usage-based insurance policies, premiums, rates, discounts, rewards, and/or other insurance-related items may be estimated, as discussed elsewhere herein.

For instance, if sensor data indicates that automatic braking is only used by the driver 50% of the time, an updated or adjusted insurance policy, premium, rate, and/or discount may be estimated for the driver, such as by a remote processor or server associated with the insurance provider. A message may be wirelessly communicated to the vehicle or mobile device associated with the driver that indicates that they may save a given amount of money on their auto insurance if they increase usage of the automatic braking technology or functionality to a certain percentage of time, such as up to 90% of vehicle driving time for example. Usage of other technologies and functionalities (including the technologies and functionalities discussed elsewhere herein) may be monitored, and recommended usages thereof (and associated insurance savings) may be provided to the insured or driver for their review and/or approval.

Other manners of saving money on existing auto insurance coverage may be provided to the driver via wireless communication. For instance, a percentage of time that the vehicle is in a (1) "manual" mode or operation; (2) semi-automated, semi-automatic, or "semi-autonomous" mode or operation; and/or (3) fully automated, fully automatic, or fully "autonomous" mode or operation may be determined from vehicle sensor data that is remotely collected, such as at or by an insurance provider remote processor or server.

The insurance provider remote processor or server may determine auto insurance discounts increases or premium reductions based upon proposed changes to the time that the vehicle is operated in each mode, i.e., manual, semi-autonomous, or fully autonomous. For instance, driving in a semi-autonomous, or even autonomous mode, of operation may be the safest for a given technology or functionality and/or under certain driving conditions (e.g., freeway driving in clear weather and moderate traffic). The driver may be offered a reduced insurance premium or rate to increase usage of the semi-autonomous, or even autonomous, technology or functionality, and/or to increase usage of the semi-autonomous, or even autonomous, technology or functionality in certain driving conditions.

Additionally or alternatively, the insurance provider may offer a plurality of separate tiers of auto insurance policies, premiums, rates, discounts, etc. For example, the insurance provider may offer three separate tiers. The three separate insurance tiers of premiums, rates, discounts, etc. may be based upon (a) a manual insurance rate; (b) a semi-autonomous insurance rate; and/or (c) a fully autonomous insurance rate. The manual insurance rate may be associated with manual operation of the vehicle; the semi-autonomous insurance rate may be associated with semi-autonomous operation of the vehicle; and/or the fully autonomous insurance rate may be associated with autonomous operation of the vehicle.

Also, the data gathered may be used to provide feedback to the customer or insured. For instance, if the vehicle is presently traveling on the highway, a recommendation or offer may be presented to the driver, such as via wireless communication with the vehicle that indicates that if the driver places the vehicle into autonomous or semi-autonomous driving mode, the risk of collision may be reduced and/or the driver may be receive a discount, and/or lower premium on his or her auto insurance.

Other manners of potential risk reductions may also be communicated to the driver or owner of the vehicle. For instance, recommendations and/or adjustments to insurance policies, premiums, rates, discounts, rewards, and/or other insurance-related items may be based upon driver characteristics or age, such as beginning or teenage drivers.

As an example, auto insurance policies, premiums, rates, discounts, rewards, and/or other insurance-related items may be adjusted, updated, or generated based upon (1) the autonomous or semi-autonomous technology and/or functionality; (2) an amount or percentage of driver usage of that technology and/or functionality; and/or (3) driver characteristics. The driver characteristics that may be taken into consideration include driver age, driver health, and/or past driving or accident history.

E. Smart Equipment

The data gathered may originate from various smart parts and/or pieces of smart equipment mounted on a vehicle, including parts configured for wired or wireless communication. For instance, a vehicle may be equipped with smart brakes; smart tail, head, or turn lights; smart tires; etc. Each piece of smart equipment may have a wired or wireless transmitter. Each piece of smart equipment may be configured to monitor its operation, and/or indicate or communicate a warning to the driver when it is not operating properly.

As an example, when a rear brake light is out, such as from faulty repair or from normal burn out, that fact may be detected by smart vehicle functionality and the driver may be promptly notified. As a result, the driver may be able to repair the faulty brake light before an accident caused by the faulty brake light occurs. In another embodiment, the data gathered may also indicate window wipers are not operating properly, and need to be replaced. The insurance provider may adjust or update insurance policies, premiums, rates, discounts, and/or other insurance-related items based upon the smart equipment warning functionality that may alert drivers of vehicle equipment or vehicle safety equipment (lights, brakes, etc.) that need to be replaced or repaired, and thus may reduce collision risk.

In addition to addressing liability for collision risk, the technology may also reduce risk of theft. For instance, stolen vehicles may be tracked via on-board GPS units and wireless transmitters. Also, the breaking and entering, and/or hot wiring, of vehicles may be more difficult through the use of anti-hacking measures for smart vehicles or vehicles with electrical or electronic control systems. The insurance provider may adjust insurance premiums, rates, and/or other insurance-related items based upon the reduced risk of theft.

Assignment of Fault

The present embodiments may relate to the assignment of fault. The assignment of fault may be based upon sensor data and/or other data gathered or collected from, or by, the vehicle. The assignment of fault may impact the future rating for one or more drivers, and/or one or more vehicles equipped with one or more autonomous or semi-autonomous technologies, functionalities, systems, and/or pieces of equipment.

The assignment of fault determination from sensor and/or vehicle data may relate to, and/or involve, determining who was in control of, or driving, the vehicle at the time of the accident (such as either the human driver or the vehicle itself), and/or determining who was at fault or liable for the collision or accident—the human driver or the vehicle. For instance, did the vehicle give the driver enough time (e.g., half a second) to take manual control of the vehicle before the time of impact, or was the driver not attentive enough before an accident.

The assignment of fault may include a determination of who pays the claim associated with a vehicle accident and/or determine future ratings for certain types of technology or functionality, and/or certain insurance policy holders. Fault for a vehicle collision or accident may be partially or fully assigned to one or more drivers, and/or one or more vehicles equipped with one or more autonomous or semi-autonomous technologies, functionalities, systems, and/or pieces of equipment.

In one embodiment, insurance coverage may provide for immediate coverage/payment to an insured in the case of an accident. After which, based upon data collected from the smart vehicle or sensors, blame or fault may be assigned for the accident, such as to either the driver or the autonomous or semi-autonomous technology or functionality, and/or to another driver, or autonomous or semi-autonomous vehicle involved in the accident.

Alluded to above, the data gathered may help determine who was in control of the vehicle before, during, and/or after a vehicle collision or accident. For instance, a human driver, or an autonomous or semi-autonomous vehicle (and/or associated technology, functionality, system, and/or equipment) may have been in control of the vehicle at the time of accident. The data may be used to identify whether there was enough time for a driver to takeover manually. For instance, once a hazardous condition is identified (e.g., vehicles slowing down abruptly or heavy congestion ahead, or vehicle accident ahead), did a semi-autonomous technology function correctly, and/or did the human driver have the time to take manual control of the vehicle and avoid a collision or accident.

For a fully autonomous vehicle, technology, or functionality whether or not the collision or accident could have been avoided may be determined. For example, a performance of the artificial intelligence or computer instructions associated with the autonomous vehicle, technology, or functionality may be evaluated. In accidents or collisions involving one, two, or more autonomous vehicles, evaluating the performance of the autonomous technology or functionality may determine fault—such as which autonomous vehicle was at fault (for an accident involving two autonomous vehicles) or whether an autonomous vehicle or a human driver was at fault (for an accident involving two vehicles, one driven by a human driver and one driven by autonomous vehicle technology, functionality, or systems that may include associated artificial intelligence and/or processors).

Insurance Adjustment Recommendations

Autonomous or semi-autonomous technology, functionality, and/or system usage data may be used to identify and present a driver one or more potential premium or rate reductions with increased usage of the technology, functionality, and/or system. A number of "what if" insurance-related scenarios may be calculated and then presented to a driver and/or insured for their review, approval, and/or modification. The different scenarios may be presented to a driver on their mobile device or a smart vehicle display screen, or other in dash display.

Autonomous or semi-autonomous vehicle technology or functionality may relate to vehicle parking. The technology or functionality may determine an available parking spot in an urban area or large city. The smart vehicle may make recommendations to the driver regarding the best available parking spot remotely identified. For instance, the best available parking spot may be determined based upon the cost of the parking; safety of the parking spot, lot, or garage; the risk of theft or other liability associated with the parking spot, lot, or garage; and/or other factors.

The recommendation may be generated by an insurance provider remote processor or server. The recommendation with respect to best available parking spot may include information regarding an adjustment to the driver's present insurance policy, premium, rate, and/or discount based upon the driver accepting the recommendation and parking the vehicle in the best available parking spot. A discount and/or lower premium may be offered to the driver to encourage safer parking habits that may reduce the risk of vehicle damage or theft.

Alternatively, based upon an actual parking spot, additional insurance coverage may be offered to the driver. For instance, if the vehicle is going to be parked on a busy street and overnight, it may have a higher risk of damage or theft. A remote processor or server associated with the insurance provider may estimate and/or offer an appropriate increase in auto insurance coverage to the insured or driver, such as via wireless communication with a smart vehicle controller or a mobile device of the insured or driver.

Exemplary Feedback Method

Beyond determining risk categories or premiums for vehicle insurance policies covering autonomous (and/or semi-autonomous) vehicles, in some embodiments the system 100 may operate to monitor use of autonomous (and/or semi-autonomous) operation features and present feedback to vehicle operators. This may occur in real time as operating conditions change or may occur on a periodic basis in response to vehicle use and environmental conditions. The use of autonomous operation features may be assessed to determine whether changes to the number, type, configuration, or settings of the autonomous operation features used may reduce the risk associated with vehicle operation under various conditions. Presenting or otherwise providing the information to the vehicle operator may improve the effective use of the autonomous operation features and/or reduce the risks associated with vehicle operation. Upon receiving a suggestion regarding autonomous operation feature use, the vehicle operator may be able to maximize the effectiveness of the autonomous operation feature, maximize vehicle insurance coverage, and/or minimize vehicle insurance expense.

Figure 11:
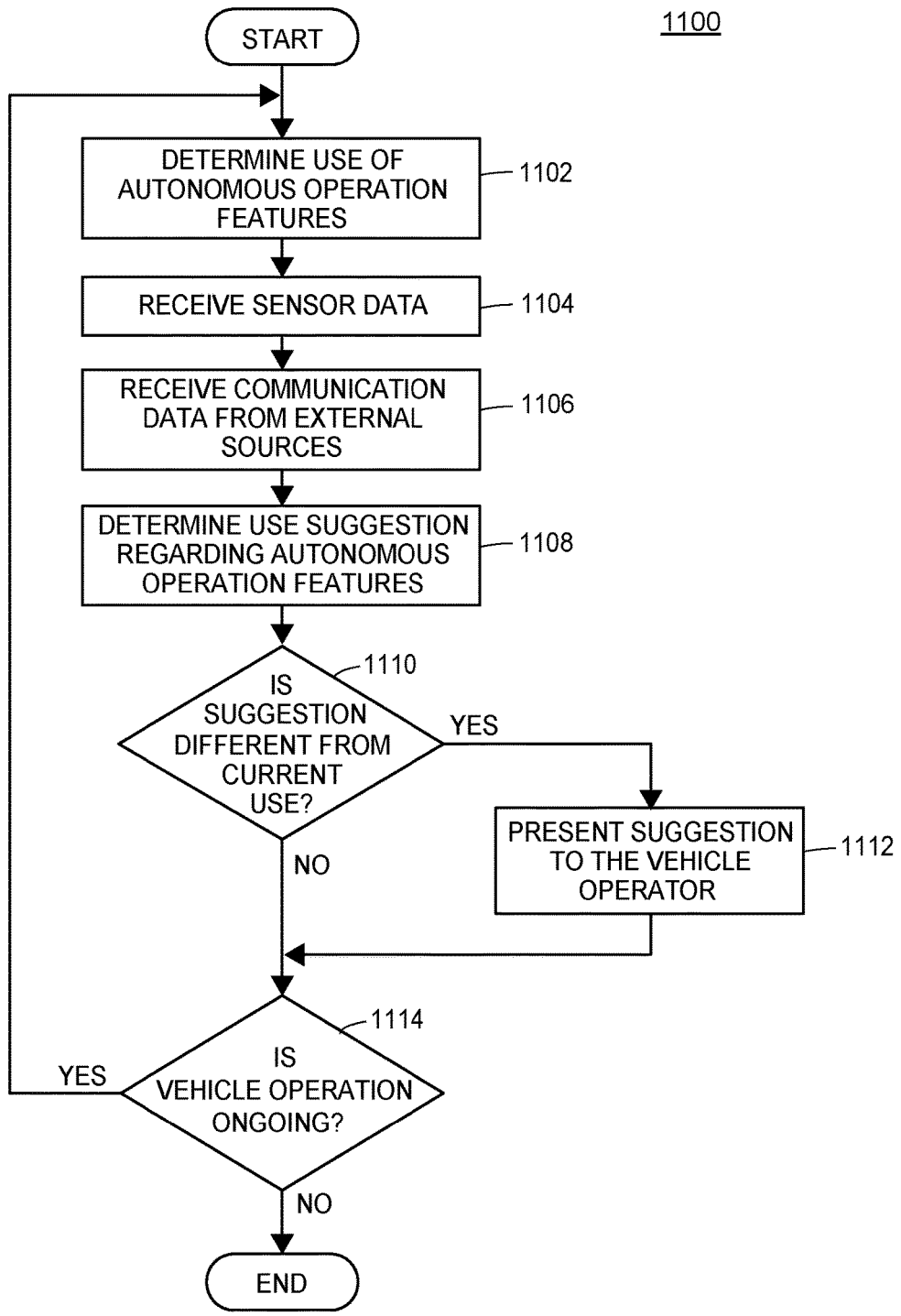
FIG. 11 illustrates a flow diagram of an exemplary autonomous operation feature monitoring and feedback method.

FIG. 11 illustrates an exemplary autonomous (and/or semi-autonomous) operation feature monitoring and feedback method 1100. The method 1100 may be performed by the controller 204 or the server 140 at any time while the vehicle 108 is in operation. In some embodiments, the method 1100 may be implemented only when the vehicle 108 is stationary, when the autonomous (and/or semi-autonomous) operation features are controlling the vehicle 108, when the controller 204 or server 140 determines that the conditions meet certain criteria (e.g., when the vehicle is more than a predetermined distance from environmental obstacles on a restricted access highway, etc.), and/or when the vehicle 108 is first started, such that the method 1100 does not distract the vehicle operator. During implementation of the method 1100, the controller 204 may determine actual use levels of the autonomous operation features at block 1102. This may include current use of the features and/or past use of the features, either generally or under similar conditions. In some embodiments, the determination of use levels may include a determination of the use of versions, configurations, or settings related to the autonomous operation features.

At block 1104, the controller 204 may receive sensor data from the sensors 120, as discussed above. The received sensor data may include information regarding the vehicle 108, the vehicle's environment (e.g., traffic conditions, weather conditions, etc.), and/or the vehicle operator. The sensor data may include information regarding the physical or mental state of the vehicle operator using sensors 120 disposed within the vehicle 108 or communicatively connected thereto (e.g., disposed within or communicatively connected to a mobile device 110, such as a smart phone, and/or a wearable computing device, such as a smart watch or smart glasses). This sensor data may include data from interior cameras, microphones, accelerometers, and/or physiological sensors (e.g., thermometer, microphone, thermal image capture device, electroencephalograph, galvanic skin response sensor, heart rate sensors, respiratory rate sensor, other biometric sensors, etc.). In some embodiments, the received sensor data may exclude sensor data regarding the vehicle operator or the physical or mental state of the vehicle operator.

At block 1106, the controller 204 or the server 140 may receive communication data from external sources. The communication data may include direct communication data from other autonomous vehicles, communicating infrastructure, and/or other smart devices (e.g., mobile devices carried or worn by pedestrians, passengers in other vehicles, etc.). The communication data may also include indirect communication data received by the controller 204 or the server 140 via the network 130 (e.g., information regarding traffic, construction, accidents, weather, local time, local events, local traffic patterns, local accident statistics, general accident statistics, etc.). The indirect information may be obtained from database 146 or from other networked or third-party databases. For example, indirect communication data may be obtained regarding the risk level of autonomous operation features relative to manual vehicle operation on major highways during typical commuting times in urban areas in light rain, which may be combined with information from a weather service indicating light rain and information from a map service indicating the vehicle 108 is on a major highway (using GPS data from the sensors 120). As a further example, traffic databases could be accessed to receive information regarding accidents and/or construction further ahead along a route.

At block 1108, the server 140 or the controller 204 may determine an optimal use level for the autonomous operation features available within the vehicle 108 and/or a suggestion regarding the optimal autonomous operation feature use level under the conditions. The optimal use level or suggestion may include the types and versions of autonomous operation features to use, configurations of the features, and/or settings relating to the features. The server 140 or the controller 204 may determine one or more optimal use levels for the autonomous operation features based upon the sensor data and communication data received in blocks 1104 and 1106 using any known or later-developed optimization techniques. In some embodiments, the risk levels associated with each combination of use levels for autonomous operation features may be determined and stored in one or more databases, such that the server 140 or controller 204 may access and compare the appropriate database entries to determine the optimal use levels. In further embodiments, one or more optimal use levels may be determined and stored in one or more databases, such that the server 140 or controller 204 may determine the optimal use level by accessing the database entry corresponding to the sensor data and communication data. Alternatively, the server 140 or controller 204 may determine optimal use levels by determining risk levels for a variety of combinations of configurations and settings associated with autonomous operation features based on the received sensor data and communication data. In such embodiments, the combination or combinations determined to have the lowest risk may be determined to be the optimal feature use levels.

The determination of optimal feature use may be based upon the received sensor data and/or the communication data. In some embodiments, the received sensor data and/or communication data may include information regarding the physical, mental, and/or emotional state of the vehicle operator, as noted above. In various embodiments, the determination of the optimal feature use level may either include or exclude information regarding the state of the vehicle operator from the determination. For example, the determination may be based in part upon the previous driving history of a vehicle operator, which may indicate that the vehicle operator has an increased risk of an accident in low light environments. In the example, the determination may compare the expected performance of the various autonomous operation features against the expected performance of the vehicle operator, which may cause the server 140 or controller 204 to determine an optimal feature use level that includes more autonomous operation feature use than would otherwise be determined to be optimal. As a related example, the server 140 or the controller 204 may not determine the optimal use level based upon the previous driving history of the vehicle operator from the previous example, which may result in a determination of an optimal feature use level that includes less use of autonomous operation features than in the preceding example.

The determined optimal use level may be used to further determine an autonomous (and/or semi-autonomous) operation feature use suggestion. The use suggestion may include one or more settings relating to autonomous operation features, enabling or disabling particular autonomous operation features, using specific versions of autonomous operation features, resuming manual operation of the vehicle, temporarily ceasing autonomous and/or manual operation of the vehicle, and/or similar changes to the use and configuration of the autonomous operation features in operating the vehicle 108. It should be noted that the determined use suggestion may include changes to the use of autonomous operation features, use of additional autonomous operation features, and/or use of fewer autonomous operation features.

At block 1110, the suggested optimal use levels of autonomous (and/or semi-autonomous) operation features determined at block 1108 is compared against the actual autonomous operation feature use levels determined at block 1102. When the suggested and optimal feature use levels are determined to be different, the server 140 or the controller 204 causes a suggestion of autonomous operation feature use to be presented to the vehicle operator at block 1112. In some embodiments, the suggestion may not be presented when the difference between the optimal use level and the actual use level is below a predetermined threshold. For example, the server 140 may determine not to present the suggested autonomous operation use to the vehicle operator where the difference would only result in a risk reduction equivalent to a monetary value below five cents.

The suggestion presented at block 1112 may be presented using a display within the vehicle 108, a mobile device 110, or other means, including visual and/or audible notifications. The suggestion may include a recommendation that the vehicle operator enable or use one or more additional autonomous (and/or semi-autonomous) operation feature, that the vehicle operator change the settings or configuration for one or more autonomous (and/or semi-autonomous) operation features, that the vehicle operator disable or discontinue use of one or more autonomous (and/or semi-autonomous) operation features, and/or related changes that may be made to the use of the autonomous (and/or semi-autonomous) operation features. The suggestion may further include one or more reasons for making a change to the autonomous operation feature use, such as an indication of a reduction in risk, a percentage reduction in the probability of a collision, an increase in a probability of completing the trip without incident, a reduction in a premium or other policy charge, a reduction in a rate, an increase in a coverage amount, an increase in a coverage type, a reduction in a deductible, and/or related information to induce the vehicle operator to change the autonomous operation feature use. For example, a suggestion presented to the vehicle operator may indicate that updating to a newer software version of an autonomous operation feature would result in a decrease of a certain amount in a vehicle insurance premium. In some embodiments, the vehicle operator may make a selection upon presentation of the suggestion, which selection may cause the use levels of one or more of the autonomous operation features to be adjusted (e.g., to match the one or more optimal use levels). In other embodiments, the vehicle operator may otherwise adjust or control the use levels, as discussed above. A change or adjustment to the use, configuration, or settings of the autonomous operation features may further cause a change or adjustment to costs or coverage associated with a vehicle insurance policy, as discussed above.

After a suggestion has been presented at block 1112 or when the suggested optimal feature use is determined to be insufficiently different from the actual feature use at block 1110, the server 140 or the controller 204 determine whether vehicle operation is ongoing at block 1114. When operation is ongoing, the method 1100 may repeat the steps of blocks 1102-1112. In some embodiments, the method 1100 may repeat only when a predetermine period of time (e.g., 5 minutes, 15 minutes) has passed, when vehicle operating conditions have sufficiently changed (e.g., upon exiting a highway, entering fog, sunset, etc.), and/or when a sufficient change in the recommendation has occurred (e.g., risk level, monetary incentive, feature use level recommendation, etc.). When the operation of the vehicle 108 is complete, the method 1100 may terminate. In some embodiments, however, the method 1100 may be implemented either before or after vehicle operation, in which case the actual autonomous (and/or semi-autonomous) operation feature use determined in block 1102 may be based upon the settings of the autonomous operation features that had been previously used, the settings that would be applied if the vehicle were to be used at that time, or the default settings.

Exemplary Warning Method

In addition to monitoring use of autonomous operation features to present feedback regarding autonomous (and/or semi-autonomous) operation feature use to vehicle operators, some embodiments may determine elevated risk levels and present warnings to the vehicle operator. In some embodiments, this may include warnings regarding situations where no changes to the optimal autonomous operation feature use level would be suggested, but where an increased risk nonetheless exists. For example, communication data regarding recent snowfall may be combined with sensor data indicating a high frequency of slipping wheels to determine a high risk of an accident exists at the current speed on a snow-covered road. The vehicle operator might then respond by reducing the speed of the vehicle, resuming manual control of the vehicle, and/or selecting an alternate route using major thoroughfares that are clear of snow. Such responses may further cause an adjustment in a cost or coverage level associated with a vehicle insurance policy.

Figure 12:
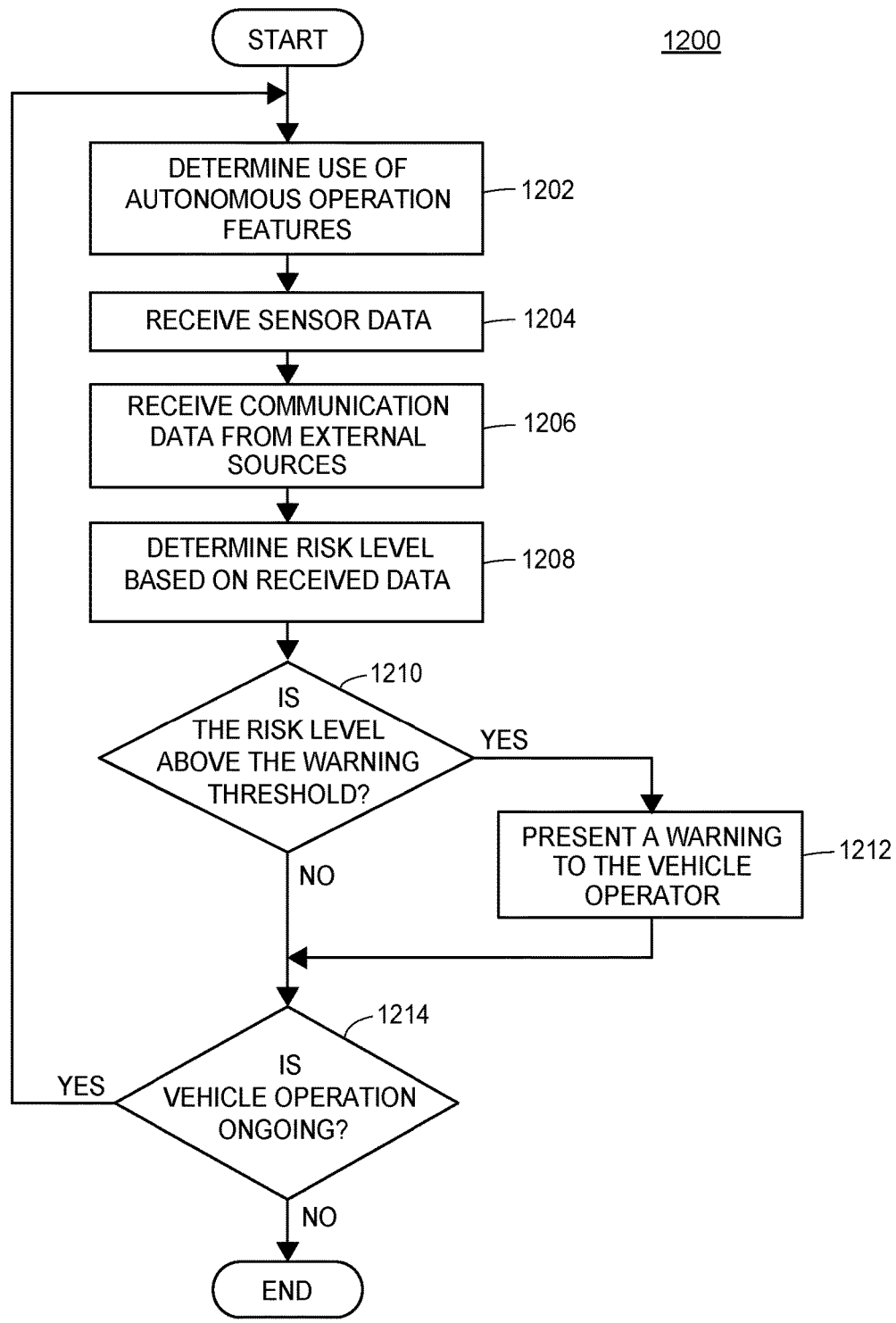
FIG. 12 illustrates a flow diagram of an exemplary autonomous operation feature monitoring and alert method.

FIG. 12 illustrates an exemplary autonomous (and/or semi-autonomous) operation feature monitoring and alert method 1200. The method 1200 may be performed by the controller 204 or the server 140 at any time while the vehicle 108 is in operation. During implementation of the method 1200, the controller 204 or server 140 may determine the use of the autonomous operation features at block 1202. This may include current use of versions, configurations, or settings related to the autonomous operation features. As discussed above, the controller 204 or server 140 may further receive sensor data and communication data, respectively, at blocks 1204 and 1206. The sensor data may be received from sensors 120 disposed within the vehicle 108, and the communication data may include information regarding the vehicle environment (including information regarding the rate of incidents in similar conditions or locations based on historical data). This information may be used at block 1208 to determine the risk associated with operation of the vehicle under the conditions. As above, the sensor data, communication data, and the determination of risk may either include or exclude information regarding one or more vehicle operators (e.g., the physical, mental, and/or emotional state of the vehicle operator).

At block 1208, the server 140 or the controller 204 may determine a risk level associated with the operation of the vehicle under the current conditions. This may include a determination of the risk associated with the autonomous (and/or semi-autonomous) vehicle operation features then in use, or it may include a determination of the risk associated with various configurations or settings of autonomous operation features as discussed above with respect to method 1100. In some embodiments, the determination may not include information regarding one or more vehicle operators. The server 140 or controller 204 may determine one total risk level or a plurality of risk levels associated with vehicle operation at block 1208. For example, separate risk levels may be determined for different types of potential incidents (e.g., collisions with other vehicles, loss of control or traction, collisions with pedestrians, collisions with stationary obstructions, etc.).

At block 1210, the server 140 or the controller 204 may compare the determined risk level against a warning threshold risk level. In some embodiments, the difference between the determined risk level and a risk level associated with an optimal autonomous (and/or semi-autonomous) operation feature use level (as discussed above with respect to method 1100) may be compared against the warning threshold, and the warning threshold may be set at a level such that a warning is triggered only when the additional risk from suboptimal autonomous (and/or semi-autonomous) operation feature use, configuration, and/or settings exceeds a certain level. In further embodiments, the risk level may be compared against a plurality of predetermined warning thresholds, and the warning presented to the vehicle operator may be determined based upon the highest warning threshold exceeded by the risk level.

When the risk level is determined to exceed the warning threshold at block 1210, the controller 204 or server 140 may cause a warning to be presented to the vehicle operator at block 1212. The warning presented at block 1212 may be presented using a display within the vehicle 108, a mobile device 110, or other means, including visual, audible, and/or haptic notifications. The warning may specify one or more causes of the elevated risk (e.g., weather, speed, hardware malfunctions, etc.). Alternatively, the warning may simply alter the vehicle operator to an elevated risk level. In some embodiments, the vehicle operator may make a selection upon presentation of the alert, which selection may cause the use, configuration, or settings of one or more of the autonomous (and/or semi-autonomous) operation features to be adjusted (e.g., the vehicle operator may resume full control of operation, the vehicle operator may cede control of operation to the autonomous (and/or semi-autonomous) operation features, etc.). In other embodiments, the vehicle operator may otherwise adjust or control the use levels, as discussed above. A change or adjustment to the use, configuration, or settings of the autonomous operation features may further cause a change or adjustment to costs or coverage associated with a vehicle insurance policy, as discussed above.

After the warning has been presented at block 1212 or when the risk level is determined to be below the risk threshold at block 1210, the server 140 or the controller 204 determine whether vehicle operation is ongoing at block 1214. When operation is ongoing, the method 1200 may repeat the steps of blocks 1202-1212. When the operation of the vehicle 108 is complete, the method 1200 may terminate.

Exemplary Fault Determination Method

In some embodiments, the system 100 may be used to determine or allocate fault upon the occurrence of an accident or other collision involving the vehicle 108. Information regarding the operation of the vehicle 108 may be recorded and stored during operation, which may then be used to determine the cause of a collision or accident automatically upon receiving an indication of the occurrence of such. Fault may be allocated to either the vehicle operator, one or more autonomous operation features, or a third party (e.g., another motorist or autonomous vehicle). Such allocation of fault may be further used to adjust one or more of an insurance policy premium, a risk level, a rate category, a penalty, or a discount relating to a vehicle insurance policy. In some embodiments, the allocation of fault may also be used to determine whether to cancel an insurance policy, adjust a deductible, adjust a policy limit, and/or determine a payment associated with the collision or accident. Where an autonomous operation feature is determined to be wholly or partially responsible for the accident, the risk levels or risk profile associated with that autonomous operation feature may be revised, such that the risk levels or risk profile of other autonomous vehicles using the feature may also be adjusted.

Figure 13:
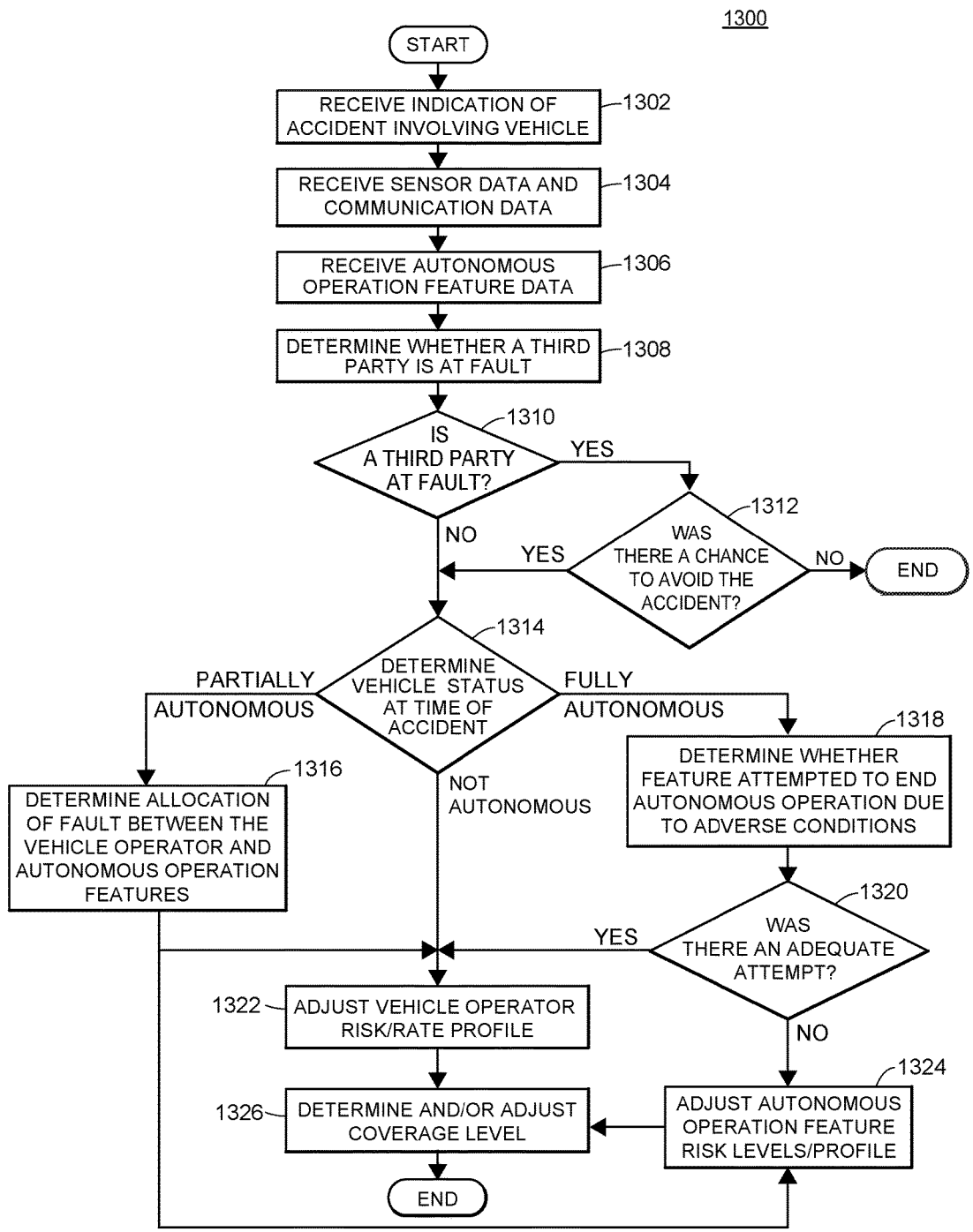
FIG. 13 illustrates a flow diagram of an exemplary fault determination method for determining fault following an accident based upon sensor data and communication data.

FIG. 13 illustrates an exemplary fault determination method 1300 for determining fault following an accident based upon sensor data and communication data. Upon receiving an indication of an accident at block 1302, the method 1300 may receive sensor data and communication data at block 1304 and may further receive information regarding the operation of one or more autonomous (and/or semi-autonomous) operation features at block 1306. In some embodiments, this information may be used to make a preliminary determination of whether a third party is at fault at block 1308, in which case there may be no fault allocated to the vehicle operator and/or autonomous (and/or semi-autonomous) operating features. If a third party was not at fault or if the vehicle 108 had the last chance to avoid the accident, the method 1300 may then determine and allocate fault between the vehicle operator and one or more autonomous (and/or semi-autonomous) operation features in blocks 1314-1324. The determination of fault may further be used to determine and/or adjust a coverage level at block 1326, such as a deductible level or a policy status.

The determination process of method 1300 may depend upon whether the vehicle 108 is operated in a fully autonomous, partially autonomous, or manual operation mode at the time of the accident. In some embodiments, the server 140 may determine and/or allocate fault without human involvement. In other embodiments, the server 140 may present relevant information and/or a determination of fault to a reviewer (e.g., a claims adjuster or other specialist) for verification or further analysis. In such embodiments, the presented information may include summaries or detailed reports of sensor data and/or communication data, including still images or video recordings from the sensors 120 within the vehicle 108 or other sensors at the location of the accident (e.g., sensors disposed within other vehicles involved in or near the accident site, sensors disposed within infrastructure elements, etc.). The method 1300 may be implemented by the mobile device 110, the on-board computer 114, the server 140, and/or some combination of these components.

At block 1302, the server 140 may receive an indication of an accident involving the vehicle 108. The server 140 or controller 204 may generate this indication automatically based on sensor data, or it may be initiated manually by a vehicle operator or another person following the accident. However the indication is received, it may cause the method 1300 to proceed to the one or more determinations of fault.

At block 1304, the server 140 may receive sensor data from the one or more sensors 120 within the vehicle 108 and/or communication data from the communication component 122 and/or the communication unit 220. In addition, the server 140 may receive additional information from external sources, including sensor data from other vehicles or infrastructure, communication information from other vehicles or infrastructure, and/or communication information from third-party sources. For example, additional information may be obtained from other autonomous vehicles involved in the accident or near the accident. As discussed above, the server 140 may additionally receive control decision data regarding the control decisions generated by one or more of the autonomous operation features of the vehicle 108. In some embodiments, the sensor and/or communication data may be stored in the database 146 or in the program memory 160 or 208, and/or in the RAM 164 or 212 during ordinary operation of the vehicle 108, from which the data may be retrieved or accessed by the server 140. Additionally, or alternatively, the sensor and/or communication data may be stored in another memory or database communicatively connected to the network 130. In some embodiments, a back-up of the sensor and/or communication data may be stored within a memory (not shown) that may be designed to withstand the forces and temperatures frequently associated with a vehicular collision.

At block 1306, the server 140 may further receive information regarding the operation of the autonomous (and/or semi-autonomous) operation features in the vehicle 108. This information may include information regarding use, configuration, and settings of the features concurrent with the accident. In some embodiments, the information may further include information regarding control signals or outputs from the autonomous operation features to control the vehicle 108. This may be useful, for example, in determining whether the autonomous operation feature failed to take appropriate control actions or whether the control signals were not implemented or were ineffective in controlling the vehicle 108 (e.g., such as may occur when on ice or when a defect prevents an electromechanical control from properly functioning). In some embodiments, autonomous operation feature data may be available for additional vehicles involved in the accident, which may be accessed or obtained by the server 140. As above, the autonomous operation feature data may be recorded during ordinary operation of the vehicle 108 and accessed or obtained by the server 140 upon receipt of the indication of the accident.

At block 1308, the server 140 may determine whether a third party is at fault for the accident based upon the sensor data, communication data, and/or autonomous (and/or semi-autonomous) operation feature data received in blocks 1304 and 1306. Determining fault may generally include determining one or more of the following: a point of impact on the vehicle 108, a point of impact on one or more additional vehicles, a velocity of the vehicle 108, a velocity of one or more additional vehicles, a movement of the vehicle 108, a movement of one or more additional vehicles, a location of one or more obstructions, a movement of one or more obstructions, a location of one or more pedestrians, a movement of one or more pedestrians, a measure of road surface integrity, a measure of road surface friction, a location of one or more traffic signs or signals (e.g., yield signs, stop signs, traffic lights, etc.), an indication of the state of one or more traffic signs or signals, a control signal generated by one or more autonomous operation features of the vehicle 108, and/or a control signal generated by one or more autonomous operation features of one or more additional vehicles.

Based upon the above-mentioned factors, the server 140 may determine whether the vehicle 108 (including the vehicle operator and/or the autonomous operation features) caused the accident or whether a third party (including other autonomous vehicles, other vehicle operators, pedestrians, etc.) caused the accident.

For purposes of determining fault at block 1310, in some embodiments the server 140 may include unavoidable accidents as being the fault of a third party (e.g., a bridge collapse, an animal suddenly darting into the path of a vehicle, etc.). Additionally, or alternatively, physical defects in the autonomous vehicle 108 or the physical components of the autonomous operation features (e.g., the sensors 120, the on-board computer 114, or connections within the vehicle 108) may be determined by the server 140 as being the fault of a third party (e.g., the vehicle maker, the original equipment manufacturer, or the installer).

When the accident is determined at block 1310 to have been caused by a third party, the server 140 may then determine whether the vehicle 108 or the vehicle operator had a chance to avoid the accident that was not taken at block 1312. For example, the vehicle operator may have been able to avoid a collision by braking or swerving but for inattentiveness at the time of the accident. Where no such chance for the vehicle operator or the autonomous operation features to avoid the accident is determined to have existed at block 1312, the fault determination method 1300 may terminate. Where such a chance to avoid the accident is determined to have existed at block 1312, the method 1300 may continue to allocate a portion of the fault between the vehicle operator and the autonomous operation features.

At block 1314, the server 140 may determine the operating control status of the vehicle 108 at the time of the accident based upon the received autonomous (and/or semi-autonomous) operation feature data regarding the use, configuration, and settings of the features. The vehicle 108 may be determined to have been either manually, fully autonomously, or partially autonomously operated at the time of the accident. Based upon the determination, the allocation of fault will be determined differently. Of course, any allocation of fault to a third party above at block 1310 may decrease the total fault to be allocated between the vehicle operator and the one or more autonomous operation features.

Where it is determined at block 1314 that the vehicle 108 was operating entirely manually without any autonomous operation features at the time of the accident, the fault may be allocated entirely to the vehicle operator. In such case, the server 140 may adjust (or cause to be adjusted) the risk or rate profile associated with the vehicle operator at block 1322 in a manner similar to the adjustment that is typically made when a vehicle operator of a non-autonomous vehicle is determined to be at fault for an accident.

Where it is determined at block 1314 that the vehicle 108 was operating in a fully autonomous mode at the time of the accident, the fault will usually be assigned entirely to one or more autonomous operation features. There are some situations, however, where the autonomous operation feature may recognize a situation where autonomous operation is no longer feasible due to conditions in the vehicle's environment (e.g., fog, manual traffic direction, etc.). When it is determined that the vehicle 108 was operating as a fully autonomous vehicle at block 1314, therefore, the server 140 may determine whether the one or more autonomous operation features attempted to return control of the vehicle to the vehicle operator prior to the accident at block 1318. Because such attempts may require the vehicle operator to be alert and capable of receiving control from the autonomous operation features, an adequate period of time for transition may be required. Thus, when it is determined at block 1320 that the autonomous operation features did not attempt to return control of the vehicle 108 to the vehicle operator or failed to provide sufficient time to transfer control, the server 140 may allocate fault for the accident to the one or more autonomous operation features and adjust the risk levels and/or risk profiles associated with the one or more autonomous operation features at block 1324. When it is instead determined that the autonomous operation features attempted to return control of the vehicle 108 to the vehicle operation with adequate time for transferring control at block 1320, the server 140 may allocate fault to the vehicle operator, and the vehicle operator's risk or rate profile may be adjusted at block 1322. In some embodiments, the server 140 may allocate some portion of the fault to each of the vehicle operator and the autonomous operation features where an attempt to return control of the vehicle 108 to the vehicle operator was made, notwithstanding vehicle operator inattention.

Where it is determined at block 1314 that the vehicle 108 was operating in a partially autonomous mode at the time of the accident, the server 140 determines an allocation of fault between the vehicle operator and one or more autonomous operation features at block 1316. This determination may include determining which autonomous operation features were in use at the time of the accident, the settings of those autonomous operation features, and whether the vehicle operator overrode the operation of the autonomous operation features. For example, the server 140 may determine that an autonomous operation feature such as adaptive cruise control without lane centering to be fully or primarily responsible for an accident caused by the vehicle 108 striking another vehicle directly ahead in the same lane. In contrast, the server 140 may determine the vehicle operator to be fully or primarily at fault when the same adaptive cruise control without lane centering was engaged when the vehicle 108 struck another vehicle in an adjacent lane. Upon determining the allocation of fault at block 1316, the server 140 may adjust the vehicle operator and/or autonomous operation feature risk levels accordingly in blocks 1322 and/or 1324, respectively. In some embodiments, the use of autonomous operation features may be considered in reducing the adjustment to the vehicle operator risk or rate profile, thereby mediating the impact of the accident on the rates or premiums associated with vehicle insurance for the vehicle operator.

At block 1326 the method 1300 may further utilize the fault determinations for underwriting and/or claim administration, in addition to or as an alternative to adjusting one or more risk levels associated with the vehicle operator or the autonomous operation features. The server 140 may further determine and/or adjust one or more coverage levels associated with an insurance policy covering the vehicle 108 based upon the allocation of fault between the vehicle operator and the autonomous operation features. For example, coverage levels may increase or decrease as the portion of the fault allocated to the autonomous operation feature increases or decreases. In some embodiments, the coverage level may be associated with the accident, such as a deductible, an estimate of a cost to repair or replace the vehicle, an estimate of a cost to repair or replace other property, and/or other payments or adjustments to payments associated with damage or injuries arising from the specific accident. In further embodiments, the coverage level may be associated with a general aspect of the insurance policy, such as a type of coverage, a maximum payment with respect to one or more types of coverage, a maximum payment per person, and/or a maximum total payment per accident. For example, where an autonomous operation feature is determined to be at fault at blocks 1314-1324, a deductible associated with the insurance policy may be reduced or eliminated with respect to the accident. Where both the vehicle operator and an autonomous operation feature are determined to be partially at fault, the coverage level may be determined or adjusted based upon the portion of the fault allocated to each, either directly proportionally or otherwise. For example, the deductible for an accident caused in equal part by the vehicle operator and one or more autonomous operation features may be reduced by some amount (e.g., 25%, 50%, 75%). As a further example, some or all of the maximum coverage limits associated with the insurance policy may be increased (e.g., 25% increase in liability coverage, 50% increase in collision coverage, etc.).

In some embodiments, the determination and/or adjustment of the coverage levels may include a determination of ongoing coverage levels or coverage status. The server 140 may determine whether to cancel or decline to renew a policy based upon the allocation of fault and/or received information regarding the accident. For example, when the vehicle operator is determined to be wholly at fault or to be above a fault proportion threshold (e.g., the vehicle operator is responsible for 80% of the fault allocated), the server 140 may determine to cancel the policy in accordance with its terms. Alternatively, the server 140 may determine to require or exclude certain types or levels of coverage, either generally or in a manner dependent upon the settings or configuration of one or more of the autonomous operation features. For example, when the vehicle operator is determined to be above a fault proportion threshold, the server 140 may limit renewal options to exclude collision coverage or limit the maximum policy limit of collision coverage. In some embodiments, coverage may further be limited or cancelled based upon the use of specific autonomous operation features, such as where an autonomous operation feature is determined to be wholly or partially at fault. Determinations regarding coverage levels or coverage status may be further based upon information regarding the vehicle and/or the vehicle operator, such as information regarding previous accidents and/or the vehicle operator's history of use of autonomous operation features (including settings used). Further embodiments may require or exclude coverage (or levels of coverage) based upon future use of autonomous operation features. For example, following an accident caused by the vehicle operator driving at night, the server 140 may determine to cancel coverage for future claims arising from manual operation of the vehicle by the vehicle operator at night. Thus, the coverage may only extend to operation of the vehicle during daylight hours or autonomous operation of the vehicle at night.

In some embodiments, the server 140 may cause one or more of the adjustments to the insurance policy to be presented to the vehicle operator or other customer. The customer may be presented with one or more options relating to adjustments to the policy (e.g., options to either agree to use autonomous operation features with certain settings or to forego a type of coverage). Where the vehicle operator declines all presented options, the server 140 may cancel or decline to renew the policy. As with determination of fault, in some embodiments, determinations of adjustments or cancellation may be presented to a reviewer (e.g., a claims adjuster or other specialist) for verification or further analysis prior to becoming effective.

Once the server 140 has assigned fault, adjusted the vehicle operator's risk or rate profile and/or one or more of the autonomous (and/or semi-autonomous) operation feature risk levels or profiles, and determined or adjusted one or more coverage levels associated with the vehicle insurance policy, the fault determination method 1300 may terminate. The adjusted risk levels or profiles may be used to adjust a premium, surcharge, penalty, rate, or other cost associated with a vehicle insurance policy for the vehicle 108 and/or the vehicle operator.

In some embodiments, the fault determination method 1300 may be implemented after payment has been made on claims relating to the accident. Because the sensor, communication, and autonomous operation feature data may be stored for later use, as discussed above, payment may be made shortly after occurrence of the accident. Determination of fault may then be made or verified at a later date. For example, operating data concerning an accident may be stored for later use following the accident, but payment of claims based upon a vehicle insurance policy covering the vehicle may be made before a determination of fault. Alternatively, or additionally, the fault determination method 1300 may be used to preliminarily determine fault immediately or shortly after the occurrence of an accident, and payment of claims may be made based upon such preliminary determination. Review and assessment of the preliminary determination may be completed at a later time, thereby allowing faster processing of claims.

Autonomous Vehicle Insurance Policies

The disclosure herein relates to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator control other aspects of the operation of the vehicle. The term "autonomous vehicle" means a vehicle including at least one autonomous operation feature, including semi-autonomous vehicles. A "fully autonomous vehicle" means a vehicle with one or more autonomous operation features capable of operating the vehicle in the absence of or without operating input from a vehicle operator. Operating input from a vehicle operator excludes selection of a destination or selection of settings relating to the one or more autonomous operation features.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals. Although insurance policy premiums are typically associated with an insurance policy covering a specified period of time, they may likewise be associated with other measures of a duration of an insurance policy, such as a specified distance traveled or a specified number of trips. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company. The terms "insured," "insured party," "policyholder," and "customer" are used interchangeably herein to refer to a person, party, or entity (e.g., a business or other organizational entity) that is covered by the insurance policy, e.g., whose insured article or entity is covered by the policy. Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Analyzing Effectiveness of Technology & Functionality

Figure 14:
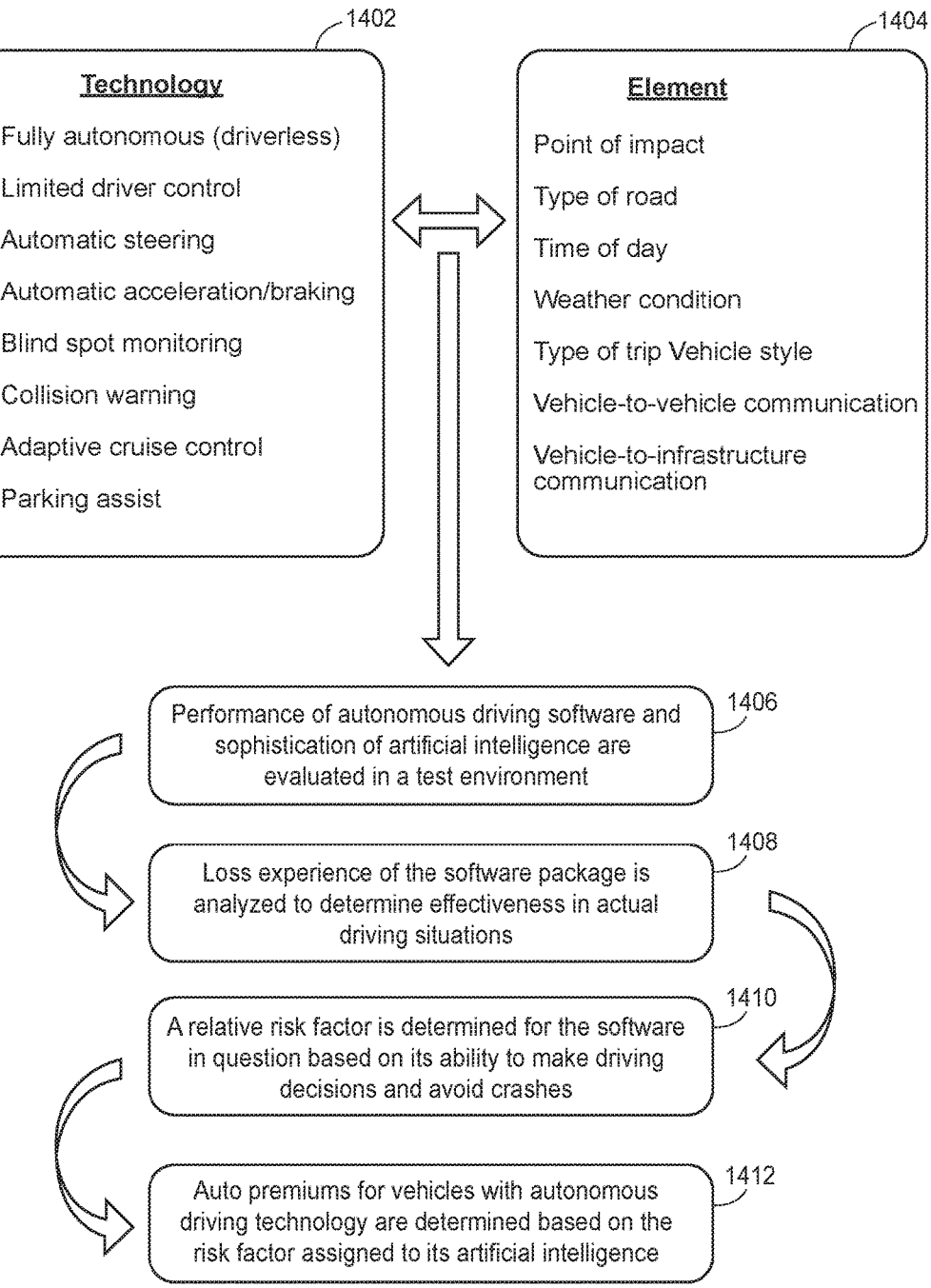
FIG. 14 illustrates a high-level flow diagram of an exemplary autonomous automobile insurance pricing system.

In one aspect, the present embodiments may provide a system and method for estimating the effectiveness of one or more autonomous or semi-autonomous vehicle technologies, functionalities, systems, and/or pieces of equipment on reducing a likelihood, and/or severity, of a vehicle accident, such as depicted in FIG. 14 (discussed further below). The system and method, for each autonomous or semi-autonomous vehicle technology or functionality that is analyzed, may evaluate or utilize the effect or impact of one or more accident-related factors or elements on the effectiveness of the respective autonomous or semi-autonomous vehicle technology or functionality. The analysis or evaluation may determine the impact of each factor or element on how well an autonomous or semi-autonomous vehicle technology or functionality actually performs under certain conditions (such as driving, vehicle, and/or road conditions; accident or vehicle type; and/or other factors).

A. Technologies and Functionalities

Noted above, a system and method may analyze and/or evaluate the effectiveness of autonomous or semi-autonomous vehicle technology, functionality, systems, and/or equipment. Individual technologies, functionalities, systems, and/or pieces of equipment may be evaluated that are related to: (1) fully autonomous (or driverless) vehicles; (2) limited driver control; (3) automatic or automated steering, acceleration, and/or braking; (4) blind spot monitoring; (5) collision warning; (6) adaptive cruise control; (7) parking assistance; (8) driver acuity or alertness monitoring; (9) pedestrian detection; (10) software security for smart vehicles; (11) theft prevention; (12) artificial intelligence upgrades or updates; (13) GPS functionality; (14) vehicle-to-vehicle wireless communication; (15) vehicle-to-infrastructure one or two-way wireless communication; and/or other technology and functionality, including that discussed elsewhere herein. Each technology or functionality, and/or the accident avoidance and/or mitigation effectiveness thereof, may be analyzed individually and/or in combination with one or more other technologies or functionalities.

B. Factors or Elements Impacting Effectiveness

The analysis and/or evaluation of the effectiveness of each technology or functionality may determine an impact of one or more factors or elements that may degrade the performance of each autonomous or semi-autonomous vehicle technology or functionality. For instance, each factor or element may lower or limit the effectiveness of an autonomous or semi-autonomous vehicle technology or functionality with respect to accident avoidance and/or limiting the severity of vehicle accidents. The factors or elements may be analyzed individually and/or in combination with one or more other factors or elements.

Mentioned above, accident-related or other factors, elements, and/or conditions may impact the effectiveness of an autonomous or semi-autonomous vehicle technology or functionality. The factors, elements, and/or conditions that may be evaluated may include: (1) point of vehicle impact during a vehicle accident; (2) type of road that an accident occurs on; (3) time of day that an accident occurs at; (4) weather conditions associated with an accident; (5) type of trip during which the accident occurred (short, long, etc.); (6) vehicle style for the vehicle(s) involved in an accident; (7) whether the vehicles involved in the accident were equipped with vehicle-to-vehicle wireless communication functionality; (8) whether the vehicle(s) involved in the accident were equipped with vehicle-to-infrastructure or infrastructure-to-vehicle wireless communication functionality; and/or other factors, elements, and/or conditions associated with, or impacting, individual vehicle accidents.

An evaluation of the foregoing factors, elements, and/or conditions with respect to multiple vehicle accidents involving vehicles having one or more autonomous or semi-autonomous vehicle technologies or functionalities may indicate or suggest: (a) an overall effectiveness for each individual autonomous or semi-autonomous vehicle technology or functionality, and/or (b) the impact (whether negative or positive) of each factor or element (type of road; type of vehicle; time of day; weather conditions; type of vehicle crash, i.e., point of impact; etc.) on the effectiveness of each autonomous or semi-autonomous vehicle technology, functionality, and/or associated equipment. After which, insurance premiums, rates, discounts, rewards, points, and/or other insurance-related items for vehicles having one or more autonomous or semi-autonomous vehicle technologies or functionalities may be generated, adjusted, and/or updated.

C. Applying Driver Characteristics to Auto Insurance

Characteristics and/or driving behaviors of individual drivers or customers may also be used to estimate, generate, and/or adjust insurance premiums, rates, discounts, rewards, and/or other insurance-related items for vehicles having one or more autonomous or semi-autonomous vehicle technologies or functionalities. Driver characteristics and/or driver behavior, as well as driver location or home address, may be compared, or analyzed in conjunction, with the factors or elements that may impact the accident avoidance or mitigation effectiveness of each autonomous or semi-autonomous vehicle technology or functionality.

For instance, a driver or insured may mainly drive on the highway, during daylight hours, and/or primarily for short commutes to and from work. The driver or insured's vehicle may have certain autonomous or semi-autonomous vehicle technologies or functionalities that have been established to decrease the likelihood of an accident, the severity of any accident, and/or otherwise increase safety or vehicle performance during highway, daylight, and/or short commute driving. If so, the insurance rate, premium, discount, and/or another insurance-related item for the driver or insured may be adjusted in accordance with the estimated lower risk (of accident, and/or severe accident).

As one example, the impact of one factor (point of vehicle impact) on the effectiveness of accident avoidance and/or mitigation for an autonomous or semi-autonomous vehicle technology or functionality may be determined. For instance, the impact of head-on collisions on the accident avoidance and/or mitigation effectiveness of automatic braking and/or automatic steering functionality may be analyzed. Also analyzed may be the effect of point of vehicle impact on the accident avoidance and/or mitigation effectiveness of automatic acceleration functionality. The impact of point of vehicle impact on the accident avoidance and/or mitigation effectiveness of other autonomous or semi-autonomous technologies and/or functionalities, including those discussed elsewhere herein, may additionally or alternatively be evaluated.

As another example, the impact of another factor (vehicle size or type) on the effectiveness of accident avoidance and/or mitigation for an autonomous or semi-autonomous vehicle technology, functionality, system, and/or piece of equipment may be determined. For instance, the impact of the vehicle being a compact car, mid-sized car, truck, SUV (sport utility vehicle), etc. on the accident avoidance and/or mitigation effectiveness for blind spot monitoring functionality and/or driver acuity monitoring functionality may be analyzed. The impact of vehicle size or type on the accident avoidance and/or mitigation effectiveness of other autonomous or semi-autonomous technologies and/or functionalities, including those discussed elsewhere herein, may additionally or alternatively be evaluated.

As a further example, the impact of another factor (type of road) on the effectiveness of accident avoidance and/or mitigation for an autonomous or semi-autonomous vehicle technology, functionality, system, and/or piece of equipment may be determined. For instance, the impact of the type of road (whether a freeway, highway, toll way, rural road or two-lane state or county highway, and/or downtown or city street) on the accident avoidance and/or mitigation effectiveness for adaptive cruise control functionality and/or vehicle-to-vehicle functionality may be analyzed. The impact of type of road on the accident avoidance and/or mitigation effectiveness of other autonomous or semi-autonomous technologies and/or functionalities, including those discussed elsewhere herein, may additionally or alternatively be evaluated.

Additionally, the amount of time or percentage of vehicle usage that an autonomous or semi-autonomous vehicle technology, functionality, system, and/or piece of equipment is used by the driver or vehicle operator may be determined from sensor or smart vehicle data. Technology usage information gathered or collected may be used to generate, update, and/or adjust insurance policies, premiums, rates, discounts, rewards, points, programs, and/or other insurance-related items.

D. Exemplary System Overview

At a broad level, the methods and systems described herein may be viewed as combining information regarding autonomous (and/or semi-autonomous) vehicle operation technology with information regarding environmental or usage elements to evaluate one or more autonomous (and/or semi-autonomous) operation features, determine one or more risk factors for the autonomous (and/or semi-autonomous) operation features, and determine vehicle insurance premiums based upon the risk factors. In some embodiments, the autonomous operation features may include an autonomous driving software package or artificial intelligence for operating an automobile. Evaluation of the autonomous operation features may include evaluating both software and hardware associated with the features in a test environment, as well as evaluating actual loss experience associated with vehicles using the features in ordinary operation (i.e., operation not in a test environment). The risk factors may be associated with the relative ability of the autonomous operation features to make control decisions that avoid accidents and other collisions. The risk factors may be included in determining insurance policy premiums, which may in some embodiments include other factors relevant to the determination of the total risk associated with one or more types of insurance coverage for an autonomous vehicle.

FIG. 14 illustrates a high-level flow diagram of an exemplary autonomous (and/or semi-autonomous) automobile insurance pricing system. Information regarding one or more autonomous operation feature technologies is collected, accessed, or otherwise received at block 1402. Such information may relate to one or more of the following technologies: a fully autonomous (driverless) vehicle operating technology, a limited driver control technology, an automatic steering technology, an automatic acceleration and/or braking technology, a blind spot monitoring and/or other information augmenting technology, a collision and/or other warning technology, an adaptive cruise control technology, a parking assist technology, and/or other autonomous operation technologies (including those described elsewhere herein or later developed). The autonomous operation feature technologies of block 1402 may be associated with one or more environmental or usage elements, information regarding which may be collected, accessed, or otherwise received at block 1404. Such information may relate to one or more of the following elements: a point of impact between the autonomous automobile and another object (e.g., another vehicle, an infrastructure component, or another moving or fixed object within the autonomous automobile's environment), a type of road (e.g., a limited access highway, a residential neighborhood street, or a main thoroughfare), a time of day and/or date (e.g., rush hour, weekend, or holiday), a weather condition (e.g., light levels, cloud cover, precipitation, temperature, wind, or ground cover such as ice or snow), a type and/or purpose of vehicle trip (e.g., commuting, interstate travel, or leisure), a vehicle style and/or type, a vehicle-to-vehicle communication, or a vehicle-to-infrastructure communication. The information regarding the elements in block 1404 may be further associated with the information regarding the technology in block 1402. Some technologies may be adapted to utilize information regarding some elements, and some elements may be more relevant to some technologies than to others.

The information regarding the technologies and elements may then be used in evaluating the performance of the autonomous (and/or semi-autonomous) operation features. The performance or sophistication of the autonomous operating features (e.g., autonomous driving software or artificial intelligence) may be determined within a test environment at block 1406, as described above. The evaluation may include a variety of combinations of technologies and elements, and one or more risk levels or risk profiles may be determined as part of or based upon the evaluation. In some embodiments, the evaluation may include testing the autonomous operation features on a test track or other test facility by installing the features within a test automobile. The test performance may then be supplemented or compared with actual loss experience information relating to the autonomous operating features in actual driving situations recorded at block 1408. The recorded actual loss experience from block 1408 and/or the evaluated test performance from block 1406 may be used to determine a relative or total risk factor for the autonomous operation features based upon the observed or expected ability of the autonomous operation features to make driving decisions for the autonomous automobile and avoid crashes, collisions, or other losses at block 1410. Based upon the risk factor determined at block 1410, one or more premiums or components of premiums for an automobile insurance policy may be determined at block 1412, as discussed above. These premiums make take into account the risks associated with autonomous operation features or combinations of features, as well as expected environmental or usage conditions, factors, or levels. The premiums determined at block 1412 may then be presented to a customer or potential customer for review, selection, or acceptance and purchase.

Exemplary Methods of Evaluating Impact on Effectiveness

In one aspect, a computer-implemented method of updating, adjusting, and/or generating an insurance policy, premium, rate, and/or discount may be provided. The method may include: (a) evaluating, via a processor, a vehicle accident avoidance and/or mitigation effectiveness of, and/or associated with, an autonomous or semi-autonomous vehicle technology, functionality, system, and/or piece of equipment under real-world driving conditions, the real-world driving conditions including one or more conditions that effect or impact the likelihood, and/or severity, of a vehicle accident or collision; (b) updating, adjusting, and/or generating an auto insurance policy, premium, rate, and/or discount, via the processor, based upon the accident avoidance and/or mitigation effectiveness of the autonomous or semi-autonomous vehicle technology, functionality, system, or equipment for a vehicle equipped with the autonomous or semi-autonomous vehicle feature, technology, system, and/or piece of equipment; (c) presenting (all or a portion of) the updated, adjusted, and/or generated auto insurance policy, premium, rate, and/or discount to an insured, driver, or owner of the vehicle equipped with the autonomous or semi-autonomous vehicle technology, functionality, system, and/or piece of equipment for their review, approval, and/or modification on a display screen associated with a computing device; (d) receiving, via the processor, an approval of and/or modification to the auto insurance policy, premium, rate, and/or discount from the insured, driver, or owner of the vehicle equipped with the autonomous or semi-autonomous vehicle technology, functionality, system, and/or piece of equipment; and/or (e) updating an auto insurance policy, premium, rate, and/or discount for, and/or then adjusting appropriate amounts to be charged to, the insured, driver, or owner of the vehicle equipped with the autonomous or semi-autonomous vehicle technology, functionality, system, and/or piece of equipment based upon the information received from the insured, driver, or owner of the vehicle equipped with the autonomous or semi-autonomous vehicle technology, functionality, system, and/or piece of equipment.

The step of (a) evaluating, via the processor, an accident avoidance or mitigation effectiveness of, or associated with, an autonomous or semi-autonomous vehicle technology, functionality, system, or piece of equipment under real-world driving conditions may include: (i) analysis of a plurality of vehicle accidents involving one or more vehicles having the autonomous or semi-autonomous vehicle technology, functionality, system, or piece of equipment, and/or (ii) testing vehicles equipped with the autonomous or semi-autonomous vehicle technology, functionality, system, and/or piece of equipment under real-world conditions and gathering data. The method may include additional, fewer, or alternate actions, including those discussed elsewhere herein.

In another aspect, a computer-implemented method of updating, adjusting, and/or generating an insurance policy, premium, rate, and/or discount may be provided. The method may include: (1) updating, adjusting, and/or generating an auto insurance policy, premium, rate, and/or discount, via a processor, based upon and/or taking into consideration: (a) one or more autonomous or semi-autonomous vehicle features, technologies, systems, and/or pieces of equipment; (b) conditions and/or factors impacting the effectiveness of each autonomous or semi-autonomous vehicle feature, technology, system, and/or piece of equipment with respect to accident avoidance and/or mitigation; (c) driver or insured actual characteristics or driving behavior, and/or geographical location associated with the driver, insured, or vehicle; and/or (d) driver or insured actual usage of the one or more autonomous or semi-autonomous vehicle features, technologies, systems, and/or pieces of equipment; (2) presenting on a display (such on a display of a computing device associated with the driver or insured, or a sales agent), all or a portion of, the updated, adjusted, and/or generated auto insurance policy, premium, rate, and/or discount for the driver's or insured's review, approval, and/or modification; (3) receiving and/or accepting the approval and/or modification via wireless communication from the computing device associated with the driver or insured at the processor; and/or (4) processing, handling, and/or updating the auto insurance policy accordingly and/or billing the driver or insured appropriately (via the processor) for the updated or new auto insurance coverage.

The one or more autonomous or semi-autonomous vehicle features, technologies, systems, and/or pieces of equipment may be or include an updated or revised version of computer or processing instructions related to the one or more autonomous or semi-autonomous vehicle features, technologies, systems, and/or pieces of equipment. The method may include additional, fewer, or alternate actions, including those discussed elsewhere herein.

Exemplary Methods of Applying Auto Insurance Risk Factors

In another aspect, a computer-implemented method of updating, adjusting, and/or generating an insurance policy, premium, rate, and/or discount may be provided. The method may include: (i) estimating a risk factor associated with auto insurance, via a processor, based upon (1) one or more autonomous or semi-autonomous vehicle technologies, functionalities, systems, and/or pieces of equipment; and/or (2) one or more accident-related conditions or factors that impact the effectiveness of the one or more autonomous or semi-autonomous vehicle technologies, functionalities, systems, and/or pieces of equipment, individually and/or as a group or collectively; (ii) generating, updating, and/or adjusting an auto insurance policy, premium, rate, and/or discount, via the processor, based upon the (a) risk factor associated with auto insurance estimated, and/or (b) actual driving characteristics and/or behaviors (such as typical driving patterns/paths/routes, geographical location, type of trips usually taken, etc.) of a driver, an insured, or an owner of a vehicle with having the one or more autonomous or semi-autonomous vehicle technologies, functionalities, systems, and/or pieces of equipment; (iii) presenting (all or a portion of) the auto insurance policy, premium, rate, and/or discount generated, updated, and/or adjusted, under the direction and/or control of the processor, on a display of a computing device (such as a mobile device associated with the driver, insured, or vehicle owner or an insurance representative) for their review, approval, and/or modification; (iv) receiving, at the processor, such as via wireless communication from the computing device, the auto insurance policy, premium, rate, and/or discount approved by the driver, insured, or vehicle owner; and/or (v) processing, handling, and/or updating the new auto insurance policy, premium, rate, and/or discount via the processor such that the customer (driver, insured, vehicle owner or operator) is billed appropriately for the amount of auto insurance coverage agreed upon or purchased.

An amount or percentage of driving time that the driver or insured uses the one or more autonomous or semi-autonomous vehicle technologies, functionalities, systems, or pieces of equipment while driving the vehicle may be used to update, adjust, and/or generate the insurance policy, premium, rate, and/or discount. The method may include additional, fewer, or alternate actions, including those discussed elsewhere herein.

In another aspect, a computer-implemented method of updating, adjusting, and/or generating an insurance policy, premium, rate, and/or discount may be provided. The method may include: (1) applying an accident risk factor associated with one or more autonomous or semi-autonomous vehicle technologies, functionalities, systems, and/or pieces of equipment to an auto insurance policy, premium, rate, discount, reward, etc. for a driver or insured's vehicle having, or equipped with, the one or more autonomous or semi-autonomous vehicle technologies, functionalities, systems, and/or pieces of equipment (via a processor), the risk factor being generated from evaluation of one or more driving and/or accident-related conditions impacting an effectiveness of the one or more autonomous or semi-autonomous vehicle technologies, functionalities, systems, and/or pieces of equipment with respect to accident avoidance and/or mitigation; (2) presenting (under the direction and/or control of the processor) on a display of a computing device (such as a mobile device associated with the driver or insured, or a sales agent) (all and/or portions of) the auto insurance policy, premium, rate, discount, reward, etc. to which the accident risk factor was applied for the driver's or insured's review, approval, and/or modification; (3) receiving and/or accepting the approved and/or modified auto insurance policy, premium, rate, discount, reward, etc. at the processor (such as via wireless communication from the computing device); and/or (4) processing, handling, and/or updating (via the processor) the auto insurance policy for the driver's or insured's vehicle having, or equipped with, the one or more autonomous or semi-autonomous vehicle technologies, functionalities, systems, and/or pieces of equipment accordingly based upon the information received to bill the customer (e.g., driver, insured, or vehicle owner/operator) an appropriate amount for the amount of auto insurance coverage purchased and/or agreed to. The method may include additional, fewer, or alternate actions, including those discussed elsewhere herein.

Exemplary Methods of Evaluating Artificial Intelligence

In another aspect, a computer-implemented method of updating, adjusting, and/or generating an insurance policy, premium, rate, and/or discount may be provided. The method may include (1) determining, via a processor, the automobile accident avoidance and/or mitigation related effectiveness associated with, or for, a revision or update of computer or processor instructions that direct and/or control one or more autonomous or semi-autonomous vehicle technologies, functionalities, systems, and/or pieces of equipment (and that may be stored on a non-transitory computer readable media or medium), the effectiveness determination taking into consideration: (a) actual vehicle accident information for accidents involving vehicles equipped with the revision or update of the computer or processor instructions that direct and/or control the one or more autonomous or semi-autonomous vehicle technologies, functionalities, systems, and/or pieces of equipment; and/or (b) physical testing of vehicles equipped with the revision or update of the computer or processor instructions that direct and/or control the one or more autonomous or semi-autonomous vehicle technologies, functionalities, systems, and/or pieces of equipment. The method may also include (2) updating, adjusting, and/or generating an insurance policy, premium, rate, and/or discount for a vehicle equipped with the revision or update of computer or processor instructions that direct and/or control the one or more autonomous or semi-autonomous vehicle technologies, functionalities, systems, and/or pieces of equipment. The method may include additional, fewer, or alternate actions, including those discussed elsewhere herein.

In another aspect, a computer-implemented method of updating, adjusting, and/or generating an insurance policy, premium, rate, and/or discount may be provided. The method may include: (1) testing an upgrade or update to computer or processor instructions that direct and/or control one or more autonomous or semi-autonomous vehicle technologies, functionalities, systems, and/or pieces of equipment (and that are stored on a non-transitory computer readable media or medium); (2) determining an increase in accident avoidance or mitigation effectiveness based upon the upgraded or updated computer or processor instructions that direct and/or control the one or more autonomous or semi-autonomous vehicle technologies, functionalities, systems, and/or pieces of equipment; and/or (3) updating, adjusting, and/or generating an insurance policy, premium, rate, and/or discount for a vehicle equipped with the upgraded or updated computer or processor instructions that direct and/or control the one or more autonomous or semi-autonomous vehicle technologies, functionalities, systems, and/or pieces of equipment based upon the increase in accident avoidance or mitigation effectiveness determined. The method may include additional, fewer, or alternate actions, including those discussed elsewhere herein.

Additional Exemplary Methods

In one aspect, a computer-implemented method of evaluating risk of autonomous or semi-autonomous vehicle technology may be provided. The method may include (1) generating, via one or more processors, a virtual test scenario, the virtual test scenario including one or more accident-related factors or conditions; (2) applying, via the one or more processors, the virtual test scenario to a package of computer instructions that instruct a vehicle processor to perform an autonomous or semi-autonomous functionality; (3) analyzing, via the one or more processors, a performance of the autonomous or semi-autonomous functionality under virtual conditions associated with the virtual test scenario; (4) determining, via the one or more processors, an insurance-based risk (e.g., a risk of a vehicle accident) of, or associated with, the package of computer instructions that instruct the vehicle processor to perform the autonomous or semi-autonomous functionality; and/or (5) generating, updating, or adjusting, via the one or more processors, a premium, rate, discount, reward, or other insurance item associated with an insurance policy for an autonomous or semi-autonomous vehicle employing the package of computer instructions that instruct the vehicle processor to perform the autonomous or semi-autonomous functionality based upon the insurance-based risk of, or associated with, the package of computer instructions. The method may include additional, fewer, or alternate actions, including those discussed elsewhere herein.

For instance, the one or more accident-related factors or conditions of the virtual test scenario may include road, construction, traffic, other vehicle, and/or weather factors or conditions. The virtual test scenario may include a virtual simulation of virtual traffic traveling on a virtual road, and each virtual vehicle traveling on a virtual route at a virtual speed. Determining, via the one or more processors, the insurance-based risk (e.g., a risk of a vehicle accident) of, or associated with, the package of computer instructions may include determining whether the package of computer instructions made a correct or proper decision given the road, construction, traffic, other vehicle, and/or weather conditions of the virtual test scenario.

In another aspect, a computer-implemented method of evaluating risk of autonomous or semi-autonomous vehicle technology may be provided. The method may include (1) collecting or receiving, via one or more processors, a virtual log of actual or real-world driving performance of autonomous or semi-autonomous functionality from a vehicle (or smart vehicle controller); (2) determining, via the one or more processors, an insurance-based risk (e.g., a risk of a vehicle accident) of, or associated with, the autonomous or semi-autonomous functionality from analysis of the virtual log of actual or real-world driving performance of the autonomous or semi-autonomous functionality, respectively; and/or (3) generating, updating, or adjusting, via the one or more processors, a premium, rate, discount, reward, or other insurance item associated with an insurance policy for an autonomous or semi-autonomous vehicle employing the autonomous or semi-autonomous functionality based upon the insurance-based risk of, or associated with, the autonomous or semi-autonomous functionality. The method may include additional, less, or alternate functionality, including that discussed elsewhere herein.

For instance, determining, via the one or more processors, the insurance-based risk (e.g., a risk of a vehicle accident) of, or associated with, the autonomous or semi-autonomous functionality from analysis of the virtual log of actual or real-world driving performance may include analysis of: (1) decisions that the autonomous or semi-autonomous functionality, or associated computer instructions, made; and/or (2) the environment and/or operating conditions (e.g., road, construction, traffic, and/or weather conditions) under which the decisions were made. Additionally or alternatively, determining, via the one or more processors, the insurance-based risk (e.g., a risk of a vehicle accident) of, or associated with, the autonomous or semi-autonomous functionality from analysis of the virtual log of actual or real-world driving performance may include analysis of: (1) evasive maneuvers that the autonomous or semi-autonomous functionality, or associated computer instructions, made (or directed the vehicle to perform); and/or (2) the environment and/or operating conditions (e.g., road, construction, traffic, and/or weather conditions) under which the evasive maneuvers were made. Further, determining, via the one or more processors, the insurance-based risk (e.g., a risk of a vehicle accident) of, or associated with, the autonomous or semi-autonomous functionality from analysis of the virtual log of actual or real-world driving performance may include analysis of (1) how the autonomous or semi-autonomous functionality, or associated computer instructions, respond to other drivers on the road maneuvering or changing speed; and/or (2) grading, rating, or otherwise evaluating the responsiveness of the autonomous or semi-autonomous functionality, or associated computer instructions, to other drivers' driving behavior.

In another aspect, a computer-implemented method of evaluating risk of autonomous or semi-autonomous vehicle technology and/or adjusting autonomous or semi-autonomous vehicle technology may be provided. The method may include (1) determining, via one or more processors, an optimum setting for an autonomous or semi-autonomous vehicle technology; (2) detecting, via the one or more processors, that an actual setting for an autonomous or semi-autonomous vehicle system of a vehicle is different than the optimum setting for the autonomous or semi-autonomous vehicle technology; (3) generating a recommendation, via the one or more processors, to change the actual setting for the autonomous or semi-autonomous vehicle system to the optimum setting; and/or (4) causing the recommendation, via the one or more processors, to be presented to a driver of the vehicle having the autonomous or semi-autonomous vehicle system to facilitate the driver changing the actual setting to the optimum setting (or otherwise accepting, or being notified of, an automatic change to the optimum setting). The method may include additional, less, or alternate functionality, including that discussed elsewhere herein.

For instance, the method may include generating or adjusting, via the one or more processors, a premium, rate, discount, or reward of an auto insurance policy for the vehicle based upon the vehicle having or being equipped with the recommendation functionality associated with recommending optimum settings, and/or a percentage of the driver accepting the recommendations provided. The optimum setting that is determined may be determined based upon a setting for the autonomous or semi-autonomous vehicle technology that reduces a likelihood of the vehicle employing the technology having, or being involved in, a vehicle accident or collision. Additionally or alternatively, the optimum setting that is determined may be determined based upon risk associated with the autonomous or semi-autonomous vehicle technology.

In another aspect, a computer-implemented method of determining accident fault may be provided. The method may include (1) receiving or collecting, at or via a remote server (or processor) associated with an insurance provider, performance data associated with autonomous or semi-autonomous vehicle technology for an insured vehicle involved in a vehicle accident, the insured vehicle being insured by an insurance policy issued by the insurance provider; (2) analyzing, at or via the remote server, the performance data received; (3) determining, at or via the remote server, from analysis of the performance data: (a) a first percentage of fault of the vehicle accident for the autonomous or semi-autonomous vehicle technology of the insured vehicle in operation at a time of the vehicle accident; and/or (b) a second percentage of fault of the vehicle accident for an insured driver who was driving the insured vehicle during the vehicle accident; and/or (4) adjusting or updating, at or via the remote server, a premium, rate, discount, or reward of the insurance policy covering the insured vehicle based upon the first and second percentages of fault that are assigned to the insured vehicle and insured driver, respectively, from the analysis of the performance data. The method may include additional, less, or alternate functionality, including that discussed elsewhere herein.

For instance, the method may include further determining, at or via the remote server, from analysis of the performance data: (c) a third percentage of fault of the accident for other vehicles or drivers involved in and/or causing the vehicle accident. The method may include handling, at or via the remote server, an insurance claim for the vehicle accident submitted by the insured using, or based upon, the performance data received associated with the autonomous or semi-autonomous vehicle functionality exhibited during the vehicle accident.

The method may include changing, at or via the remote server, policy coverages (and/or premiums, rates, discounts, etc.) for the insured or the insured vehicle using, or based upon, the performance data received associated with the autonomous or semi-autonomous vehicle functionality exhibited during the vehicle accident. Additionally or alternatively, the method may include changing, at or via the remote server, liability limits or coverages (and/or premiums, rates, discounts, etc.) for the insured or the insured vehicle using, or based upon, the performance data received associated with the autonomous or semi-autonomous vehicle functionality exhibited during the vehicle accident.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware is temporarily configured (e.g., programmed), the hardware need not be configured or instantiated at any one instance in time. Software may accordingly configure a processor, for example, to constitute a particular hardware module at one instance of time and to constitute a different hardware module at a different instance of time. Hardware elements can provide information to, and receive information from, other hardware elements. Accordingly, the described hardware may be regarded as being communicatively coupled.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Similarly, the methods or routines described herein may be at least partially processor-implemented. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. In addition, use of the "a" or "an" are employed to describe elements and components of the embodiments herein. This is done merely for convenience and to give a general sense of the description. In this description, and the claims that follow, the singular also includes the plural unless it is obvious that it is meant otherwise. This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

What is claimed is:

1. A computer-implemented method of evaluating autonomous or semi-autonomous vehicle technology, the method comprising:
    generating, by one or more processors of a computer system configured to virtually test responses of computer instructions associated with the autonomous or semi-autonomous vehicle technology within a virtual environment, a virtual test scenario related to vehicle operation of a virtual representation of a vehicle, wherein the virtual test scenario includes virtual representations of a plurality of other vehicles on a virtual road;
    applying, by the one or more processors of the computer system, the virtual test scenario to a package of computer instructions configured to instruct processors of autonomous or semi-autonomous vehicles to perform an autonomous or semi-autonomous functionality, wherein applying the virtual test scenario includes presenting virtual sensor data to the package of computer instructions to simulate operation of the vehicle;
    determining, by the one or more processors of the computer system, one or more responses of the package of computer instructions to the applied virtual test scenario;
    determining, by the one or more processors of the computer system, one or more virtual responses of the virtual representation of the vehicle based upon the one or more responses of the package of computer instructions;
    determining, by the one or more processors of the computer system, a performance metric associated with the package of computer instructions based at least in part upon the one or more virtual responses of the virtual representation of the vehicle to the applied virtual test scenario, wherein the performance metric is associated with a risk level associated with operation of vehicles using the package of computer instructions; and
    causing, by the one or more processors, one or more of the following actions to be performed based upon the performance metric: adjusting an insurance policy associated with a vehicle having the autonomous or semi-autonomous vehicle technology, determining a coverage level associated with the insurance policy, presenting information regarding the performance metric to a reviewer via a display of a reviewer computing device, or presenting an adjustment to the insurance policy to a customer via a display of a customer computing device for review of the adjustment to the insurance policy.

2. The method of claim 1, wherein the virtual sensor data of the virtual test scenario is representative of one or more conditions associated with an increased risk of a vehicle accident.

3. The method of claim 2, wherein the one or more conditions of the virtual test scenario include one or more of the following: road conditions, construction, traffic conditions, actions of other vehicles, or weather conditions.

4. The method of claim 2, further comprising:
    determining, by one or more processors, the risk level associated with the package of computer instructions based upon the determined performance metric.

5. The method of claim 4, wherein determining the risk level associated with the package of computer instructions includes determining whether the package of computer instructions made a correct decision given the one or more conditions of the virtual test scenario.

6. The method of claim 1, wherein the virtual test scenario further includes a virtual route and a virtual speed for each of the virtual representations of the plurality of other vehicles traveling on the virtual road.

7. The method of claim 1, further comprising:
    determining, by the one or more processors, an adjustment to an insurance policy associated with the vehicle having the autonomous or semi-autonomous vehicle technology, wherein the adjustment is based at least in part upon the determined risk level associated with the package of computer instructions and wherein the adjustment to the insurance policy includes one or more of generating, updating, or adjusting one or more of the following: a premium, a rate, a discount, a reward, a deductible, or a limit; and wherein adjusting the insurance policy includes implementing the adjustment.

8. The method of claim 1, wherein the risk level indicates a risk of the vehicle being involved in a vehicle accident.

9. A computer system for evaluating autonomous or semi-autonomous vehicle technology, comprising:
    one or more processors;
    a program memory coupled to the one or more processors and storing (i) a package of computer instructions configured to instruct processors of autonomous or semi-autonomous vehicles to perform an autonomous or semi-autonomous functionality and (ii) executable instructions that, when executed by the one or more processors, cause the computer system to virtually test responses of the package of computer instructions within a virtual environment by:
        generating a virtual test scenario related to vehicle operation of a virtual representation of a vehicle, wherein the virtual test scenario includes virtual representations of a plurality of other vehicles on a virtual road;
        applying the virtual test scenario to the package of computer instructions, wherein applying the virtual test scenario includes presenting virtual sensor data to the package of computer instructions to simulate operation of the vehicle;

determining one or more responses of the package of computer instructions to the applied virtual test scenario;

determining one or more virtual responses of the virtual representation of the vehicle based upon the one or more responses of the package of computer instructions;

determining a performance metric associated with the package of computer instructions based at least in part upon the one or more virtual responses of virtual representation of the vehicle to the applied virtual test scenario, wherein the performance metric is associated with a risk level associated with operation of vehicles using the package of computer instructions; and causing one or more of the following actions to be performed based upon the performance metric: adjusting an insurance policy associated with a vehicle having the autonomous or semi-autonomous vehicle functionality, determining a coverage level associated with the insurance policy, presenting information regarding the performance metric to a reviewer via a display of a reviewer computing device, or presenting an adjustment to the insurance policy to a customer via a display of a customer computing device for review of the adjustment to the insurance policy.

10. The computer system of claim 9, wherein the virtual sensor data of the virtual test scenario is representative of one or more conditions associated with an increased risk of a vehicle accident.

11. The computer system of claim 10, wherein the executable instructions further cause the computer system to determine the risk level associated with the package of computer instructions based upon the determined performance metric by determining whether the package of computer instructions made a correct decision given the one or more conditions of the virtual test scenario.

12. The computer system of claim 9, wherein the virtual test scenario includes a virtual route and a virtual speed for each of the representations of the plurality of other vehicles.

13. The computer system of claim 9, wherein the risk level indicates a risk of the vehicle being involved in a vehicle accident.

14. A tangible, non-transitory computer-readable medium storing executable instructions for evaluating an autonomous or semi-autonomous vehicle technology that, when executed by at least one processor of a computer system, cause the computer system to:

access a package of computer instructions configured to instruct processors of autonomous or semi-autonomous vehicles to perform the autonomous or semi-autonomous functionality;

generate a virtual test scenario related to vehicle operation of a virtual representation of a vehicle, wherein the virtual test scenario includes virtual representations of a plurality of other vehicles on a virtual road;

apply the virtual test scenario to the package of computer instructions, wherein applying the virtual test scenario includes presenting virtual sensor data to the package of computer instructions to simulate operation of the vehicle;

determine one or more responses of the package of computer instructions to the applied virtual test scenario;

determine, one or more virtual responses of the virtual representation of the vehicle based upon the one or more responses of the package of computer instructions;

determine a performance metric associated with the package of computer instructions based at least in part upon the one or more virtual responses of the virtual representation of the vehicle to the applied virtual test scenario, wherein the performance metric is associated with a risk level associated with operation of vehicles using the package of computer instructions; and cause one or more of the following actions to be performed based upon the performance metric: adjusting an insurance policy associated with a vehicle having the autonomous or semi-autonomous vehicle technology, determining a coverage level associated with the insurance policy, presenting information regarding the performance metric to a reviewer via a display of a reviewer computing device, or presenting an adjustment to the insurance policy to a customer via a display of a customer computing device for review of the adjustment to the insurance policy.

15. The tangible, non-transitory computer-readable medium of claim 14, wherein the virtual sensor data of the virtual test scenario is representative of one or more conditions associated with an increased risk of a vehicle accident.

16. The tangible, non-transitory computer-readable medium of claim 15, further storing executable instructions that cause the computer system to determine the risk level associated with the package of computer instructions based upon the determined performance metric by determining whether the package of computer instructions made a correct decision given the one or more conditions of the virtual test scenario.

17. The tangible, non-transitory computer-readable medium of claim 14, wherein the virtual test scenario includes a virtual simulation of virtual traffic traveling on a virtual road, including a virtual route and a virtual speed for each of a plurality of virtual vehicles.

18. The tangible, non-transitory computer-readable medium of claim 14, further storing executable instructions that cause the computer system to:

determine an adjustment to an insurance policy associated with the vehicle having the autonomous or semi-autonomous vehicle technology, wherein the adjustment is based at least in part upon the determined risk level associated with the package of computer instructions and wherein the adjustment to the insurance policy includes one or more of generating, updating, or adjusting one or more of the following: a premium, a rate, a discount, a reward, a deductible, or a limit; and wherein adjusting the insurance policy includes implementing the adjustment.

19. The tangible, non-transitory computer-readable medium of claim 14, wherein the risk level indicates a risk of the vehicle being involved in a vehicle accident.

* * * * *